United States Patent
Aoki et al.

(10) Patent No.: US 7,865,940 B2
(45) Date of Patent: Jan. 4, 2011

(54) SERVICE PROVIDING SYSTEM AND DEVICE FOR RECEIVING SERVICE

(75) Inventors: Kazuma Aoki, Kasugai (JP); Satoru Yanagi, Nagoya (JP); Masatoshi Kokubo, Ama-gun (JP); Makoto Matsuda, Aisai (JP); Masafumi Miyazawa, Nagoya (JP); Kiyotaka Ohara, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 1378 days.

(21) Appl. No.: 11/264,751

(22) Filed: Nov. 2, 2005

(65) Prior Publication Data

US 2006/0123114 A1 Jun. 8, 2006

(30) Foreign Application Priority Data

Nov. 5, 2004 (JP) .............................. 2004-322941

(51) Int. Cl.
G06F 15/173 (2006.01)
G06F 15/16 (2006.01)
(52) U.S. Cl. ............................ 726/5; 709/226; 709/217
(58) Field of Classification Search ................ 713/168, 713/176; 726/5; 709/226, 217
See application file for complete search history.

(56) References Cited

U.S. PATENT DOCUMENTS

| 5,909,602 | A | 6/1999 | Nakai et al. | |
|---|---|---|---|---|
| 5,946,457 | A | 8/1999 | Nakai et al. | |
| 7,124,201 | B2 | 10/2006 | Iyoki | |
| 2003/0027549 | A1* | 2/2003 | Kiel et al. | 455/405 |
| 2003/0187965 | A1 | 10/2003 | Enomoto et al. | |
| 2005/0013423 | A1* | 1/2005 | Eversen et al. | 379/114.17 |

FOREIGN PATENT DOCUMENTS

| JP | 9-238215 | 9/1997 |
|---|---|---|
| JP | 11-046277 | 2/1999 |
| JP | 2001-092781 | 4/2001 |

(Continued)

OTHER PUBLICATIONS

Notification of Reasons of Rejection, Application No. 2004-322941, Date of Dispatch Oct. 7, 2008.

(Continued)

Primary Examiner—Farid Homayounmehr
Assistant Examiner—Aubrey H Wyszynski
(74) Attorney, Agent, or Firm—Banner & Witcoff, Ltd.

(57) ABSTRACT

A system for providing a service from a service-providing device to a client device is provided. The service-providing device includes a database, a registering unit, a providing unit, a service end judging unit, and a service terminating unit. The client device includes a usage registration unit, a setting information storing unit, a function executing unit, a detecting unit, and a re-registration unit. The re-registration unit reads out the setting information corresponding to the terminated service from the memory if the terminated service is detected by the detecting unit, and transmits the setting information along with the registration request signal to the service-providing device to make a usage registration for the terminated service. Devices, methods and computer-readable media having programs stored thereon are also provided for making a re-registration for a service which has been terminated by a service-providing device, without requiring a user to conduct an operation for re-registration.

24 Claims, 34 Drawing Sheets

FOREIGN PATENT DOCUMENTS

| | | |
|---|---|---|
| JP | 2002-109079 | 4/2002 |
| JP | 2002-123433 | 4/2002 |
| JP | 2002-176422 | 6/2002 |
| JP | 2002-232638 | 8/2002 |
| JP | 2002-245261 | 8/2002 |
| JP | 2002-312670 | 10/2002 |
| JP | 2003-006223 | 1/2003 |
| JP | 2003-263452 | 9/2003 |
| JP | 2003 288336 | 10/2003 |
| JP | 2003-288336 | 10/2003 |
| JP | 2004-220170 | 8/2004 |
| JP | 2004-220231 | 8/2004 |
| WO | WO-99/52304 | 10/1999 |

OTHER PUBLICATIONS

Japanese Office Action in corresponding JP Application No. 2004-322941, mailed May 7, 2008.

"Rabbit Ticker", 2 pages, http://www.work-at.co.jp/rabbit/, May 31, 2004.

European Search Report based on European Application No. EP 05 25 6880, Mar. 23, 2006.

* cited by examiner

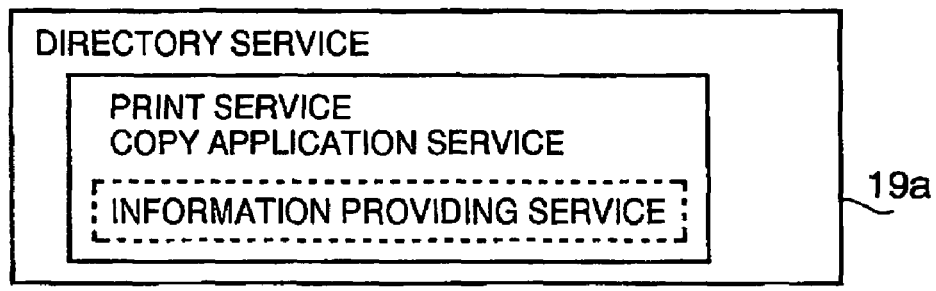

FIG.2A

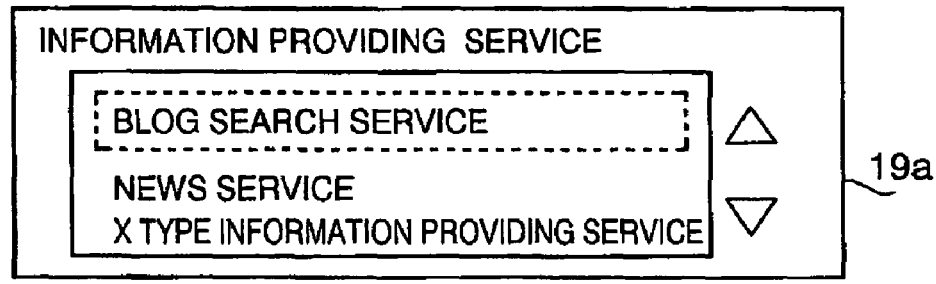

FIG.2B

```
<ID>11111110</ID>
<Title>DIRECTORY SERVICE</Title>
<Type>MENU</Type>
<Num_Link>3</Num_Link>
<Link>
  <Link_Title>PRINT SERVICE</Link_Title>
    <Link_Location>11111111</Link_Location>
</Link>
<Link>
  <Link_Title>COPY APPLICATION SERVICE</Link_Title>
    <Link_Location>11111112</Link_Location>
</Link>
<Link>
  <Link_Title>INFORMATION PROVIDING SERVICE</Link_Title>
    <Link_Location>11111113</Link_Location>
</Link>
```

FIG. 3

```
<ID>11111113</ID>
<Title>INFORMATION PROVIDING SERVICE</Title>
<Type>MENU</Type>
<Num_Link>4</Num_Link>
<Link>
 <Link_Title>BLOG SEARCH SERVICE</Link_Title>
<Link_Location>http://aaa.*****.co.jp/cgi_bin/top</Link_Location>
</Link>
<Link>
 <Link_Title>NEWS SERVICE</Link_Title>
<Link_Location>http://bbb.*****.co.jp/cgi_bin/top</Link_Location>
</Link>
<Link>
 <Link_Title>X TYPE INFORMATION PROVIDING SERVICE</Link_Title>
<Link_Location>http://ccc.*****.co.jp/cgi_hin/top</Link_Location>
</Link>
<Link>
 <Link_Title>Y TYPE INFORMATION PROVIDING SERVICE</Link_Title>
<Link_Location>http://ddd.*****.co.jp/cgi_hin/oo</Link_Location>
</Link>
```

FIG. 4

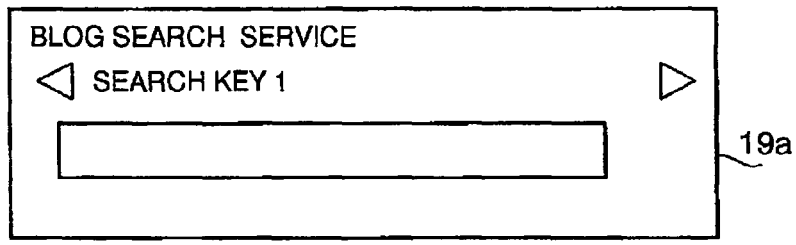

FIG.5A

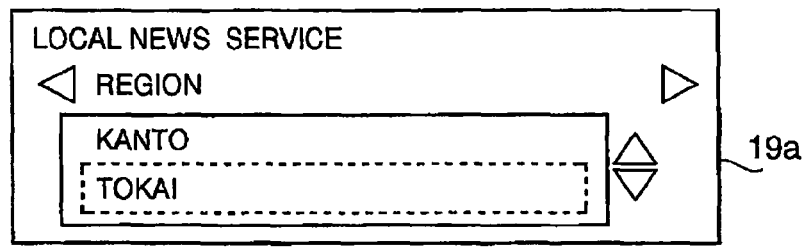

FIG.5B

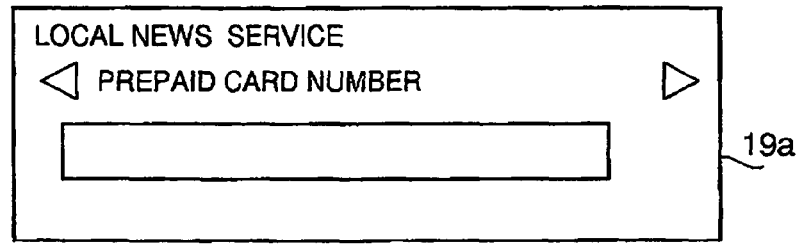

FIG.5C

```
<ID>11111110</ID>
<Title>BLOG SEARCH SERVICE</Title>
<Type>FORM</Type>
<Action>http://aaa.*****.co.jp/cgi_bin/service</Action>
<Num_Form_Elem>3<Num_Form_Elem>
<Form_Elem>
  <Form_Type>Text</Form_Type>
  <Form_Data>
    <Disp_Name>SEARCH KEY1</Disp_Name>
    <Value_Name>key1</Value_Name>
    <Max_Byte>100</Max_Byte>
    <Defaults_String></Default_String>
  </Form_Data>
</Form_Elem>
<Form_Elem>
  <Form_Type>Text</Form_Type>
  <Form_Data>
    <Disp_Name>SEARCH KEY2</Disp_Name>
    <Value_Name>Key2</Value_Name>
    <Max_Byte>100</Max_Byte>
    <Defaults_String></Default_String>
  </Form_Data>
</Form_Elem>
<Form_Elem>
  <Form_Type>Text</Form_Type>
  <Form_Data>
    <Disp_Name>SEARCH KEY3</Disp_Name>
    <Value_Name>Key3</Value_Name>
    <Max_Byte>100</Max_Byte>
    <Defaults_String></Default_String>
  </Form_Data>
</Form_Elem>
```

```xml
<ID>11111110</ID>
<Title>LOCAL NEWS SERVICE</Title>
<Type>FORM</Type>
<Action>http://bbb..*****.co.jp/cgi_bin/service</Action>
<Num_Form_Elem>3<Num_Form_Elem>
<Form_Elem>
  <Form_Type>Select</Form_Type>
  <Form_Data>
    <Disp_Name>REGION</Disp_Name>
    <Value_Name>Address</Value_Name>
    <Multi_Select>0</Multi_Select>
    <Num_Option>8</Num_Option>
<Option>
   <Disp_Select>HOKKAIDO</Disp_Select>
   <Disp_Value>1</Disp_Value>
   <Default_Select>1</Disp_Select>
</Option>
...
<Option>
   <Disp_Select>KANTO</Disp_Select>
   <Disp_Value>3</Disp_Value>
   <Default_Select>0</Disp_Select>
</Option>
<Option>
   <Disp_Select>TOKAI</Disp_Select>
   <Disp_Value>4</Disp_Value>
   <Default_Select>0</Disp_Select>
</Option>
...
  </Form_Data>
</Form_Elem>
<Form_Elem>
  <Form_Type>Text</Form_Type>
  <Form_Data>
    <Disp_Name>PREPAID CARD NUMBER</Disp_Name>
    <Value_Name>PrePaid</Value_Name>
    <Max_Byte>100</Max_Byte>
    <Default_String></Default_String>
  </Form_Data>
</Form_Elem>
<Form_Elem>
  <Form_Type>Text</Form_Type>
  <Form_Data>
    <Disp_Name>NUMBER OF SHEETS FOR COLLECTING INFORMATION </Disp_Name>
    <Value_Name>NumPages</Value_Name>
    <Max_Byte>2</Max_Byte>
    <Default_String></Default_String>
  </Form_Data>
</Form_Elem>
```

FIG. 7

(REQUEST SERVICE ID MANAGEMENT TABLE)

| REQUEST SERVICE ID | PARAMETER INFORMATION |
|---|---|
| 11111111 | key1="IT",key2="software",key3="robot" |
| 11111112 | key1="music",key2="rock",key3="" |
| 11111113 | key1="restaurant",key2="new",key3="French" |
| ... | ... |

| REQUEST SERVICE ID | PARAMETER INFORMATION |
|---|---|
| 12111111 | Address="1",Prepaid="＊＊＊1",Numpages="1" |
| 12111112 | Address="3",Prepaid="＊＊＊2",Numpages="2" |
| 12111113 | Address="4",Prepaid="＊＊＊3",Numpages="4" |
| ... | ... |

FIG.15A (PERIODICAL REPLY MANAGEMENT TABLE)

| REQUEST SERVICE ID | SERVICE START | SERVICE URL | SERVICE STATUS | INQUIRY DATE | SERVICE CANCEL |
|---|---|---|---|---|---|
| 11111111 | TRUE | http://... | 0 | 10/21 13:12 | FALSE |
| 11111112 | FALSE | http://... | 0 | 10/21 15:17 | FALSE |
| 11111113 | FALSE | http://... | 0 | 10/21 17:39 | FALSE |
| ... | ... | ... | ... | ... | ... |
| 12111111 | FALSE | http://... | 0 | 10/21 17:12 | FALSE |
| ... | ... | ... | ... | ... | ... |
| 13111111 | FALSE | http://... | 0 | 10/21 20:51 | FALSE |
| ... | ... | ... | ... | ... | ... |
| 14111111 | FALSE | http://... | -3 | 10/21 10:04 | TRUE |
| ... | ... | ... | ... | ... | ... |

(REPLY MANAGEMENT INFORMATION)

FIG.15B

FIG.16A (PERIODICAL INQUIRY MANAGEMENT TABLE)

| REQUEST SERVICE ID | SERVICE STATUS | INQUIRY INTERVAL | REMAINING TIME | INSTANT PROCESSING | USED DEVICE | STORAGE LOCATION | RE-REGISTRATION PERMISSION |
|---|---|---|---|---|---|---|---|
| 11111111 | FALSE | 3000 | 0 | FALSE | Printer | **AA | FALSE |
| 11111112 | TRUE | 1800 | 0 | FALSE | Printer | **BB | TRUE |
| 11111113 | FALSE | 3600 | 0 | FALSE | Printer | **CC | TRUE |
| ... | ... | ... | ... | ... | ... | ... | ... |
| 12111111 | FALSE | 66400 | 325043 | FALSE | Scanner,Printer | **DD | FALSE |
| ... | ... | ... | ... | ... | ... | ... | ... |
| 13111111 | FALSE | 60 | 5 | TRUE | Speaker | **EE | TRUE |
| ... | ... | ... | ... | ... | ... | ... | ... |
| 14111111 | FALSE | 10 | 8 | TRUE | Microphone | **FF | FALSE |

(INQUIRY MANAGEMENT INFORMATION)

FIG.16B (USAGE REGISTRATION INFORMATION)

| DATA NAME | VALUE |
|---|---|
| Link_Title | BLOG SEARCH SERVICE |
| Link_Location | http://aaa.*****.co.jp/cgi_bin/service |
| key1 | ***** |
| key2 | ***** |
| key3 | ***** |

PARAMETER INFORMATION (key1, key2, key3)

SERVICE I/F INFORMATION

FIG.16C (USAGE REGISTRATION INFORMATION)

| DATA NAME | VALUE |
|---|---|
| Link_Title | NEWS SERVICE |
| Link_Location | http://bbb.*****.co.jp/cgi_bin/service |
| Address | 1 |
| Prepaid | ****1 |
| NumPages | 1 |

PARAMETER INFORMATION (Address, Prepaid, NumPages)

SERVICE I/F INFORMATION (INTEGRATED INQUIRY INFORMATION)

```
POST: https://•••/•••/•••/ HTTP/1,1
HOST: hostname
Content-Type: text/xml
Content-Length: length of content <NumPattern>2</NumPattern>
<Request_Service>
<Request_Status>FALSE</Request_Status>
<Num_Service_ID>8</Num_Service_ID>
<Request_Service_ID>11111111</Request_Service_ID>
<Request_Service_ID>11111113</Request_Service_ID>
<Request_Service_ID>11111114</Request_Service_ID>
<Request_Service_ID>11111115</Request_Service_ID>
(•••)
</Request_Service>
<Request_Service>
<Request_Status>TRUE</Request_Status>
<Num_Service_ID>2</Num_Service_ID>
<Request_Service_ID>11111112</Request_Service_ID>
<Request_Service_ID>11111121</Request_Service_ID>
</Request_Service>
```

(INTEGRATED REPLY INFORMATION)

```
HTTP/1.1 200 OK
Content-Type: text/xml
Content-Length: length of content

<Num_Pattern>2</Num_Pattern>
<Response_Service>
<Service_Start>TRUE</Service_Start>
<Service_URL>http://aa. brother,co.jp/bin/aa</Service_URL>
<Service_Status></Service_Status>
<Service_Canceled>FALSE</Service_Canceled>
<Num_Service_ID>1</Num_Service_ID>
<Request_Service_ID>11111111</Request_Service_ID>
</Response_Service>
<Response_Service>
<Service_Status>FALSE</Service_Start>
<Service_URL></Service_URL>
<Service_Status>0</Service_Status>
<Service_Canceled>FALSE</Service_Canceled>
<Num_Service_ID>2</Num_Service_ID>
<Request_Service_ID>11111112</Request_Service_ID>
<Request_Service_ID>11111121</Request_Service_ID>
</Response_Service>
```

FIG.27

SERVICE PROVIDING SYSTEM AND DEVICE FOR RECEIVING SERVICE

CROSS-REFERENCE TO RELATED APPLICATION

This application claims priority under 35 U.S.C. §119 from Japanese Patent Application No. 2004-322941, filed on Nov. 5, 2004. The entire subject matter of the application is incorporated herein by reference.

BACKGROUND

1. Technical Field

Aspects of the present invention relate to a system in which a service is provided from a service-providing device to a client device.

2. Description of Related Art

A system in which a service-providing device provides service-related information to a client device has been widely used. Such a service is frequently called an information providing service. A system in which a service-providing device provides a data processing service to a client device by obtaining data to be processed from the client device and processing the obtained data has also been widely used.

As a client device for receiving an information providing service, a device configured to receive a service from a server by receiving web data from the server and displaying the received web data on its display unit has been widely used. On a web site "RSS reader Rabbit Ticker" found on the world wide web at "work.at.co.jp/rabbit/", an example of a client device for receiving information providing service is disclosed. The client device disclosed on the web site accesses a server to judge whether new information is posted on the server, and obtains the new information from the server if the new information is posted on the server.

In Japanese Patent Provisional Publication No. HEI 9-238215, a system in which a digital copying device is connected to a host computer having a function that the digital copying device does not have is disclosed In this system, the function that the digital copying device does not have is executed by the host computer and processed data is provided to the digital copying deice so that the digital copying device can attain the function through the host computer.

A system in which late information (e.g. news) is provided promptly from a service-providing device to a client device is also widely used. In such a system, the service-providing device obtains service-related setting information from the client device so as to make a usage registration of a service for the client device, and thereafter provides the service to the client device, for example, by providing information matching a keyword or a data type contained in the service-related setting information to the client device.

Frequently, such a service-providing device is configured to automatically delete the usage registration of the service if a certain event arises. One of such events causing the deletion of the usage registration is continuation of a state in which the service-providing device can not locate the client device to which the service is to be provided due to, for example, power off of the client device. If the service to be provided to the client device is a pay service, the service-providing device may delete the usage registration for the client device if a prepaid card becomes invalid or a credit card transaction becomes unavailable.

It is noted that there is a case where a user does not want such automatic deletion of the usage registration. If the user does not want such automatic deletion of the usage registration, the user needs to make a re-registration by re-inputting the setting information through the client device to re-transmit the setting information to the service-providing device again. However, such an inputting operation for making a re-registration is troublesome for the user.

SUMMARY

Aspects of the present invention are advantageous in that they provide at least one of a system, device, method and computer-readable medium having a program stored thereon with the program for making a re-registration for a service which has bee terminated by a service-providing device, without requiring a user to conduct an operation for re-registration.

BRIEF DESCRIPTION OF THE ACCOMPANYING DRAWINGS

FIGS. 2A and 2B show examples of a service selection screen according to aspects of the invention.

FIG. 3 shows an example of XML data to be used as service definition information for a top level service selection screen according to aspects of the invention.

FIG. 4 shows an example of XML data to be used as information of services belonging to one of categories according to aspects of the invention.

FIGS. 5A, 5B and 5C show examples of a parameter input screen according to aspects of the invention.

FIG. 6 shows an example of service I/F information for a blog search service according to aspects of the invention.

FIG. 7 shows an example of service I/F information for a local news service according to aspects of the invention.

FIG. 15A shows an example of a request service ID management table according to aspects of the invention.

FIG. 15B shows an example of a periodical reply management table according to aspects of the invention.

FIG. 16A shows an example of a periodical inquiry management table according to aspects of the invention.

FIGS. 16B and 16C show examples of usage registration information according to aspects of the invention.

FIG. 22 shows an example of integrated inquiry information according to aspects of the invention.

FIG. 27 shows an example of integrated reply information according to aspects of the invention.

DETAILED DESCRIPTION

Figure 1:
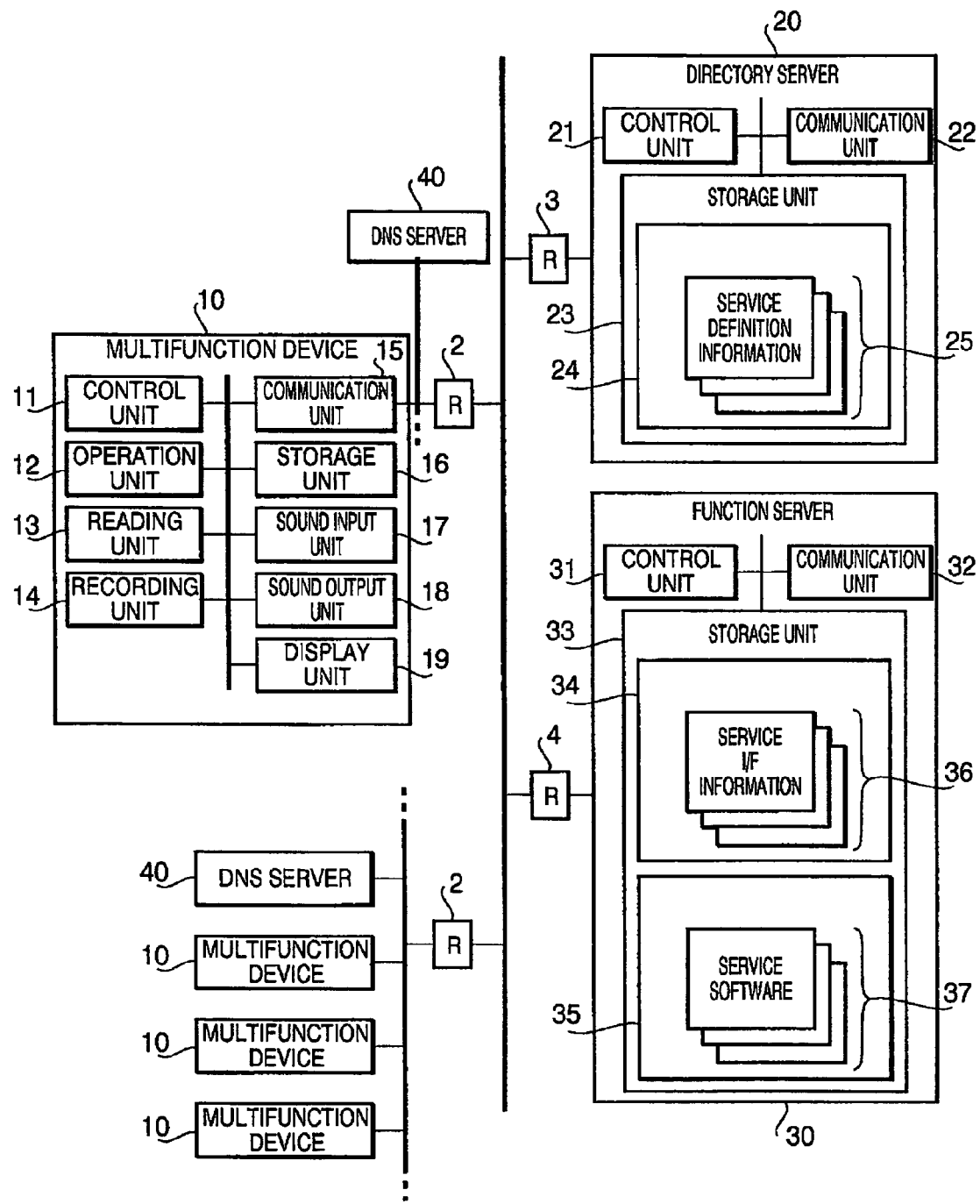
FIG. 1 is a block diagram of a communication system according to aspects of the invention.

General Overview of Aspects of the Invention

It is noted that various connections are set forth between elements in the following description. It is noted that these connections in general and unless specified otherwise, may be direct or indirect and that this specification is not intended to be limiting in this respect. Aspects of the invention may be implemented in computer software as programs storable on computer-readable media including but not limited to RAMs, ROMs, Flash memory, EEPROMs, CD-media, DVD-media, temporary storage, hard disk drives, floppy drives, permanent storage, and the like.

According to an aspect of the invention, there is provided a system for providing a service from a service-providing device to a client device. In the system, the service-providing device includes a database capable of storing a plurality of pieces of setting information, each of which includes one or more parameters relating to a service to be provided to the client device, while associating each of the plurality of setting information with an identification of the client device, a registering unit that obtains setting information from the client device if a registration request signal requesting registration for a service is received from the client device, and registers the obtained setting information in the database while associating the obtained setting information with the identification of the client device, a providing unit that provides a service to the client device in accordance with the setting information relating to the service to be provided to the client device, a service end judging unit that judges whether an end condition of a service corresponding to each of the plurality of pieces of setting information is satisfied, and a service terminating unit that deletes the setting information of a service judged to satisfy the end condition from the database so as to terminate the service satisfying the end condition.

In the system, the client device includes a usage registration unit that transmits the registration request signal to the service-providing device if a user input requesting a usage registration for a service to be received is received through an operation unit of the client device, obtains from a user the setting information relating to the service to be received, and transmits the setting information obtained from the user to the service-providing device, a setting information storing unit that copies the setting information, which the usage registration unit transmits to the service-providing device, to save the setting information in a storage unit of the client device, a function executing unit that executes a predetermined function relating to the service provided from the service-providing device and caused by an operation of the usage registration unit, a detecting unit that detects a service terminated by the service-providing device, from among services for which the usage registration has been made through the usage registration unit, and a re-registration unit that reads out the setting information corresponding to the terminated service from the storage unit if the terminated service is detected by the detecting unit, and transmits the setting information along with the registration request signal to the service-providing device to make a usage registration for the terminated service.

With this configuration, the setting information first provided to the service-providing device is stored in the client device, and the stored setting information is read out from the storage unit and is provided to the service-providing device at a stage of the re-registration. Therefore, the re-registration can be attained without requesting the user to re-input the setting information. That is, the re-registration for a service can be attained without requesting a user operation.

Optionally, the service terminating unit may transmit a notification indicating termination of the service satisfying the end condition to the client device which received the service when the service terminating unit terminates the service satisfying the end condition. In this case, the detecting unit may detect the service terminated by the service-providing device by receiving the notification from the service-providing device.

With this configuration, the termination of the service can be detected in the client device without difficulty.

Still optionally, the re-registration unit of the client device may include a re-registration judging unit that judges whether the terminated service needs a usage registration. In this case, the re-registration unit may make a usage registration for a service for which the re-registration judging unit judges that the usage registration is needed, and may not make a usage registration for a service for which the re-registration judging unit judges that the usage registration is not needed.

Since the usage registration is not performed for a service not requiring the re-registration, the re-registration is prevented from being performed without considering the user's intention.

In an example, the re-registration judging unit may analyze a factor of the termination of the terminated service detected by the detecting unit, and judges whether the terminated service needs a usage registration in accordance with a result of the analysis.

Since the client device judges whether the re-registration is necessary based on the judgment result of the factor, it becomes possible to decide whether to execute the re-registration without requiring a user operation.

In another example, the service terminating unit may transmit information concerning acceptance for re-registration of the terminated service to the client device which received the service when the service terminating unit terminates the service satisfying the end condition. In this case, the re-registration judging unit may judge whether the terminated service needs a usage registration in accordance with the information concerning acceptance for re-registration of the terminated service.

With this configuration, it is possible to control the execution of the re-registration on the client device from the service-providing device.

Optionally, the client device may include a permission judging unit that judges whether re-registration of the terminated service detected by the detecting unit is permitted in accordance with user-input information as to whether the re-registration of the service is permitted, and a re-registration inhibiting unit that inhibits re-registration of the terminated service for which the permission judging unit judges that the re-registration is not permitted.

Since the execution of the re-registration is controlled in accordance with the information designated by the user, it becomes possible to execute the re-registration according to the user's intention and without requiring a troublesome user operation.

Still optionally, the usage registration unit may include a permission information storing unit that requests the user to input information as to whether the re-registration of the service is permitted through the operation unit so as to obtain the user-input information, and stores the user-input information in the storage unit for each of services for which the usage registration has been made. The permission judging unit may judge whether re-registration of the terminated service is permitted in accordance with the user-input information stored in the permission information storing unit.

With this configuration, it is possible to obtain the information about the permission of the re-registration from the user at a stage of the first-time usage registration. Therefore, it becomes possible to quickly perform the re-registration in comparison with the case in which the information is obtained from the user after the service is finished.

Still optionally, the client device may include a message displaying unit that displays a message requesting a user to change a particular parameter in the setting information corresponding to the service to be registered by the re-registration unit after the termination of the service is detected by the detecting unit, and a setting information changing unit configured such that when a value of the particular parameter is newly inputted by the user through the operation unit, the setting information changing unit changes a value of the particular parameter stored in the storage unit to the newly inputted value of the particular parameter, and controls the re-registration unit to make the usage registration for the terminated service using the newly inputted value of the particular parameter.

With this configuration, it becomes possible to make a re-registration using the changed value of the particular parameter. Therefore, the re-registration can be performed without requiring a troublesome user operation even when the value of the particular parameter is not appropriate for the continuation of the service. It should be understood that such a situation may occur when the providing unit is modified (e.g., version up of service software is conducted), and thereby the parameter values become unavailable for the changed providing unit. Also, such a situation may occur when the information (e.g., news or posted comments) to be provided to the user becomes too much, or when a destination for the fee collection is found to be invalid.

Still optionally, the service end judging unit of the service-providing device may judges that the end condition of the service is satisfied if a particular event arises in the service. The service terminating unit of the service-providing device may transmit a factor of the termination of the service to the client device that received the service to be terminated when the service terminating device terminates the service, the factor relating to the particular event arising in the terminated service. In this case, the client device may include a parameter determining unit that determines the particular parameter based on the factor received from the service-providing device.

Since the particular parameter is determined according to the factor of the termination of the service, the re-registration can be performed appropriately while modifying the value of the particular parameter in response to the factor of the termination of the service.

Still optionally, the service end judging unit of the service-providing device may judge that the end condition of the service is satisfied if the one or more parameters of the setting information corresponding to the service can not be used for successfully continuing the service. The service terminating unit of the service-providing device may transmit information indicating an appropriate range of a parameter causing satisfaction of the end condition to the client device that received the service to be terminated. In this case, the message displaying unit of the client device may display the appropriate range of the parameter causing satisfaction of the end condition in addition to a message of requesting the user to change the parameter causing satisfaction of the end condition as a message requesting the user to change the particular parameter.

With this configuration, the instruction for changing the particular parameter can be securely notified to the user. Therefore, the user is prevented from inputting inappropriate values of the parameter through the operation unit. Consequently, the re-registration operation can be performed smoothly.

Still optionally, the client device may include a deleting unit that deletes at least a piece of setting information stored in the storage unit if a deletion command is inputted by a user through the operation unit.

Since the setting information stored in the storage unit can be deleted, leakage of the personal information is prevented from occurring when the client device is transferred from the user to another person.

According to another aspect of the invention, there is provided a communication device used in a system for providing a service from a service-providing device to the communication device. In this case, the service-providing device includes a database capable of storing a plurality of pieces of setting information, each of which includes one or more parameters relating to a service to be provided to the communication device, while associating each of the plurality of setting information with an identification of the communication device, a registering unit that obtains setting information from the communication device if a registration request signal requesting registration for a service is received from the communication device, and registers the obtained setting information in the database while associating the obtained setting information with the identification of the communication device, a providing unit that provides a service to the communication device in accordance with the setting information relating to the service to be provided to the communication device, a service end judging unit that judges whether an end condition of a service corresponding to each of the plurality of pieces of setting information is satisfied, and a service terminating unit that deletes the setting information of a service judged to satisfy the end condition from the database so as to terminate the service satisfying the end condition Further, the communication device includes a usage registration unit that transmits the registration request signal to the service-providing device if a user input requesting a usage registration for a service to be received is received through an operation unit of the communication device, obtains from a user the setting information relating to the service to be received, and transmits the setting information obtained from the user to the service-providing device, a setting information storing unit that copies the setting information, which the usage registration unit transmits to the service-providing device, to save the setting information in a storage unit of the communication device, a function executing unit that executes a predetermined function relating to the service provided from the service-providing device and caused by an operation of the usage registration unit, a detecting unit that detects a service terminated by the service-providing device, from among services for which the usage registration has been made through the usage registration unit, and a re-registration unit that reads out the setting information corresponding to the terminated service from the storage unit if the terminated service is detected by the detecting unit, and transmits the setting information along with the registration request signal to the service-providing device to make a usage registration for the terminated service.

With this configuration, the setting information first provided to the service-providing device is stored in the communication device, and the stored setting information is read out from the storage unit and is provided to the service-providing device at a stage of the re-registration. Therefore, the re-registration can be attained without requesting the user to re-input the setting information. That is, the re-registration for a service can be attained without requesting a user operation.

Optionally, the service terminating unit of the service-providing device may transmit a notification indicating termination of the service satisfying the end condition to the communication device which received the service when the service terminating unit terminates the service satisfying the end condition. In this case, the detecting unit may detect the service terminated by the service-providing device by receiving the notification from the service-providing device.

With this configuration, the termination of the service can be detected in the communication device without difficulty.

Still optionally, the re-registration unit may include a re-registration judging unit that judges whether the terminated service needs a usage registration. In this case, the re-registration unit may make a usage registration for a service for which the re-registration judging unit judges that the usage registration is needed, and may not make a usage registration for a service for which the re-registration judging unit judges that the usage registration is not needed.

Since the usage registration is not performed for a service not requiring the re-registration, the re-registration is prevented from being performed without considering the user's intention.

In an example, the re-registration judging unit may analyze a factor of the termination of the terminated service detected by the detecting unit, and judges whether the terminated service needs a usage registration in accordance with a result of the analysis.

Since the communication device judges whether the re-registration is necessary based on the judgment result of the factor, it becomes possible to decide whether to execute the re-registration without requiring a user operation.

In an another example, the service terminating unit of the service-providing device may transmit information concerning permission of re-registration of the terminated service to the communication device which received the service when the service terminating unit terminates the service satisfying the end condition. In this case, the re-registration judging unit may judge whether the terminated service needs a usage registration in accordance with the information concerning permission of re-registration for the terminated service.

With this configuration, it is possible to control the execution of the re-registration on the communication device from the service-providing device.

Optionally, the communication device may include a permission judging unit that judges whether re-registration of the terminated service detected by the detecting unit is permitted in accordance with user-input information as to whether the re-registration of the service is permitted, and a re-registration inhibiting unit that inhibits re-registration of the terminated service for which the permission judging unit judges that the re-registration is not permitted.

Since the execution of the re-registration is controlled in accordance with the information designated by the user, it becomes possible to execute the re-registration according to the user's intention and without requiring a troublesome user operation.

Still optionally, the usage registration unit may include a permission information storing unit that requests the user to input information as to whether the re-registration of the service is permitted through the operation unit so as to obtain the user-input information, and stores the user-input information in the storage unit for each of services for which the usage registration has been made. The permission judging unit may judge whether re-registration of the terminated service is permitted in accordance with the user-input information stored in the permission information storing unit.

With this configuration, it is possible to obtain the information about the permission of the re-registration from the user at a stage of the first-time usage registration. Therefore, it becomes possible to quickly perform the re-registration in comparison with the case in which the information is obtained from the user after the service is finished.

Still optionally, the communication device may include a message displaying unit that displays a message requesting a user to change a particular parameter in the setting information corresponding to the service to be registered by the re-registration unit after the termination of the service is detected by the detecting unit, and a setting information changing unit configured such that when a value of the particular parameter is newly inputted by the user through the operation unit, the setting information changing unit changes a value of the particular parameter stored in the storage unit to the newly inputted value of the particular parameter, and controls the re-registration unit to make the usage registration for the terminated service using the newly inputted value of the particular parameter.

With this configuration, it becomes possible to make a re-registration using the changed value of the particular parameter. Therefore, the re-registration can be performed without requiring a troublesome user operation even when the value of the particular parameter is not appropriate for the continuation of the service. It should be understood that such a situation may occur when the providing unit is modified (e.g., version up of service software is conducted), and thereby the parameter values become unavailable for the changed providing unit. Also, such a situation may occur when the information (e.g., news or posted comments) to be provided to the user becomes too much, or when a destination for the fee collection is found to be invalid.

Still optionally, the service end judging unit of the service-providing device may judge that the end condition of the service is satisfied if a particular event arises in the service. The service terminating unit of the service-providing device may transmit a factor of the termination of the service to the communication device that received the service to be terminated when the service terminating device terminates the service, the factor relating to the particular event arising in the terminated service. In this case, the commnunication device may include a parameter determining unit that determines the particular parameter based on the factor received from the service-providing device.

Since the particular parameter is determined according to the factor of the termination of the service, the re-registration can be performed appropriately while modifying the value of the particular parameter in response to the factor of the termination of the service.

Still optionally, the service end judging unit of the service-providing device may judge that the end condition of the service is satisfied if the one or more parameters of the setting information corresponding to the service can not be used for successfully continuing the service. The service terminating unit of the service-providing device may transmit information indicating an appropriate range of a parameter causing satisfaction of the end condition to the communication device that received the service to be terminated. In this case, the message displaying unit of the communication device may display the appropriate range of the parameter causing satisfaction of the end condition in addition to a message of requesting the user to change the parameter causing satisfaction of the end condition as a message requesting the user to change the particular parameter.

With this configuration, the instruction for changing the particular parameter can be securely notified to the user. Therefore, the user is prevented from inputting inappropriate values of the parameter through the operation unit. Consequently, the re-registration operation can be performed smoothly.

Still optionally, the communication device may include a deleting unit that deletes at least a piece of setting information stored in the storage unit if a deletion command is inputted by a user through the operation unit.

Since the setting information stored in the storage unit can be deleted, leakage of the personal information is prevented from occurring when the communication device is transferred from the user to another person.

According to another aspect of the invention, there is provided an image forming device, which is provided with the communication device described above, and an image forming unit that forms a image on a recording medium. The function executing unit of the communication device executes the predetermined function using the image forming unit.

An image forming device, such as a printer, frequently has a poor operation unit. If the communication device is provided to such an image forming device, the re-registration for the service can be performed without requiring a troublesome user operation.

According to another aspect of the invention, there is provided a service-providing device used in a system for providing a service from the service-providing device to a client device. The service-providing device includes a database capable of storing a plurality of pieces of setting information, each of which includes one or more parameters relating to a service to be provided to the client device, while associating each of the plurality of setting information with an identification of the client device, a registering unit that obtains setting information from the client device if a registration request signal requesting registration for a service is received from the client device, and registers the obtained setting information in the database while associating the obtained setting information with the identification of the client device, a providing unit that provides a service to the client device in accordance with the setting information relating to the service to be provided to the client device, a service end judging unit that judges whether an end condition of a service corresponding to each of the plurality of pieces of setting information is satisfied, and a service terminating unit that deletes the setting information of a service judged to satisfy the end condition from the database so as to terminate the service satisfying the end condition.

In this system, the client device includes a usage registration unit that transmits the registration request signal to the service-providing device if a user input requesting a usage registration for a service to be received is received through an operation unit of the client device, obtains from a user the setting information relating to the service to be received, and transmits the setting information obtained from the user to the service-providing device, a setting information storing unit that copies the setting information, which the usage registration unit transmits to the service-providing device, to save the setting information in a storage unit of the client device, a function executing unit that executes a predetermined function relating to the service provided from the service-providing device and caused by an operation of the usage registration unit, a detecting unit that detects a service terminated by the service-providing device, from among services for which the usage registration has been made through the usage registration unit, and a re-registration unit that reads out the setting information corresponding to the terminated service from the storage unit if the terminated service is detected by the detecting unit, and transmits the setting information along with the registration request signal to the service-providing device to make a usage registration for the terminated service.

With this configuration, the setting information first provided to the service-providing device is stored in the client device, and the stored setting information is read out from the storage unit and is provided to the service-providing device at a stage of the re-registration. Therefore, the re-registration can be attained without requesting the user to re-input the setting information. That is, the re-registration for a service can be attained without requesting a user operation.

According to another aspect of the invention, there is provided a system for providing a service from a server to a client device. In the system, the server includes a registration unit that obtains setting information relating to a service when receiving a request for registration for the service from the client device, a service providing unit that provides the service to the client device, and a judging unit that judges whether an end condition of the service is satisfied and transmits termination information relating to termination of the service satisfying the end condition. In the system, the client device includes a usage registration unit that transmits the request for registration to the server in response to a user input, receives the setting information relating to the service from a user so as to transmit the setting information to the server, and stores the setting information in a memory, a detecting unit that detects the terminated service based on the termination information transmitted from the server, and a re-registration unit configured such that if the terminated service is detected by the detecting unit, the re-registration unit reads out the setting information from the memory, and transmits the setting information along with the request for registration to the server to make a usage registration for the service.

With this configuration, the setting information first provided to the service-providing device is stored in the client device, and the stored setting information is read out from the storage unit and is provided to the service-providing device at a stage of the re-registration. Therefore, the re-registration can be attained without requesting the user to re-input the setting information. That is, the re-registration for a service can be attained without requesting a user operation.

According to another aspect of the invention, there is provided a client device used in a system for providing a service from a server to the client device. The client device includes a usage registration unit that transmits a request for registration to the server in response to a user input, receives setting information relating to a service from a user so as to transmit the setting information to the server, and stores the setting information in a memory, a detecting unit that detects a terminated service based on termination information transmitted from the server, and a re-registration unit configured such that if the terminated service is detected by the detecting unit, the re-registration unit reads out the setting information from the memory, and transmits the setting information along with the request for registration to the server to make a usage registration for the service.

With this configuration, the setting information first provided to the service-providing device is stored in the client device, and the stored setting information is read out from the storage unit and is provided to the service-providing device at a stage of the re-registration. Therefore, the re-registration can be attained without requesting the user to re-input the setting information. That is, the re-registration for a service can be attained without requesting a user operation.

Illustrative Embodiments

Hereafter, an illustrative embodiment according to aspects of the invention will be described with reference to the accompanying drawings.

FIG. 1 is a block diagram of a communication system 1 according to the embodiment. As shown in FIG. 1, the communication system 1 includes digital multifunction devices (hereafter, refereed to as multifunction devices) 10, a directory server 20, and a function server 30 which are capable of communicating with each other via a wide area network NT (e.g., the Internet). The multifunction device 10, the directory server 20, and the function server 30 are connected to the wide area network NT via respective routers 2, 3 and 4.

The router 2 connects a sub-network including the multifunction devices 10 to the wide area network NT. That is, the router 2 relays data communication between a node in the sub-network and a node in the wide area network NT. More specifically, with regard to packets to be sent to devices (e.g., the multifunction device 10) in the sub-network, the router 2 passes only packets, which are judged to be responses to requests from the devices in the sub-network, to the sub-network, and blocks the other packets. That is, the router 2 serves as a fire wall that blocks unauthorized accesses to the multifunction device from the wide area network NT.

The multifunction device 10 has a telephone function, a scanner function, a printing function, a copying function, and a facsimile function. These data input/output functions of the multifunction device 10 can be used from the function server 30.

The function server 30 provides a plurality of types of services to a device (e.g., the multifunction device 10) in response to a request from the device (e.g., the multifunction device 10). The function server 30 executes an appropriate process (e.g., a periodical service offering process shown in FIG. 34) in response to the request type from the multifunction device 10.

Figure 8:
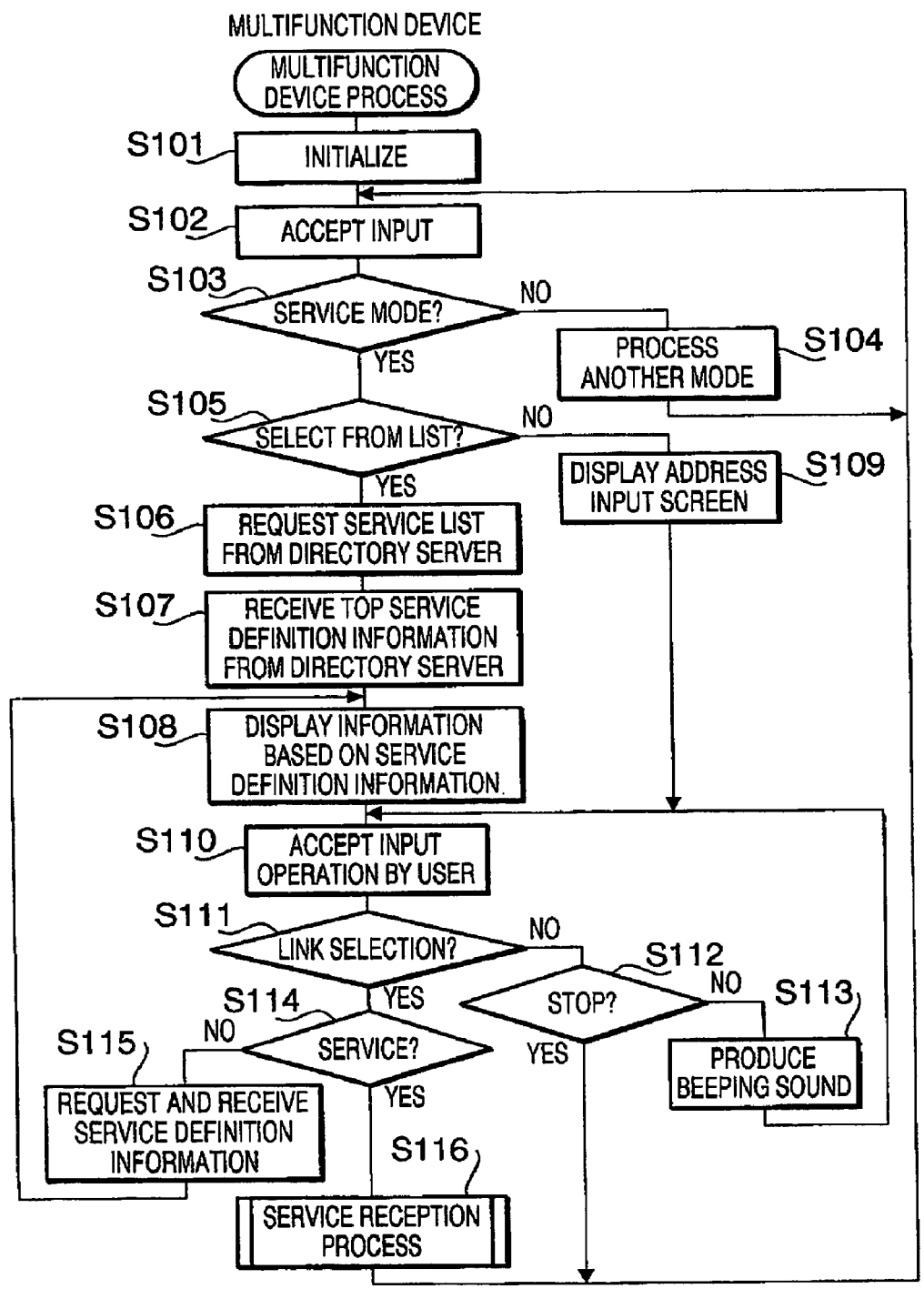
FIG. 8 is a flowchart illustrating a multifunction device process executed by a multifunction device according to aspects of the invention.
Figure 11:
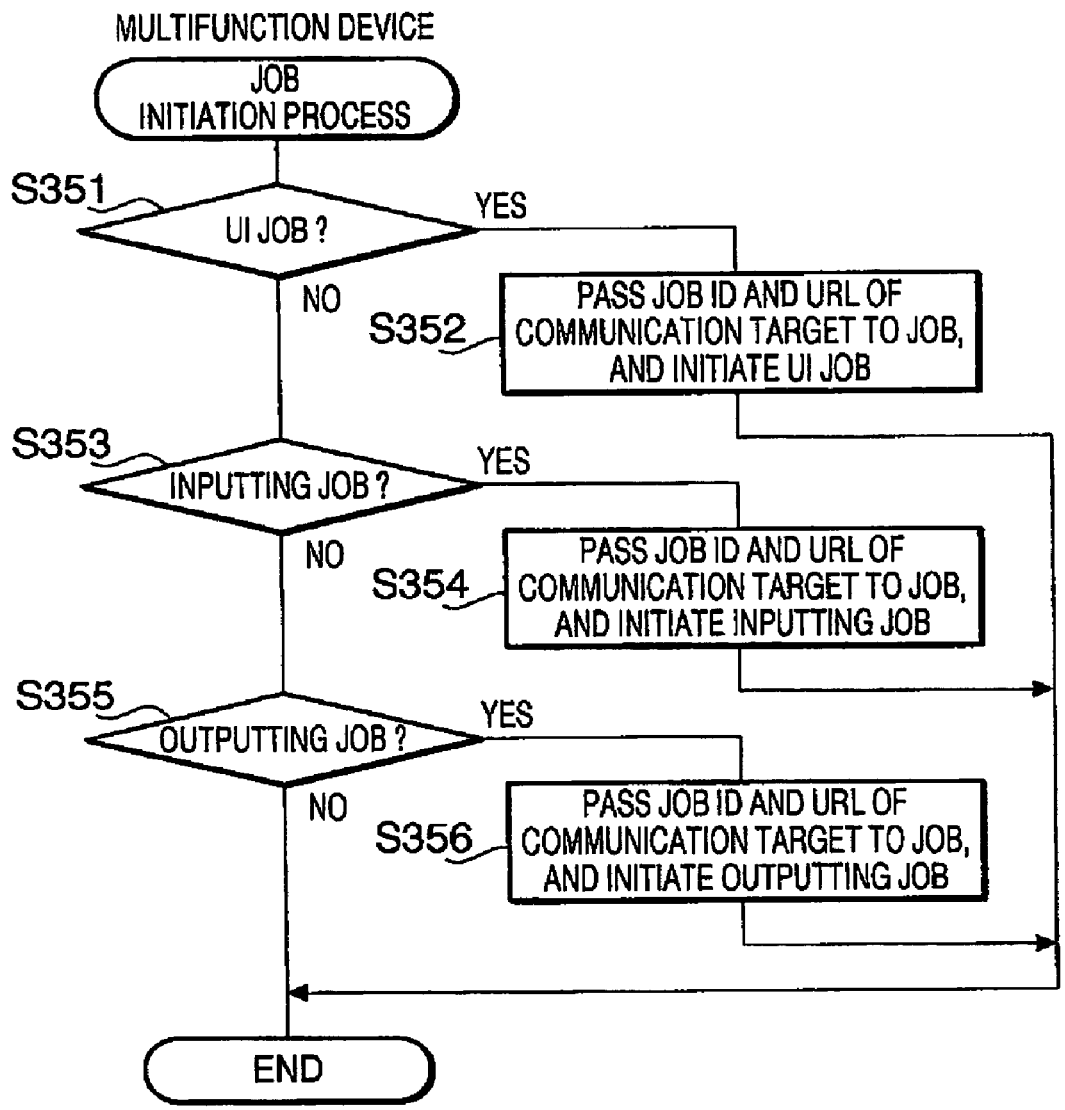
FIG. 11 is a flowchart illustrating a job initiation process executed by a multifunction device according to aspects of the invention.

To receive a service from the function server 30, the multifunction device 10 communicates with the function server 30 and initiates a process (e.g., a service reception process in step S116 of FIG. 8, and an output job in step S356 in FIG. 11). For example, the multifunction device 10 receives print data from the function server 30 in data communication relating to a certain service, and prints out the print data using the printing function.

The directory server 20 provides information relating to available services (to be provided by the function server 30) with the multifunction device 10.

Hereafter, configurations of the multifunction device 10, the directory server 20 and the function server 30 will be explained. As shown in FIG. 1, the multifunction device 10 includes a control unit 11, an operation unit 12, a reading unit 13, a recording unit 14, a communication unit 15, a storage unit 16, a sound input unit 17, a sound output unit 18, and a display unit 19. The control unit 11 includes a CPU (central processing unit), a ROM (read only memory) and a RAM (random access memory) not shown in FIG. 1, and controls various components in the multifunction device 10. In the ROM of the control unit 11, programs to be executed by the CPU for receiving the services are stored.

The operation unit 12 has keys (not shown) to be operated by a user. The operation unit 12 obtains information about key operations made by the user and passes the obtained information to the control unit 11. The reading unit 13 which serves as a scanner reads an image formed on (printed on) an original and generates image data corresponding to the read image. The recording unit which serves as a printer forms an image on a sheet using print data. The communication unit 15 conducts data processing for the data communication with a node (e.g., the directory server 20 or the function server 30) on the wide area network NT.

The storage unit 16 includes a non-volatile RAM in which various types of data is stored. The sound input unit 17 includes a microphone installed in a handset (not shown) of the multifunction device 10. The sound input unit 17 generates sound data (e.g. PCM data) representing the sound obtained by the microphone. The sound output unit 18 outputs sound via a speaker installed in the handset or a speaker installed in a main body of the multifunction device 10. The display unit 19 includes a display 19a on which various types of information to be notified to the user is displayed.

The directory server 20 includes a control unit 21, a communication unit 22, and a storage unit 23. The control unit 21 includes a CPU, a ROM and a RAM not shown in FIG. 1, and controls various components in the directory server 20. In the ROM of the control unit 21, programs to be executed by the CPU of the control unit 21 are stored.

The communication unit 22 conducts data processing for the data communication through the wide area network NT. The storage unit 23 includes an HDD (hard disk drive) in which various types of information is stored. Specifically, the storage unit 23 has a service definition information area 24 in which pieces of service definition information 25 are stored. The service definition information 25 is information regarding services (e.g., the type of each service, and a URL (uniform resource locator) of a destination device of each service) which the function server 30 is able to provide.

If a display command instructing the multifunction device 10 to display a service selection screen is inputted by a user through use of the operation unit 12, the multifunction device 10 operates to obtain the service definition information 25 from the directory server 20. Using the obtained service definition information 25, the control unit 11 of the multifunction device 10 displays a service selection screen (see FIGS. 2A and 2B) representing the type of each service on the display 19a so as to allow a user to select a desirable service.

In the storage unit 23 of the directory server 20, the services provided by the function server 30 is categorized into a plurality of categories including "a print service", "a copy application service" and "an information supply service". In an onscreen representation process of the service selection screen, the multifunction device 10 displays the categories first as shown in FIG. 2A. If one of the categories is selected by the user, services belonging to the selected category are displayed as shown in FIG. 2B.

In the service definition information area 24, the service definition information 25 is prepared for each of a top level screen shown in FIG. 2A (corresponding to the categories) and a screen (corresponding to the services belonging to the selected category) shown in FIG. 2B, so that the onscreen representation process mentioned as above can be attained.

FIG. 3 shows an example of XML (eXtensible Markup Language) data to be used as the service definition information 25 for the top level screen. FIG. 4 shows an example of XML data to be used as information of services belonging to one of the categories. As can be seen from FIGS. 3 and 4, each data is described in XML. Explanations about tags used in the XML data shown in FIGS. 3 and 4 are shown in a TABLE 1 below.

TABLE 1

| DATA NAME | | DATA TYPE | REMARKS |
|---|---|---|---|
| Basic data | ID | integer | identification of service definition information |
| | Title | string | title to be displayed |
| | Type | 'MENU' or 'FORM' | Type of the body data. If the type is 'MENU', a link list to another information is defined. If the type is 'FORM', a data input form is defined. |

TABLE 1-continued

| DATA NAME | | DATA TYPE | REMARKS |
|---|---|---|---|
| Body data (If Type is 'MENU') | Num Link | integer | The type is 'MENU' for the service definition information. the number of pieces of Link data |
| | Link[ ] | | Link data |
| Link data | Link_Title | string | string about service or information regarding a destination of link |
| | Link_Location | string | URL for designating a service, or ID of another service definition information |

If the multifunction device 10 receives the service definition information of a top level screen, the service selection screen shown in FIG. 2A is displayed on the display 19a. Specifically, words "DIRECTORY SERVICE" is displayed as a "Title" on a top of the service selection screen of FIG. 2A. Under the "Title", words "PRINT SERVICE", "COPY APPLICATION SERVICE" AND "INFORMATION SUPPLY SERVICE" are displayed as items representing selectable categories ("Link_Title") on the display 19a.

Since an ID (Link_Location) is associated with each item (each category), if information about a user operation for selecting an item is inputted to the control unit 11 via the operation unit 12, the control unit 11 displays a service selection screen corresponding to the selected category using the ID of the selected item.

For example, if the "INFORMATION SUPPLY SERVICE" is selected on the top level service selection screen shown in FIG. 2A, the service selection screen for the services corresponding to the category of "INFORMATION SUPPLY SERVICE" is displayed as shown in FIG. 2B. More specifically, on the service selection screen of FIG. 2B, words "INFORMATION SUPPLY SERVICE" are displayed as a "Title" at a top portion, and words "BLOG SEARCH SERVICE", "NEWS SERVICE", "X TYPE INFORMATION SERVICE", and "Y TYPE INFORMATION SERVICE" are displayed as items representing selectable services (Link_Title). As shown in FIG. 2B, the service selection screen may be configured such that a user can view all of the items by scrolling the list of the items if all of the items can not be displayed on the display 19a at a time due to the size of the display 19a.

Each item is associated with a URL (Link_Location) for calling a service so that the control unit 11 can access a destination server designated by a URL corresponding to an item selected by the user through use of the operation unit 12. By accessing the destination server, the multifunction device 10 can receive the service from the server (i.e., the function server 30). Specifically, the multifunction device 10 accesses a DNS (domain name system) server 40 to obtain an IP (internet protocol) address of the destination server and then accesses the destination server using the obtained IP address.

Next, the configuration of the function server 30 will be explained. The function server 30 includes a control unit 31, a communication unit 32 and a storage unit 33. The control unit 31 includes a CPU, a ROM and a RAM not shown in FIG. 1, and controls various components in the function server 30. In the ROM of the control unit 31, programs to be executed by the CPU for providing services are stored.

The communication unit 32 conducts data processing for the data communication through the wide area network NT. The storage unit 33 includes an HDD (hard disk drive) in which various type of information is stored. Specifically, the storage unit 23 has a service I/F (interface) information area 34 for storing pieces of service I/F (interface) information 36, and a service software area 35 for storing pieces of service software 37.

The pieces of service software 37 correspond to the respective services that the function server 30 can provide. By executing one of the pieces of service software 37, the function server 30 provides a required service for a client device (e.g., the multifunction device 10). Each of the pieces of the service I/F information 36 is used to request parameters, which is required to execute a corresponding service, to the multifunction device 10. The pieces of the service I/F information 36 respectively correspond to the services that the function server 30 can provide.

When the multifunction device 10 receives the service I/F information 36 from the function server 30, the multifunction device 10 generates a parameter input screen using the received service I/F information 36 and display the parameter input screen on the display 19a (see FIGS. 5A to 5C) so as to request a user to input parameters to be set.

FIGS. 6 and 7 show examples of the service I/F information 36. FIG. 6 is an example of the service I/F information 36 used for a blog search service in which comments newly posted on so-called blog (Weblog) sites are searched so as to find comments containing keywords set by a user, print data corresponding to the found comments is generated, and the print data is printed from the recording unit 14 of the multifunction device 10. FIG. 7 is an example of the service I/F information 36 used for a local news service in which news data contained in a certain database is searched so as to find local news data corresponding to a region designated by a user, print data corresponding to the found local news data is generated, and the print data is printed from the recording unit 14 of the multifunction device 10.

The service I/F information 36 shown in each of FIGS. 6 and 7 is described by a markup language which is the same as that of the service definition information 25. Definitions of tags used in the service I/F information 36 in FIGS. 6 and 7 are explained in a TABLE 2 below. In the TABLE 2, the basic data is equivalent to those shown in the TABLE 1.

TABLE 2

| | DATA NAME | DATA TYPE | REMARKS |
|---|---|---|---|
| Basic data | ID | integer | identification of service I/F information |
| | Title | string | title to be displayed |
| | Type | 'MENU' or 'FORM' | Type of the body data. If the type is 'MENU', a link list to another information is defined. If the type is 'FORM', a data input form is defined. The type is 'FORM' for the service I/F information. |
| Body data (IF TYPE IS 'FORM') | Action | URL string | URL of a program to be processed using input data |
| | Num_Form_Elem | integer | the number of "Form_Elem"s |
| | Form_Eim[ ] | — | From element data depending on Type |
| From_Elem data (Form element data) | Form_Type | 'Text' or 'Password' or 'Select' | Type of Form elements |
| Form_Data data ('Text' or 'Password') | Form_Data | — | Data depending on Type |
| | Disp_Name | string | explanation about input item |
| | Value_Name | string | A name of a variable used to send as data |
| | Max_Byte | integer | The maximum number of bytes of a string |
| | Default_String | string | A string to be initially displayed on a input area |
| Form_Data data (Select) | Disp_Name | string | explanation about input item |
| | Value_Name | string | A name of a variable used to send as data |
| | Multi_Select | 0 or 1 | 0: multiple selection is not allowed 1: multiple selection is allowed |
| | Num_Option | integer | the number of selection items |
| | Option[ ] | — | information about selection items |
| Option data | Disp_Select | string | string representing options |
| | Disp_Value | string | value to be sent as data when it is selected |
| | Default_Select | 0 or 1 | 0: not selected in an initial state 1: selected in an initial state |

If the service I/F information 36 is received by the multifunction device 36, a parameter input screen shown in FIG. 5A is displayed on the display 19a of the multifunction device 10. Specifically, as shown in FIG. 5A, words 'BLOG SEARCH SERVICE' are displayed on a top portion of the screen as a 'Title'. Under the 'Title', words 'SEARCH KEY 1' are displayed as an input item ('Disp_Name'). Under the words 'SEARCH KEY 1', an input field for inputting search keys corresponding to the input item 'SEARCH KEY 1' is displayed. In the input field, words (keys) inputted by a user through use of the operation unit 12 are displayed.

In the example shown in FIG. 6, the input items for the blog search service include three items of 'SEARCH KEY 1', 'SEARCH KEY 2' and 'SEARCH KEY 3', and all of the three input items can not be displayed on the display 19a at a time. Therefore, in the parameter input screen, triangle marks are provided at left and right end portions thereof so as to allow a user to scroll the screen in a lateral direction. If a user operates the operation unit 12 to scroll the screen, another parameter input screen is displayed according to the user operation. The parameter input screen for the input item 'SEARCH KEY 2' or 'SEARCH KEY 3' may be the same as that of the 'SEARCH KEY 1'.

If the service I/F information 36 shown in FIG. 7 is received by the multifunction device 10, the multifunction device 10 generates a parameter input screen and displays it on the display 19a (see FIG. 5B). Specifically, as shown in FIG. 5B, words 'LOCAL NEWS SERVICE' are displayed on a top portion of the screen as a 'Title'. Under the 'Title', words 'REGION' are displayed as an input item ('Disp_Name'). Under the words 'REGION', words 'HOKKAIDOH', 'KANTOH', 'TOUKAI' are displayed as selectable parameters ('Disp_Select') for the input item 'REGION'. The parameter input screen may be configured so that a user can view items other than those shown in FIG. 5B by scrolling the screen vertically.

The input items ('Disp_Name') for the 'LOCAL NEWS SERVICE' include 'PREPAID CARD NUMBER', 'NUMBER OF SHEETS FOR COLLECTING INFORMATION' in addition to the 'REGION', and these items can not be displayed on the display 19a at a time. Therefore, in the parameter input screen, triangle marks are provided on left and right sides of the input item so as to allow a user to scroll the screen in a lateral direction. If a user operation for scrolling the screen is conducted by use of the operation unit 12, a parameter input screen for another input item is displayed. For example, a user operation for scrolling the screen rightward is conducted by a user, a parameter input screen for an input item 'PREPAID CARD NUMBER' is displayed on the display 19a (see FIG. 5C).

In the parameter input screen for the input item 'PREPAID CARD NUMBER' shown in FIG. 5C, an input field for inputting a prepaid card number is displayed. In the input field, words inputted by a user through use of the operation unit 12 are displayed. In a parameter input screen for the input item 'NUMBER OF SHEETS FOR COLLECTING INFORMATION', an input field for inputting the number sheets used to print out the news is displayed (not shown in FIG. 5C).

The parameters (including strings displayed in the input field) inputted by a user through each parameter input screen are sent to a program (which is designated by a URL ('Action') and runs on the function server 30 using the received parameters) if the input is confirmed by the user through use of the operation unit 12.

Hereafter, communication between the directory server 20 and the function server 30 will be explained. In this embodiment, an HTTP (HyperText Transfer Protocol) is used as a communication protocol among the multifunction device 10, the directory server 20 and the function server 30. Using messages which can be contained in an HTTP request or an response to an HTTP request, commands and responses are exchanged among the multifunction device 10, the directory server 20 and the function server 30.

Commands are categorized into first type commands to be sent from the multifunction device 10 to the server 20 or 30 (server commands) and second type commands (multifunction device commands) to be sent from the server 20 or 30 to the multifunction device 10. In any of communications regarding these commands, the multifunction device 10 serves as a client device (sending an HTTP request), so that the packets to be forwarded from the server 20 or 30 to the multifunction device 10 will not be blocked by the router 20.

Specifically, the multifunction device 10 sends a command to the directory server 20 or the function server 30 by using a message accompanying an HTTP request or a POST command. If the server 20 or 30 has a command (a multifunction device command) to be sent to the multifunction device 10, the server accompanies a message (in an HTTP response to the HTTP request or the POST command from the multifunction device 10) with the multifunction device command.

Hereafter, processes executed by the multifunction device 10, the directory server 20 and the function server 30 will be described. First, a multifunction device process to be executed by the multifunction device 10 will be explained with reference to FIG. 8. FIG. 8 is a flowchart illustrating the multifunction device process which is executed under control of the control unit 11 of the multifunction device 10. The multifunction device process is initiated immediately when the power of the multifunction device 10 is turned to ON.

First, in step S101, the control unit 11 executes a initializing process for the multifunction device 10. Then, in step S102, the control unit 11 accepts a command input. The command input means an input for instructing the multifunction device 10 to execute a certain process. For example, the command input is a key input inputted by a user through use of the operation unit 12 or a command transmitted from an external computer.

In step S103, the control unit judges whether the accepted command input us a command instructing the multifunction device 10 to change to a service mode. If the command input is not the command instructing the multifunction device 10 to change to the service mode (S103: NO), control proceeds to step S104 where a process for another mode corresponding to an input accepted in step S102 is executed. For example, a print out process for printing out data transmitted from the external computer may be executed in step S104. Then, control returns to step S102.

If the command input is the command instructing the multifunction device 10 to change to the service mode (S103: YES), control proceeds to step S105. In step S105, the control unit 11 displays a selection screen; requesting a user to decide whether the user wants to select a desirable service (to be requested to the function server 30) from a list or to designate directly a URL of a destination of a desirable service, on the display 19a. Then, the control unit 11 waits for a user input. If the user input is accepted, the control unit 11 judges whether or not a service to be requested to the function server 30 should be selected form a service list (S105).

If it is judged in step S105 that a service to be requested to the function server 30 should be selected form a service list (S105: YES), control proceeds to step S106 where the control unit 11 sends a request for a service list to the directory server 20. More specifically, in step S106, the control unit 11 sends a request for top level service definition information 25 (see FIG. 3) to the directory server 20. The multifunction device 10 may be configured to have a URL for requesting the top level service definition information in the storage unit 23.

Next, in step S107, the control unit 11 receives the top level service definition information from the directory server 20 via the communication unit 15. In step S108, the control unit 11 generates a service selection screen using the service definition information received in step S107 and displays the screen on the display 19a (see FIG. 2A). Then, control proceeds to step S110.

If it is judged in step S105 that a service to be requested to the function server 30 is not selected form a service list (S105: NO), control proceeds to step S109 where control unit 11 generates a input screen for allowing a user to directly input a URL and displays the input screen on the display 19a. Then, control proceeds to step S110.

In step S110, the control unit 11 waits for a user operation performed via the operation unit 12 on the service selection screen or the input screen. If the user operation is performed, control proceeds to step S111 where the control unit 11 judges whether the user operation is an operation for selecting a link. Specifically, in step S111, the control unit 11 judges that the user operation is the operation for selecting a link if a selection is made successfully by a user on the service selection screen displayed at step S108 or if a URL is successfully inputted to the input screen displayed at step S109.

If the user operation is not an operation for selecting a link (S111: NO), control proceeds to step S112 where the control unit 11 judges whether the user operation accepted at step S10 is an operation for ending the service mode. If the user operation is an operation for ending the service mode (S112: YES), control returns to step S102. That is, in this case the process as a service mode terminates.

If it is judged in step S112 that the user operation is not an operation for ending the service mode (S112: NO), control proceeds to step S113 where the control unit 11 produces a beeping sound. Then, control returns to step S110. That is, if the user operation accepted in step S110 is not an operation for selecting a link and is not an operation for ending the service mode, the beep sound is produced so as to notify a user that a user operation is invalid.

If the user operation is an operation for selecting a link (S111: YES), control proceeds to step S114 where the control unit 11 judges whether the selected link is represented by a URL for a service.

If the selected link is not represented by a URL a service (i.e., the selected link is an ID of the service definition information or is represented by a URL of the directory server 20) (S114: NO), control proceeds to step S115. In step S115, the control unit 11 analyzes an ID of service definition information 25 designated by 'Link_Location' (or the control unit 11 analyzes a URL if the URL is directly inputted by a user) and sends a request for the service definition information 25 to the directory server 25. Then, the control unit 11 receives the requested service definition information from the directory server 20. Then, control returns to step S108 so as to display a new service selection screen the display 19a.

If the selected link is represented by a URL of a service (S114: YES), control proceeds to step S116. In step S116, the control unit 11 assign a URL (a URL designated in 'Link_ Location' of the service definition information or a directly inputted URL) of a selected link to an argument and executes a service reception process for receiving a service (see FIG. 10). After the step S116 is finished, control returns to step S102.

Figure 9:
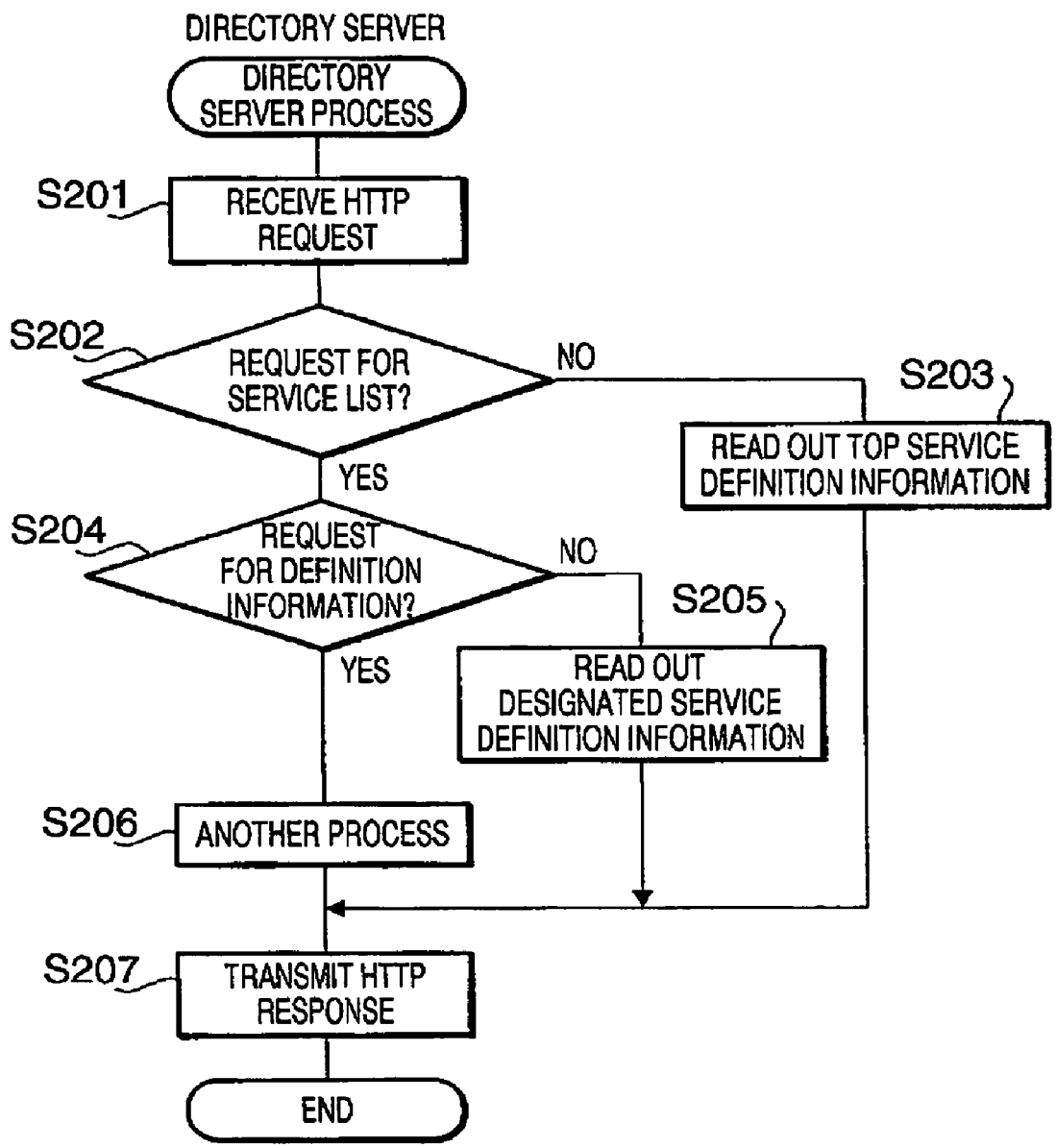
FIG. 9 is a flowchart illustrating a directory server process executed by a directory server according to aspects of the invention.

Hereafter, a process (a directory server process) performed by the directory server 20 for processing a request for a service list (sent by the multifunction device 10 at step S110) and a request for service definition information 25 will be explained with reference to FIG. 9. FIG. 9 is a flowchart illustrating the directory server process executed under control of the control unit 21 of the directory server 20.

First, the control unit 21 waits for an HTTP request (S201). If the control unit 21 receives an HTTP request, control proceeds to step S202. In step S202, the control unit 21 judges whether the request received in step S201 is a request for a service list. If the HTTP request is a request for a service list, control proceeds to step S203 where the control unit 21 reads out top level service definition information 25 from the service definition information area 24. Then, control proceeds to step S207 where the control unit 21 generates an HTTP response containing the obtained service definition information 25 and sends the HTTP response to a sending device. After the step S207 is finished, the directory server process terminates.

If it is judged in step S202 that the request received in step S201 is not a request for a service list (S202: NO), control proceeds to step S204. In step S204, the control unit 21 judges whether the HTTP request received in step S201 is a request for service definition information 25. If the HTTP request is a request for service definition information 25 (S204: YES), control proceeds to step S205 where the control unit 21 reads out the requested service definition information 25 from the service definition information area 24 of the storage unit 23. Then, control proceeds to step S207 where the control unit 21 generates an HTTP response containing the obtained service definition information 25 and sends the HTTP response to a sending device. After the step S207 is finished, the directory server process terminates.

If it is judged in step S204 that the HTTP request not is a request for service definition information 25 (S204: NO), control proceeds to step S206 where the control unit 21 processed the HTTP request received in step S201. Then, the control unit 21 generates a HTTP response containing a processing result, and sends the HTTP response to a sending device. After the step S207 is finished, the directory server process terminates.

Figure 10:
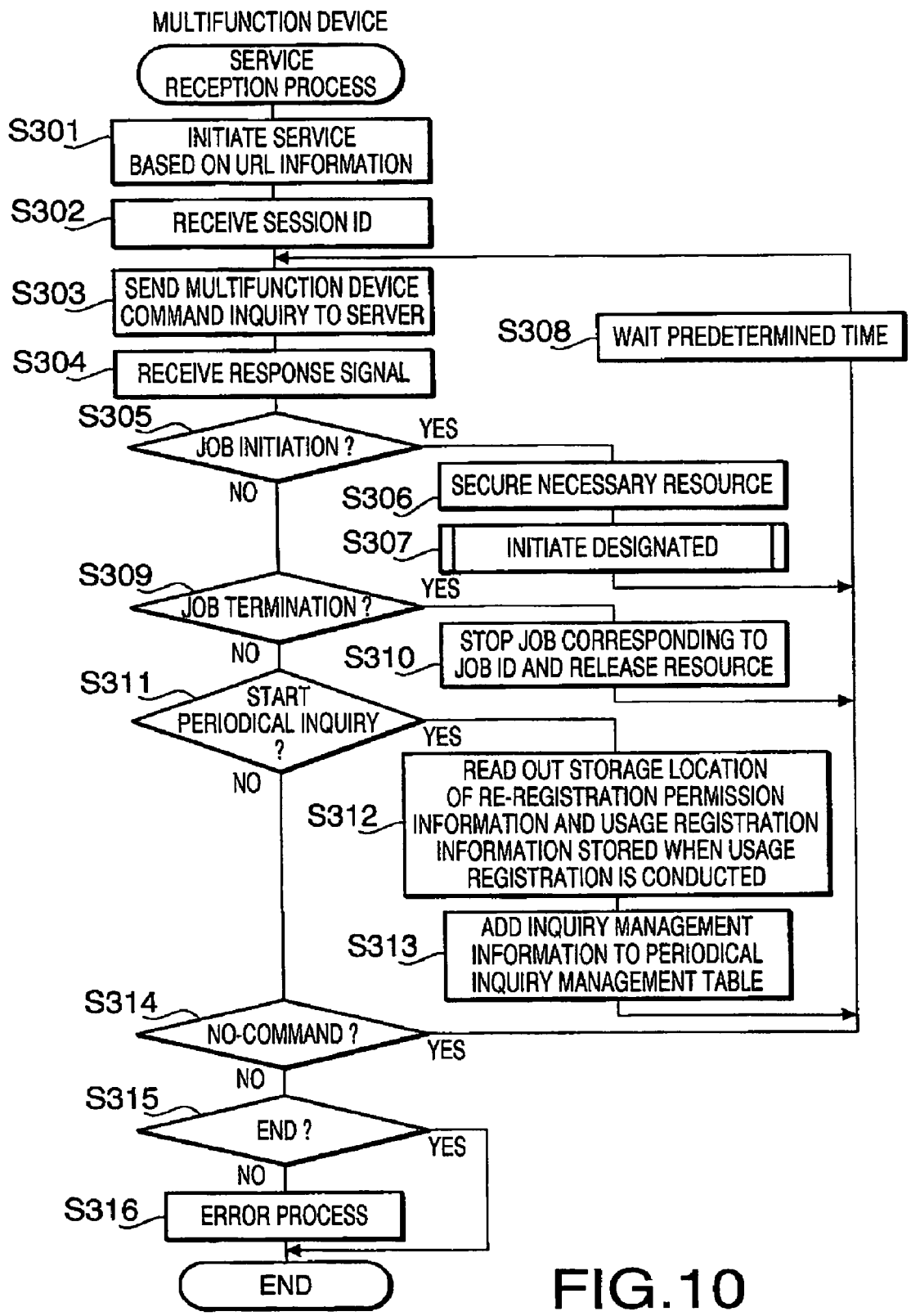
FIG. 10 is a flowchart illustrating a service reception process executed by the multifunction device according to aspects of the invention.

Hereafter, the service reception process executed at step S116 of the multifunction process will be explained with reference to FIG. 10. The service reception process is executed under control of the control unit 11 of the multifunction device 10. First, the control unit 11 sends an HTTP request to a destination device having a URL designated by the argument so as to cause the destination device (i.e., the function server 30) to initiate a process of a service corresponding to the URL designated by the argument (S301).

Next, in step S302, the control unit 11 receives a session ID from the function server 30. As described later, the session ID is generated in step S405 of a function server process (FIG. 12) and is provided to the multifunction device 10 in step S409 of the function server process.

Next, in step S303, the control unit 11 sends an inquiry about a multifunction device command (hereafter, referred to as a multifunction device command inquiry) to the multifunction device 30. The multifunction device command inquiry contains the session ID received in step S302.

Next, the control unit 11 receives a response (i.e., an HTTP response) to the multifunction device command inquiry (S304). Then, the control unit 11 judges whether the response to the multifunction device command inquiry is a job initiation command (S305). As described later, the job initiation command is outputted by the control unit 31 of the function server 30, for example, in steps S603 and S1703. The job initiation command contains an job ID for designating a job type, and a URL of an destination device with which the multifunction device 10 communicate during the execution of the job.

If the response is the job initiation command (S305: YES), control proceeds to step S306 where the control unit 11 secures resources required for executing the job. In step S307, the control unit 11 executes a job initiation process (see FIG. 11). Then, control proceeds to step S308 where the control unit 11 waits until a predetermined time has elapsed. After step S308, control returns to step S303.

If it is judged in step S305 the response is not the job initiation command (S305: NO), control proceeds to step S309. In step S309, the control unit 11 judges whether the response is a job end command for terminating a job. As described later, the job end command is outputted by the control unit 31 of the function server 30, for example, in steps S610 and S1708. The job end command contains the job ID used to terminate the job.

If it is judged in step S309 that the response is the job end command (S309: YES), control proceeds to step S310. In step S310, the control unit 11 sends a end command to the job corresponding to the job ID contained in the job end command so that the job is terminated and the resources used by the job are released. Then, control proceeds to step S308.

If it is judged in step S309 that the response is not the job end command (S309: NO), control proceeds to step S311. In step S311, the control unit 11 judges whether the response is a start command for instructing the multifunction device 10 to start periodical inquiries (hereafter, referred to as a periodical inquiry start command). As described later, the periodical inquiry start command is outputted by the control unit 31 of the function server 30, for example, in step S609.

If it is judged in step S311 that the response is the periodical inquiry start command (S311: YES), control proceeds to step S312. In step S312, the control unit 11 reads out storage location information and re-registration permission information from the RAM of the control unit 11. As described later, the storage location information and the re-registration permission information are temporarily stored in the RAM of the control unit 11 in step S858 (see FIG. 19). Next, in step S313, the control unit 11 writes inquiry management information in a table (hereafter, refereed to as a periodical inquiry management table) stored in the storage unit 16 (see FIG. 16A). A detailed explanation of step S313 will be made later along with the explanation about step S609 of FIG. 14. After step S313 is finished, control proceeds to step S308.

If it is judged in step S311 that the response is not the periodical inquiry start command (S311: NO), control proceeds to step S314 where the control unit 11 judges whether the response represents a no-command. If the response represents the no-command (S314: YES), control proceeds to step S308. If the response does not represent the no-command (S314: NO), control proceeds to step S315 where the control unit 11 judges whether the response is a service end command.

If the response is the service end command (S315: YES), the service reception process terminates. If the response is not the service end command (S315: NO), the control unit 11 executes an error process (e.g., a process for displaying a error message on the display 19a). Then, the service reception process terminates.

Hereafter, the job initiation process executed in step S307 of the service reception process will be explained with reference to FIG. 11. First, the control unit 11 judges whether the job initiation command is a UI (user interface) job initiation command (S351). The UI job initiation command is information notifying the multifunction device 10 of the use of an UI device (e.g., the operation unit 12) of the multifunction device 10.

If the job initiation command is the UI job initiation command (S351: YES), control proceeds to step S352. In step S352, the control unit 11 initiates a UI job (which will be described in detail later with reference to FIG. 18) and passes a job ID and a URL of a communication target device of the job. Then, the job initiation process terminates.

If the job initiation command is not the UI job initiation command (S351: NO), control proceeds to step S353. In step S353, the control unit 11 judge whether the job initiation command is an inputting job initiation command. The inputting job initiation command is information notifying the multifunction device 10 of the use of an input device (e.g. the reading unit 13 or the sound input unit 17).

More specifically, in step S353, the control unit 11 judges that the job initiation command is the inputting job initiation command if the job initiation command is a scanner job initiation command (instructing the multifunction device 10 to receive a service from the function server 30 using the reading unit 13) or if the job initiation command is a voice job initiation command (instructing the multifunction device 10 to receive a service using the sound input unit 17).

If the job initiation command is the inputting job initiation command (S353: YES), control proceeds to step S354 where the control unit 11 initiates a inputting job and passes an job ID and an URL of a communication target device of the job. Then, the job initiation process terminates. When the inputting job is initiated, information of a targeted device (e.g., the reading unit 13 or the sound input unit 17) is passed to the inputting job.

By the execution of step S354, a communication process of the inputting job is started between the multifunction device 10 and the function server 30. Specifically, in the communication process of the inputting job, the control unit 11 generates data using the input device (e.g., the reading unit 13 or the sound input unit 17) in accordance with a request from the function server 30. That is, the control unit 11 generates data requested by the function server 30 and sends the data to the function server 30 so as to receive the service (e.g., a data publication service). It should be noted that the inputting job is executed in parallel with the service reception process.

If the job initiation command is NOT the inputting job initiation command (S353: NO), control proceeds to step S355 where the control unit 11 judges whether the job initiation command is an outputting job initiation command. The outputting job command is information notifying the multifunction device 10 of the use of an outputting device (e.g., the recording unit 14 or the sound output unit 18).

Specifically, the control unit 11 judges that the job initiation command is the outputting job initiation command if the jib initiation command is a print job initiation command (instructing the multifunction device 10 to receive a service form the function server 30 using the recording unit 14 (i.e., a printer) of the multifunction device 10 of if the job initiation command is a speaker job initiation command (instructing the multifunction device 10 to receive a service from the function server 30 using the sound output unit 18).

If the job initiation command is the outputting job command (S355: YES), control proceeds to step S356 where the control unit 11 initiates an outputting job (see FIG. 36) and passes a job ID and a URL of a communication target device of the job. Then, the job initiation process terminates. When the outputting job is initiated, information of an output target device (e.g., the recording unit 14 or the sound output unit 18) is passed to the outputting job. By the execution of step S356, a communication process of the outputting job is started between the multifunction device 10 and the function server 30. The outputting job is executed in parallel with the service reception process.

If it is judged in step S355 that the job initiation command is not the outputting job command (S355: NO), the job initiation process terminates without executing any jobs (the UI job, the inputting job and the outputting job).

Figure 12:
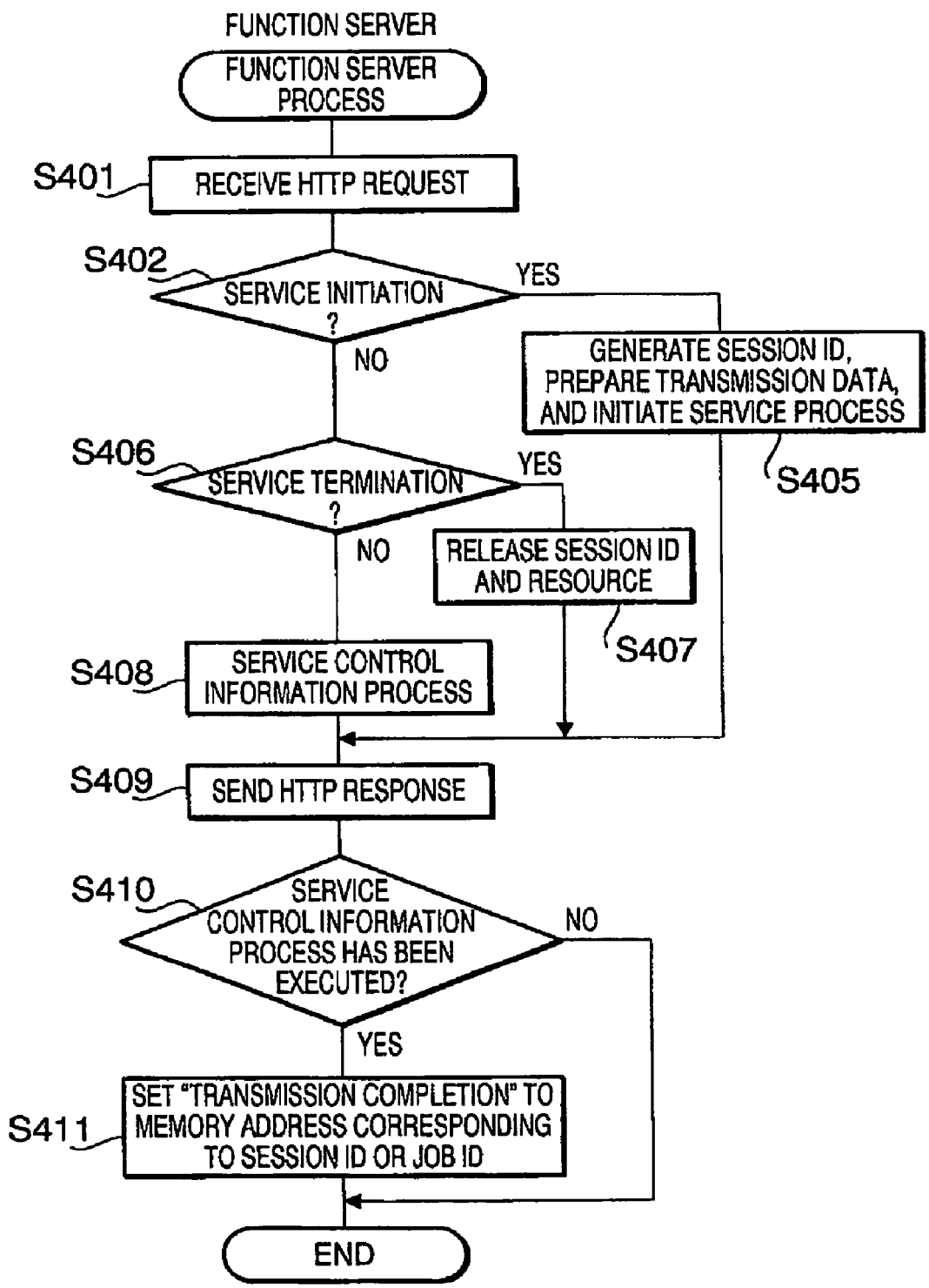
FIG. 12 is a flowchart illustrating a function server process executed by a function server according to aspects of the invention.

Hereafter, the function server process executed by the function server 30 which receives the service initiation command outputted by the multifunction device 10 in step S301 will be explained with reference to FIG. 12. The function server process of FIG. 12 is executed under control of the control unit 31 of the function server 30. it should be noted that a program for an function server process is prepared for each of the services.

Figure 14:
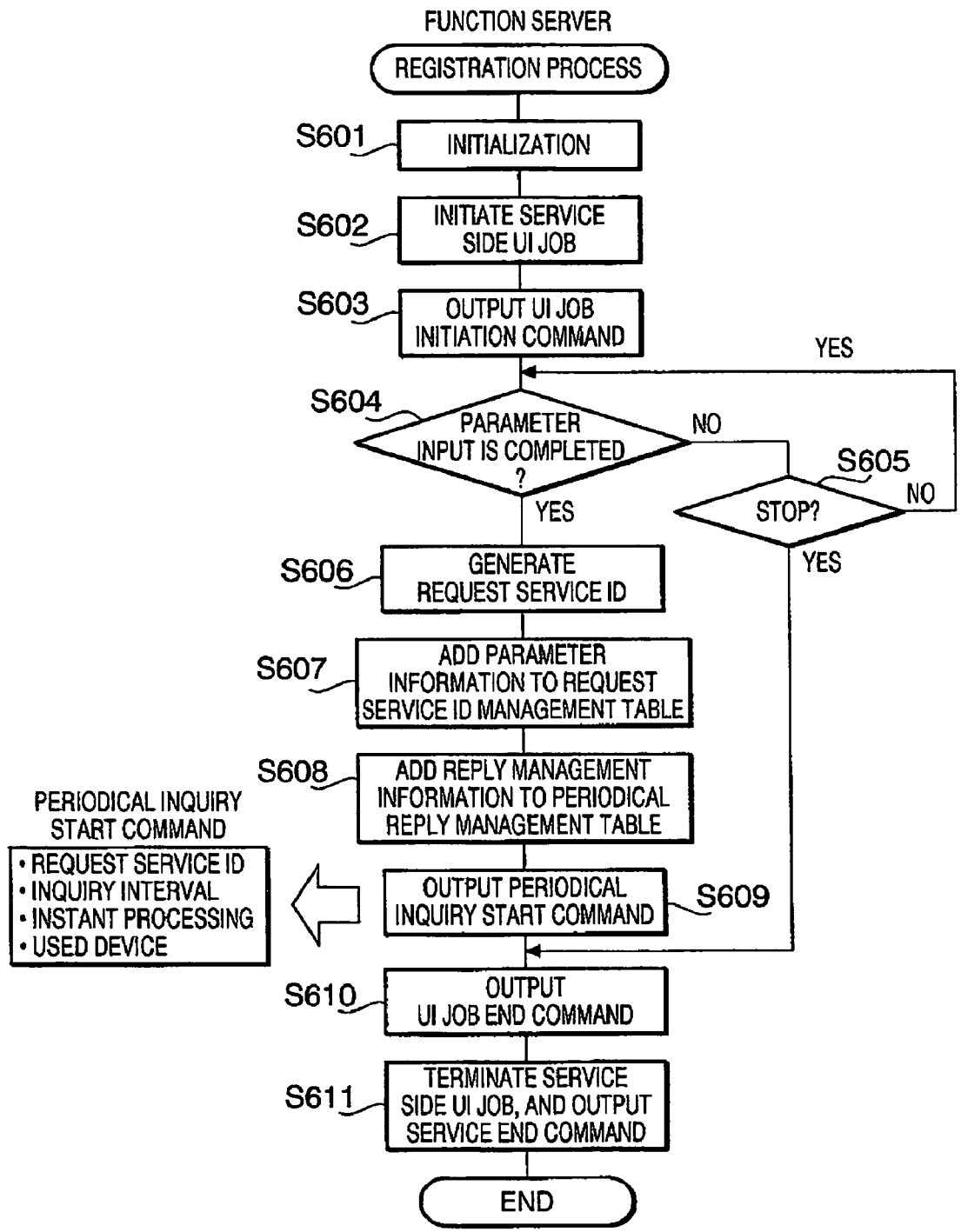
FIG. 14 is a flowchart illustrating a registration process executed by the function server according to aspects of the invention.

First, the control unit 31 waits for an HTTP request (S401). If the control unit 31 receives an HTTP request via the communication unit 32, the control unit 31 judges whether the received HTTP request is a service initiation request (S402). If the received HTTP command is a service initiation command (S402: YES), control proceeds to step S405 where the control unit 31 generates a session ID, prepares transmission data containing the session ID and initiates a process for a service. For example, if the function server process is a process for accepting user registration for an information supply service (e.g., a blog search service or a local news supply service), a registration process shown in FIG. 14 is initiated in step S405 as a process for a service. Then, control proceeds to step S409.

If the received HTTP request is not the service initiation command (S402: NO), control proceeds to step S406. In step S406, the control unit 31 judges whether the received HTTP request is a service termination request. If the received HTTP request is a service termination request (S406: YES), control proceeds to step S407. In step S407, the session ID and the resources are released. Then, control proceeds to step S409.

If the received HTTP request is not the service end command (S406: NO), the control unit 31 executes a service control information process show in FIG. 13 (S408). Then, control proceeds to step S409. In step S409, the control unit 31 generates an HTTP response containing the transmission data generated in step S405, S407 or S408.

After step S409, the control unit 31 judges whether the service control information process has been executed (S410). If the service control information process has been executed (S410: YES), the control unit 31 sets a transmission completion flag stored at a memory address corresponding to the session ID or the job ID (S411). Then, the function server process terminates. If the service control information process has not been executed (S410: NO), the function server process terminates without executing step S411.

Figure 13:
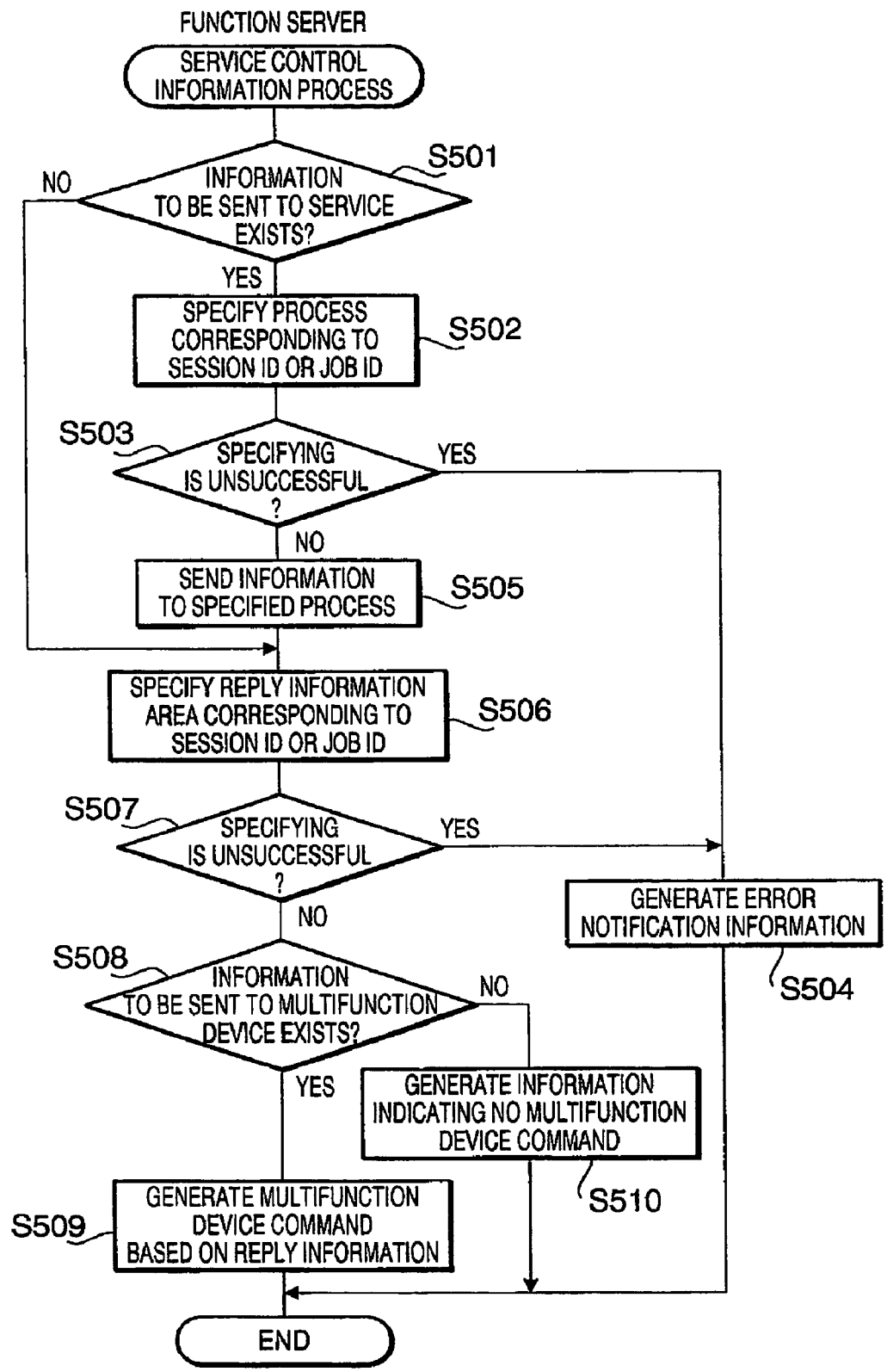
FIG. 13 is a flowchart illustrating a service control information process executed by the function server according to aspects of the invention

Hereafter, the service control information process executed in step S408 of the function server process will be explained with reference to FIG. 13. The service control information process is executed under control of the control unit 31 of the function server 30.

First, the control unit 31 judge whether information to be passed to a service exists (S501). More specifically, in step S501, the control unit 31 judges whether the HTTP request received in step S401 contains information about a process which attains a service specified by the session ID or the job ID.

If the information to be passed to the service (process) does not exist (S501: NO), control proceeds to step S506. If the information to be passed to the service (process) exists (S501: YES), control proceeds to step S502 where a process corresponding to the session ID or the job ID is specified. That is, in step S502, a process to which information contained in the received HTTP request is to be sent is specified.

If the process can not be specified (S503: YES), the control unit 31 generates error information as transmission data (S504). Then, the service control information process terminates. If the process is successfully specified (S503: NO), the information is passed to the specified process (S505).

Next, in step S506, a reply information area for storing reply information generated by a process corresponding to the session ID or the job ID is specified. If the reply information area can not be successfully specified (S507: YES), control proceeds to step S504. In step S504, error information is generated as transmission data to be contained in an HTTP response. Then, the service control information process terminates.

If the reply information area is successfully specified (S507: NO), control proceeds to step S508 where the control unit 31 judge whether reply information has been stored in the reply information area If the reply information has been stored in the area (S508: YES), control proceeds to step S509 where a multifunction device command is generated based on the reply information. Then, the service control information process terminates.

If the reply information has not been stored in the area (S508: NO), control proceeds to step S510 where information indicating no-multifunction device command is generated. Then, the service control information process terminates.

Hereafter, processes initiated in step S405 of the function serve process of FIG. 12 will be explained. The type of the process initiated in step S405 varies depending on the type of a service. Hereafter, a registration process for a service for periodically supply information (e.g., a log search service or a local news service) is explained as an example with reference to FIG. 14. The registration process of FIG. 14 is executed under control of the control unit 31 of the function server 30.

First, the control init 31 executes an initializing process in step S601. In step S602, the control unit 31 initiates a service side UI job (see FIG. 17). In step S603, the control unit 31 outputs a UI job initiating command as a multifunction device command. Specifically, in step S603, the control unit 31 writes the UI job initiation command in the reply information area By this configuration, the UI job initiation command is sent to the multifunction device 10 as a multifunction device command to the multifunction device 10 via the service control information process. The control unit 31 confirms the output by checking the set state of the transmission completion flag (which is set in step S411 of the function server process). It should be noted that the UI job initiation command contains a job ID and a URL of a communication target device of the job.

After step S603 is finished, the control unit 31 judges whether the parameter input is finished or not (S604). The completion of the parameter input is judged by the control unit 31 by judging whether the notification indication the completion of the parameter input is inputted to the registration process in step S711 of the service side UI job (see FIG. 17).

If it is judged in step S604 that the parameter input is not completed (S604: NO), control proceeds to step S605. In step S605, the control unit 11 judges whether the termination is notified. The notification of the termination is made in step S709 of the service side UI job (see FIG. 17).

If it is judged in step S605 that the termination is not notified (S605: NO), control returns to step S604. If it is judged in step S605 that the termination is not notified (S605: YES), control proceeds to step S610. If it is judged in step S604 that the parameter input is completed (S604: YES), control proceeds to step S606 where the control unit 31 generates a request service ID.

The request service ID is used to provide a service corresponding to the inputted parameters to the multifunction device 10 as an input source of parameters. The request service ID is unique to each of registrations of services, and is notified only to a input source (the multifunction device 10) in step S609.

After step S606, the control unit 31 writes the request service ID generated in step S606 and the inputted parameters (values representing the parameters) in a table (hereafter, referred to as a request service ID management table) stored in the storage unit 33 (S607). FIG. 15A shows an example of the request service ID management table.

As shown in FIG. 15A, the request service ID management table includes a request service ID, and parameter information representing the parameters inputted by the multifunction device 10 when the request service ID is generated. In the table, the parameter information is associated with each request service ID. Each request service ID management table is prepared for each of the types of registration processes. That is, each request service ID management table is prepared for each of the types of services. For example, a request service ID management table for a blog search service and a request service ID management table for a local news service may be generated and stored in the storage unit 33.

Specifically, in step S607, a request service ID and parameter information of the parameters sent from the multifunction device 10 are written in a request service ID management table of a current process.

Next, in step S608, the control unit 31 writes reply management information of the request service ID generated in step S606 in a periodical reply management table stored in the storage unit 33. FIG. 15B shows an example of the periodical reply management table stored in the storage unit 33.

As shown in FIG. 15B, the periodical reply management table includes a piece of reply management information for each of the request service IDs. Each of the pieces of reply management information includes service start information, a service URL, a service status, a inquiry date, service cancel information.

The service start information is information as to whether preparation for a service is completed. If the preparation for a service is completed, the service start information is represented as a value of "TRUE". If the preparation for a service is not completed, the service start information is represented as a value of "FALSE". The service URL represents a URL of the function server 30 which provides a service corresponding to a request service ID. The service status represents a status of the function server 30 which provides a service corresponding to a request service ID.

The service status is represented as "0" if the status of the service corresponding to the request service ID is normal. The service status is represented by a negative value (e.g. "-3") if the status of the service corresponding to the request service ID is abnormal.

The data of inquiry is information representing a last date when a periodical inquiry targeted for a request service ID is received. It should be noted that a current date is written in a inquiry date field of the periodical reply management table exceptionally if the writing operation is executed in step S608.

The service cancel information is information as to whether a service has been completed. If a service has been completed, the service cancel information is represented as "TRUE". If a service is running, the service cancel information is represented as "FALSE".

After step S608, the control unit 31 outputs a periodical inquiry start command as a multifunction device command (S609). Specifically, in step S609, the control unit 31 writes the periodical inquiry start command in the reply information area. By this writing operation, the periodical inquiry start command is passed to the multifunction device 10 via the service control information process of FIG. 13. It should be noted that the periodical inquiry start command includes a request service ID generated in step S606, inquiry interval information representing intervals of inquiry to be obeyed by the multifunction device 10, instant processing request information requesting the multifunction device 10 to make an inquiry immediately after a lapse of an interval, and used device information representing the type of an input/output device to be used to receive a service at the multifunction device 10 side.

As described above, if the control unit 11 of the multifunction device 10 receives the periodical inquiry start command, steps of S312 and S313 are processed. In steps S312 and S312, the control unit 11 writes the inquiry management information in the periodical inquiry management table (see FIG. 16A) based on the re-registration permission information, storage location information of usage registration information, and information contained in the periodical inquiry start command. Specifically, the inquiry management information includes a request service ID, request status information, inquiry interval information, remaining-time information, instant processing request information, used device information, storage location information of usage registration information, and re-registration permission information. FIG. 16A shows an example of the periodical inquiry management table stored in the storage unit 16 of the multifunction device 10. FIGS. 16B and 16C show examples of the usage registration information stored in the storage unit 16 of the multifunction device 10.

The request service ID, the inquiry interval information, the instant processing request information, and the used device information are identical to the respective pieces of information contained in the periodical inquiry start command. The request status information is information as to whether the service status is to be obtained from the function server 30 as a response to an inquiry. If the service status is to be obtained from the function server 30, the request status information is represented as "TRUE". If the service status is not to be obtained from the function server 30, the request status information is represented as "FALSE".

In step S313, the control unit 11 sets the request status information to "TRUE" ad writes it in the periodical inquiry management table. In this embodiment, the multifunction device 10 operates to changes the value of the request status information (to "FALSE" or "TRUE") in the periodical inquiry management table in accordance with a user operation conducted for changing the request status information by a user through use of the operation unit 12.

The remaining-time information represents a time remaining until a next inquiry time. In step S313, the remaining time identical to an inquiry interval is written in the periodical inquiry management table. However, the remaining-time information is updated successively in step S901 (which is described in detail later).

The usage registration information is generated and managed for each of the pieces of the inquiry management information (i.e., for each of the request service IDs). The usage registration information is information described in the service definition information which is used for the registration for the service corresponding to the inquiry management information. The usage registration information includes a service name as a value of a 'Link_Title' tag of a service corresponding to the selected link (obtained in step S111), a registration target URL representing a value of a 'Link_Location' tag (or a URL inputted through an address input screen), the service I/F information obtained from the registration target device ('Link_Location' device), the parameter information inputted by a user through the parameter input screen (e.g., FIGS. 5A to 5C) displayed in the display 19a in a parameter information transmission process (see FIG. 19).

The usage registration information shown in FIG. 16B is an example of usage registration information for a blog search service. The usage registration information shown in FIG. 16C is an example of usage registration information for a local news service.

The storage location information of the usage registration information stored in the periodical inquiry management table represents a memory address as a location of the usage registration information. The re-registration permission information represents permission or inhibition of the re-registration operation conducted through use of the operation unit 12 in response to an inquiry in step S856 (which is described in detail later). If the re-registration is permitted, the re-registration permission information is represented as "TRUE". If the re-registration is inhibited, the re-registration permission information is represented as "FALSE"

Returning now to FIG. 14, after step S609, control proceeds to step S610 where the control unit 31 outputs a UI job end command as the multifunction device command. Specifically, the control unit 31 writes the UI job end command in the reply information area corresponding to the session ID generated in step S405. By this writing operation, the UI job end command is passed to the multifunction device 10 as a multifunction device command via the service control information process of FIG. 13.

Next, the control unit 31 passes an end command to the service side UI job initiated in step S603 to terminate the service side UI job, and outputs a service end command as a multifunction device command. Then, the registration process terminates.

Figure 17:
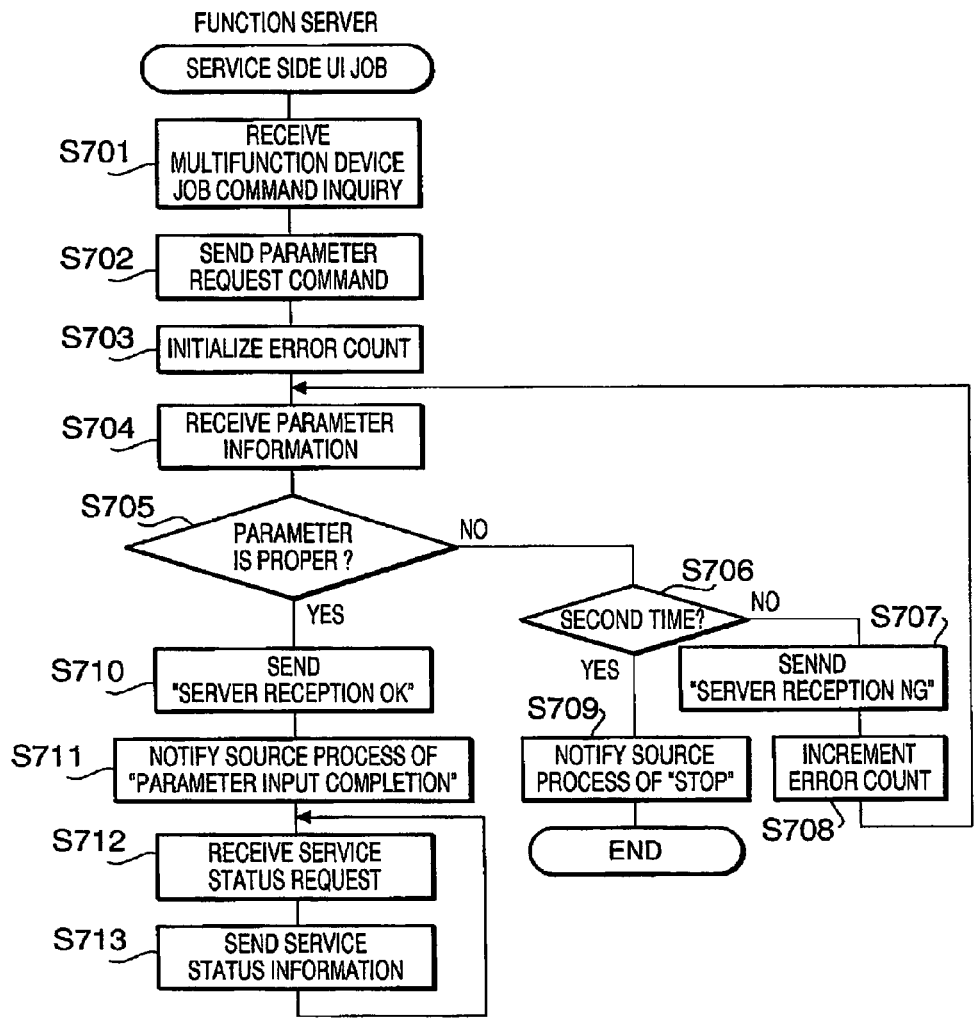
FIG. 17 is a flowchart illustrating a service side UI job executed by the function server according to aspects of the invention.
Figure 18:
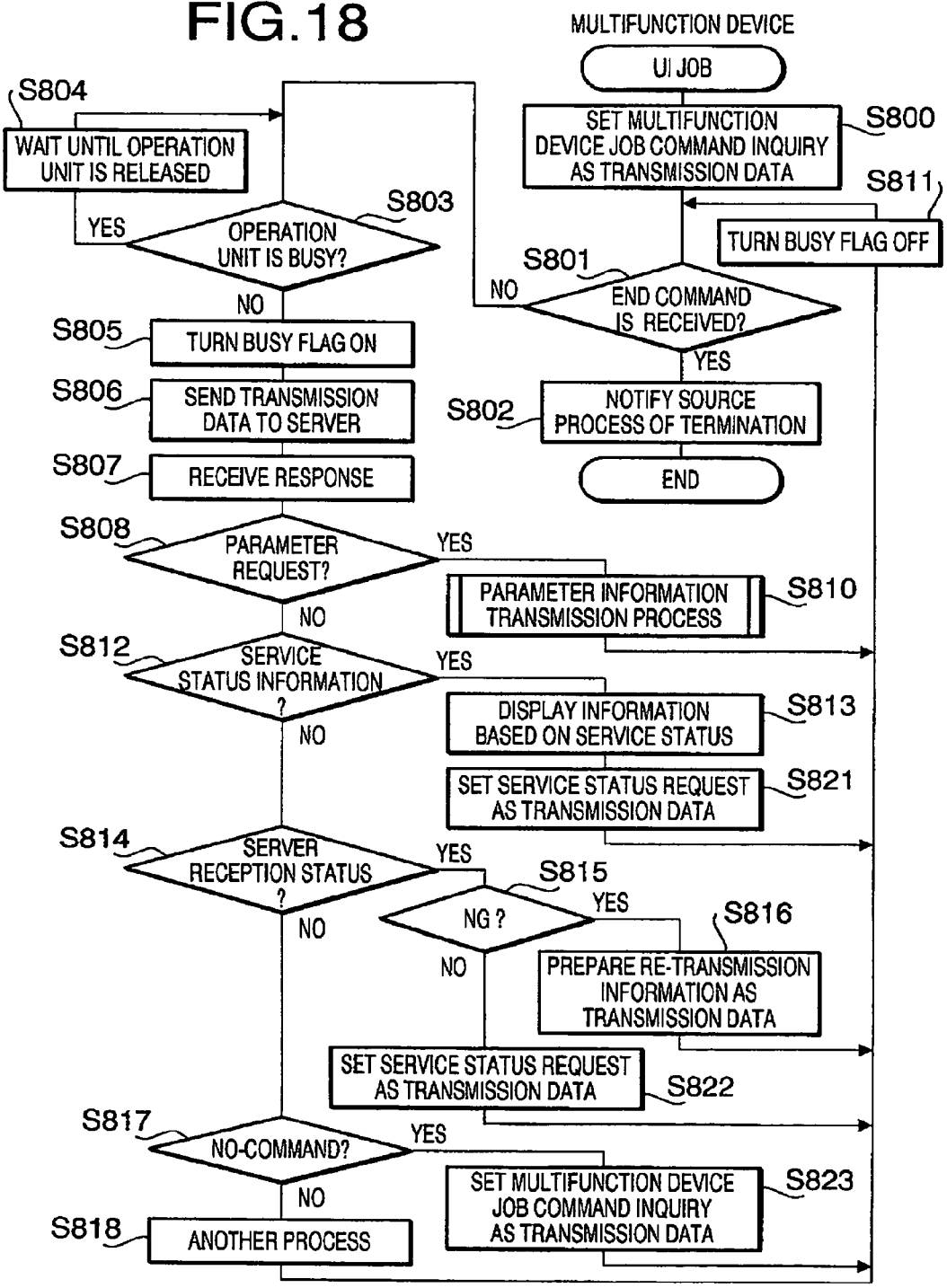
FIG. 18 is a flowchart illustrating a UI job executed by the multifunction device according to aspects of the invention.

Next, the service side UI job initiated in step S602 of the registration process and the UI job initiated in step S352 by the control unit 11 of the multifunction device 10 as a response to the UI job initiation command outputted in step S603 of the registration process will be explained with reference to FIGS. 17 and 18. FIG. 17 shows the service side UI job executed under control of the control unit 31 of the function server 30. FIG. 18 shows the UI job executed under control of the control unit 11 of the multifunction device 10.

As shown in FIG. 17, firstly, the control unit 31 receives a multifunction device job command inquiry from the multifunction device 10 (S701). The multifunction device job command inquiry is prepared as transmission data in the UI job executed by the control unit 11 of the multifunction device 10 in step S S800 and is outputted in step S806 (see FIG. 18).

In step S702, the control unit 31 sends a parameter request command (for requesting a user to input parameters for a service) to the multifunction device 10 as a multifunction device command. Specifically, the control unit 31 sends the service I/F information 36 stored in the storage unit 33 along with the parameter request command to the multifunction device 10. For example, if a process of the registration process which initiated the service side UI job is a process for receiving a blog search service, the service I/F information 36 shown in FIG. 6 is transmitted to the multifunction device 10. If a process of the registration process which initiated the service side UI job is a process for receiving a local news service, the service I/F information 36 shown in FIG. 7 is transmitted to the multifunction device 10.

Next, in step S703, the control unit 31 initializes an error count. Then, the control unit 31 receives the parameter information, containing the parameters inputted by a user through the parameter input screen based on the service I/F information 36, from the multifunction device 10. The parameter information is prepared by the multifunction device 10 as transmission data in step S810 and is outputted in step S806 (see FIG. 18).

Next, in step S705, the control unit 31 judges whether values of the parameters received in step S704 are proper. If the values of the parameters are improper (S705: NO), control proceeds to step S706. In step S706, the control unit 11 judges whether the number of times that the parameters are judges to be improper reaches two based on the error count.

If it is judged in step S706 that the error count is not two (i.e., the error count is one) (S706: NO), control proceeds to step S707. In step S707, the control unit 31 sends "server reception NG", which is information as a server reception status indicating whether the function server 30 successfully receives information from the multifunction device 10, to the UI job of the multifunction device 10.

After step S707, the error count is incremented (S708). Then, control returns to step S704.

If it is judged in step S706 that the error count reaches two (S706: YES), control proceeds to step S709. In step S709, the control unit 31 notifies a source process (i.e., the registration process) of a termination and terminates the service side UI job.

If it is judged in step S705 that the parameters are proper, control proceeds to step S710. In step S710, the control unit 31 sends "server reception OK" to the UI job of the multifunction device 10 as a server reception status.

Next, in step S711, the control unit 31 notifies the source process (the registration process which initiated the service side UI job) of "parameter input completion". Then, the control unit 31 waits for a service status request from the multifunction device 10 (S712). If the control unit 31 receives the service status request from the multifunction device 10, the control unit 31 sends service status information to the UI job of the multifunction device 10 (S713). Then, control returns to step S712.

That is, the control unit 31 continues receiving the service status request from the multifunction device 10 and sending the service status information until the service side UI job is terminated by another job (see S611). The service status information is information indicating the parameter input is successfully completed.

Hereafter, the UI job executed by the control unit 11 of the multifunction device 10 will be explained. The UI job is initiated in step S352 of FIG. 11 in response to the UI job initiation command outputted by the function server 30 in step S603 of FIG. 14.

As shown in FIG. 18, first, the control unit 11 prepares the multifunction device job command inquiry as transmission data. Then, the control unit 11 judges whether the end command is issued to the UI job from the source process (which initiated the U1 job). This end command is issued by the source process in step S310 of FIG. 10.

If the end command is issued (S801: YES), control proceeds to step S801 where the control unit 11 notifies the source process (the service reception process) of the UI job of the termination, and terminates the UI job.

If the end command is not issued (S801: NO), control proceeds to step S803 where the control unit 11 judges whether the operation unit 12 and the display unit 19 are in busy states. Specifically, the control unit 11 judges that the operation unit 12 and the display unit 19 are in the busy states if a busy flag Fu, which represents the states of the operation unit 12 and the display unit 19, is ON. The control unit 11 judges that the operation unit 12 and the display unit 19 are not in the busy states if the busy flag Fu is OFF.

If the operation unit 12 and the display unit 19 are in the busy states (S803: YES), control proceeds to step S804 where the control unit 11 waits until the busy states of the operation unit 12 and the display unit 19 are released. Then, control returns to step S803. If the operation unit 12 and the display unit 19 are not in the busy states (S803: NO), control proceeds to step S805 where the control unit 11 sets the busy flag Fu to ON.

Next, in step S806, the control unit 11 transmits the transmission data, which has been prepared, for example in step S800, to the function server 30. Then, in step S807, the control unit 11 receives a response to the transmission data transmitted in step S806. Next, in step S808, the control unit 11 judges whether the response is the parameter request command. The parameter request command is issued by the function server 30 in step S702 of FIG. 17.

If the response is the parameter request command (S808: YES), control proceeds to step S810 where the control unit 11 executes the parameter information transmission process (which is described later with reference to FIG. 19) so as to display the parameter input screen based on the service I/F information 36 contained in the parameter request command and to accepts the parameter input by a user (see S852 of FIG. 19).

Figure 19:
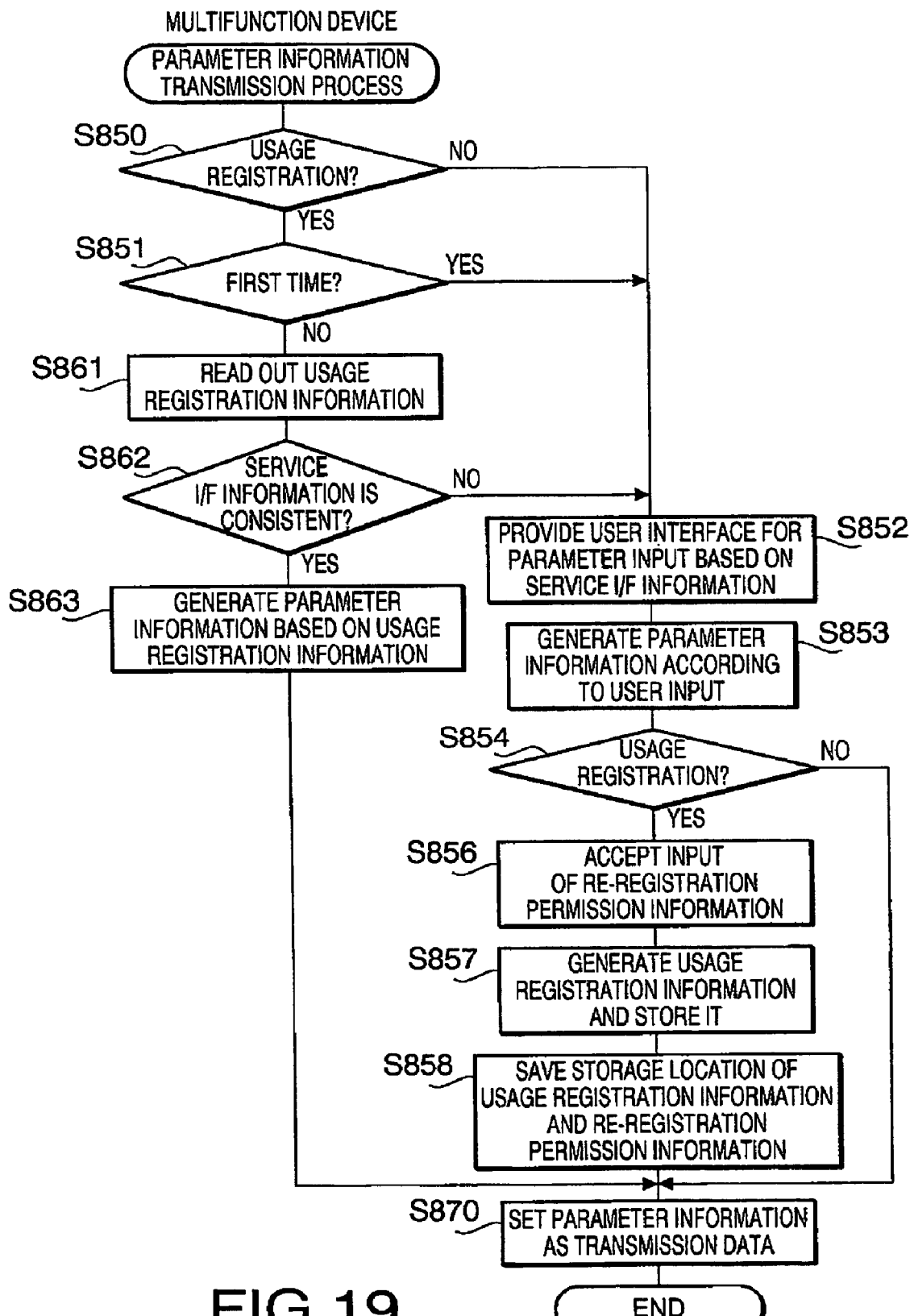
FIG. 19 is a flowchart illustrating a parameter information transmission process executed by the multifunction device according to aspects of the invention.

If a confirmation signal for the inputted parameters is inputted via the operation unit 12, the parameter information is prepared as transmission data so that the inputted parameters are transmitted to the service side UI job running on the function server 30 (see S870 of FIG. 19). However, if the current U1 job is initiated by the service reception process initiated in step S1638 (which will be described later) of FIG. 32, the control unit 11 prepares the parameter information using the usage registration information stored in the periodical inquiry management table as the transmission data without displaying the parameter input screen on the display 19a because in this case the parameter information transmission process is to be executed for re-registration for a service which has been deleted in the function server 30. After step S810, control proceeds to step S811 where the busy flag is reset. Then, control returns to step S801.

If it is judge din step S808 that the response is not the parameter request command (S808: NO), control proceeds to step S812 where the control unit 11 judges whether the response is the service status. The service status is transmitted by the function serve 30 in step S713 of FIG. 17.

If the response is the service status (S812: YES), control proceeds to step S813 where the control unit 11 displays information regarding the service status on the display 19a. Then, the control unit 11 prepares the service status request as the transmission data for obtaining the service status from the function server 30 (S821). Then, control proceeds to step S811.

If the response is not the service status (S812: NO), control proceeds to step S814 where the control unit 11 judges whether the response is the server reception status indicating whether the function server successfully receives data from the multifunction device 10. If the response is the server reception status (S814: YES), control proceeds to step S815 where the control unit 11 judges whether the server reception status represents the server reception NG.

If the server reception status is the server reception NG (S815: YES), control proceeds to step S816 where the control unit 11 prepares information (i.e., re-transmission information) which is the same as the information previously transmitted to the service side UI job of the function server 30 and sets the prepared information as the transmission data Then, control proceeds to step S811.

If the server reception status is not the server reception NG (S815: NO), control proceeds to step S822 where the control unit 11 prepares the service status request as the transmission data Then, control proceeds to step S811.

If the response is not the server reception status is (S814: NO), control proceeds to step S817 where the control unit 11 judges whether the response represents the no-command. If the response is the no-command (S817: YES), control proceeds to step S823 where the control unit 11 sets the multifunction device job command inquiry as the transmission data Then, control proceeds to step S811.

If the response is not the no-command (S817: NO), control proceeds to step S818 where another process is executed. In this case, certain data prepared in another process is set as the transmission data. For example, after a process designated by the response is executed, the multifunction device job command inquiry is set as the transmission data. Then, control proceeds to step S811.

Hereafter, the parameter information transmission process executed in step S810 by the control unit 11 will be explained with reference to FIG. 19.

First, the control unit 11 judges whether the parameter transmission executed in this process relates to usage registration for a service which requires a periodical inquiry. If the parameter transmission does not relate to such usage registration, i.e., if the parameter transmission is executed for a single-shot service which does not require a periodical inquiry (S850: NO), control proceeds to step S852. In step S852, the control unit 11 displays the parameter input screen on the display 19a based on the service I/F information 36 contained in the parameter request command so as to accept a parameter input from a user.

If the inputted parameter is confirmed by a user through the operation unit 12, the control unit 11 generates parameter information based on the inputted parameters and sets the parameter information as the transmission data (S853).

Next, in step S854, a judgment identical with he judgment of step S850 is conducted. That is, if the judgment result of step S850 is "YES", the judgment result of step S854 is also "YES". If the judgment result of step S850 is "NO", the judgment result of step S854 is also "NO". If the judgment result of step S854 is "NO", control proceeds to step 870 without processing steps of S856 to S858. In step S870, the control unit 11 sets the parameter information generated in step S853 as the transmission data. Then, the parameter information transmission process terminates.

If it is judged in step S850 that the parameter transmission executed in this process relates to the usage registration (S850: YES), control proceeds to step S851 where the control unit 11 judges whether the usage registration to be executed is a first-time registration. In step S851, the control unit 11 identifies an activation source that initiates the service reception process leading to the initiation of the current parameter information transmission process so as to judge whether the usage registration to be executed is a first-time registration. More specifically, in step S851, the control unit 11 judges whether the service reception process is initiated in step S116 or S1638 (see FIG. 32). If the service reception process is initiated in step S116, the control unit 11 judges that the usage registration to be executed is a first-time registration. If the service reception process is initiated in step S1638, the control unit 11 judges that the usage registration to be executed is not a first-time registration (i.e., the usage registration to be executed is re-registration).

If it is judged in step S851 that the usage registration to be executed is a first-time registration (S851: YES), control proceeds to step S852 where the control unit 11 displays the parameter input screen on the display unit 19a based on the service I/F information 36 contained in the parameter request command to accept a user input. If the inputted parameter is confirmed by a user through the operation unit 12, the control unit 11 generates parameter information based on the inputted parameters and sets the parameter information as the transmission data (S853). In this case, the judgment result in step S854 is "YES".

If the judgment result in step S854 is "YES", control proceeds to step S856 where the control unit displays a message inquiring of a user whether to permit automatic re-registration which is conducted when usage registration is deleted by the function server 30. Further, in step S856, the control unit 11 accepts a user input indicating permission or inhibition about the re-registration.

Next, in step S857, the control unit 11 generates usage registration information in which the parameter information generated in step S853 is contained, and stores the usage registration information in the storage unit 16. Next, in step S858, a storage location of the usage registration information (a memory address at which the usage registration information generated in step S857 is stored in the storage unit 16) and the re-registration permission information obtained in step S856 are stored temporarily in the RAM of the control unit 11.

Next, the control unit 11 sets the parameter information as the transmission data (S870). Then, the parameter information transmission process terminates.

If it is judged in step S851 that the usage registration to be executed is not a first-time registration (S851: NO), control proceeds to step S861. In step S861, the control unit 11 obtains a request service ID which was stored in the RAM of the control unit 11 when the service reception process is initiated in step S1638 (see FIG. 32), obtains a storage location of usage registration information corresponding to the obtained request service ID from the periodical inquiry management table, and then reads out the usage registration information from the storage unit 16 using the obtained storage location.

Next, in step S862, the control unit 11 compares the service I/F information contained in the usage registration information obtained in step S861 with the service I/F information contained in the parameter request command so as to judge whether the service I/F information contained in the parameter request command coincides with the service I/F information contained in the usage registration information.

If the service I/F information of the parameter request command does not coincide with the service I/F information of the usage registration information (S862: NO), control proceeds to step S852 so that the parameter information corresponding to the parameters inputted by a user through the parameter input screen is set as the transmission data. Then, the parameter information transmission process terminates.

If the service I/F information of the parameter request command coincides with the service I/F information of the usage registration information (S862: YES), control proceeds to step S863 where generates the parameter information which is a copy of the parameter information contained in the usage registration information obtained in step S861. Then, control proceeds to step S870 where the control unit 11 sets the parameter information as the transmission data. Then, the parameter information transmission process terminates.

Hereafter, a periodical inquiry process for attaining the above mentioned periodical inquiry will be described with reference to FIG. 20. The periodical inquiry process is executed continuously under control of the control unit 11 of the multifunction device 10 during power up of the multifunction device 10.

First, the control unit 11 updates the remaining time of each request service ID in the periodical inquiry management table (see FIG. 16A). Specifically, the control unit 11 determines a difference between an internal timer's time of the last execution of step S901 and the current internal timer's time, and the difference from the current value of the remaining time. That is, in step S901, the control unit 11 counts down the remaining time, and obtains and stores a value of the inter timer.

There is a possibility that a periodical inquiry management table is newly generated between intervals of the execution of step S901, and thereby an error occurs in a countdown value of the remaining time in the newly generated periodical inquiry management table. However, since step S901 is repeated at a high speed, such an error is very small and can be neglected. With regard to first-time processing of step S901, the countdown value may be determined based on the internal timer's time last backed up before powering off the multifunction device 10, or the countdown of the remaining time may not be conducted (i.e., only the backup of the internal time's time may be conducted).

Next, in step S902, the control unit 11 selects a piece of inquiry management information to be processed from the periodical inquiry management table. If the piece of inquiry management information to be processed is not found (S903: NO), control proceeds to step S910. That is, if an unprocessed piece of inquiry management information (which is not subjected to steps from S904) does not exist, the judgment result of step S903 becomes "NO".

If the piece of inquiry management information to be processed (hereafter, frequently referred to as targeted inquiry management information) is found (S903: YES), control proceeds to step S904 where the control unit 11 judges whether a predetermined time has elapsed from the last transmission of a periodical inquiry signal. If the predetermined time has not elapsed (S904: NO), control proceeds to step S905 where the control unit 11 judges whether an instant inquiry is needed based on the instant processing request information contained in the targeted inquired management information. If the instant inquiry is needed (S905: YES), control proceeds to step S906. If the instant inquiry is not needed (S905: NO), control returns to step S902.

In step S906, the control unit 11 judges whether a transmission time of a periodical inquiry for the service corresponding to the targeted inquiry management information, based on the remaining time in the targeted inquiry management information is reached. Specifically, in step S906, if a value of the remaining time is zero or negative, the control unit judges that the transmission time is reached. If the value of the remaining time is positive, the control unit 11 judges that the transmission time is not reached. If the transmission time is not reached (S906: NO), control returns to step S902. If the transmission time is reached (S906: YES), control returns to step S907.

In step S907, the control unit 11 judges whether the input/output device to be used for receiving the service corresponding to the targeted inquiry management information is being used (i.e., in a busy state) by another process running in parallel with this process, based on the used device information in the targeted inquiry management information.

For example, if the used device information in the targeted inquiry management information is "Printer", the control unit 11 judges whether the recording unit 14 is in the busy sate. If the used device information in the targeted inquiry management information is "Scanner", the control unit 11 judges whether the reading unit 13 is in the busy sate. If the used device information in the targeted inquiry management information is "Speaker", the control unit 11 judges whether the sound output unit 18 is in the busy sate. If the used device information in the targeted inquiry management information is "Microphone", the control unit 11 judges whether the sound input unit 17 is in the busy sate.

If two or more input/output devices are listed in the used device information, the control unit 11 makes a judgment on a busy state for all of the input/output devices. If at least one of the input/output devices is in the busy state, the control unit 11 judges that the input/output device to be used to receive the service corresponding to the targeted inquiry management information is being used.

If it is judged in step S907 that the input/output device is being used (S907: YES), control returns to step S902. If it is judged in step S907 that the input/output device is not being used (S907: NO), control proceeds to step S908.

Figure 21:
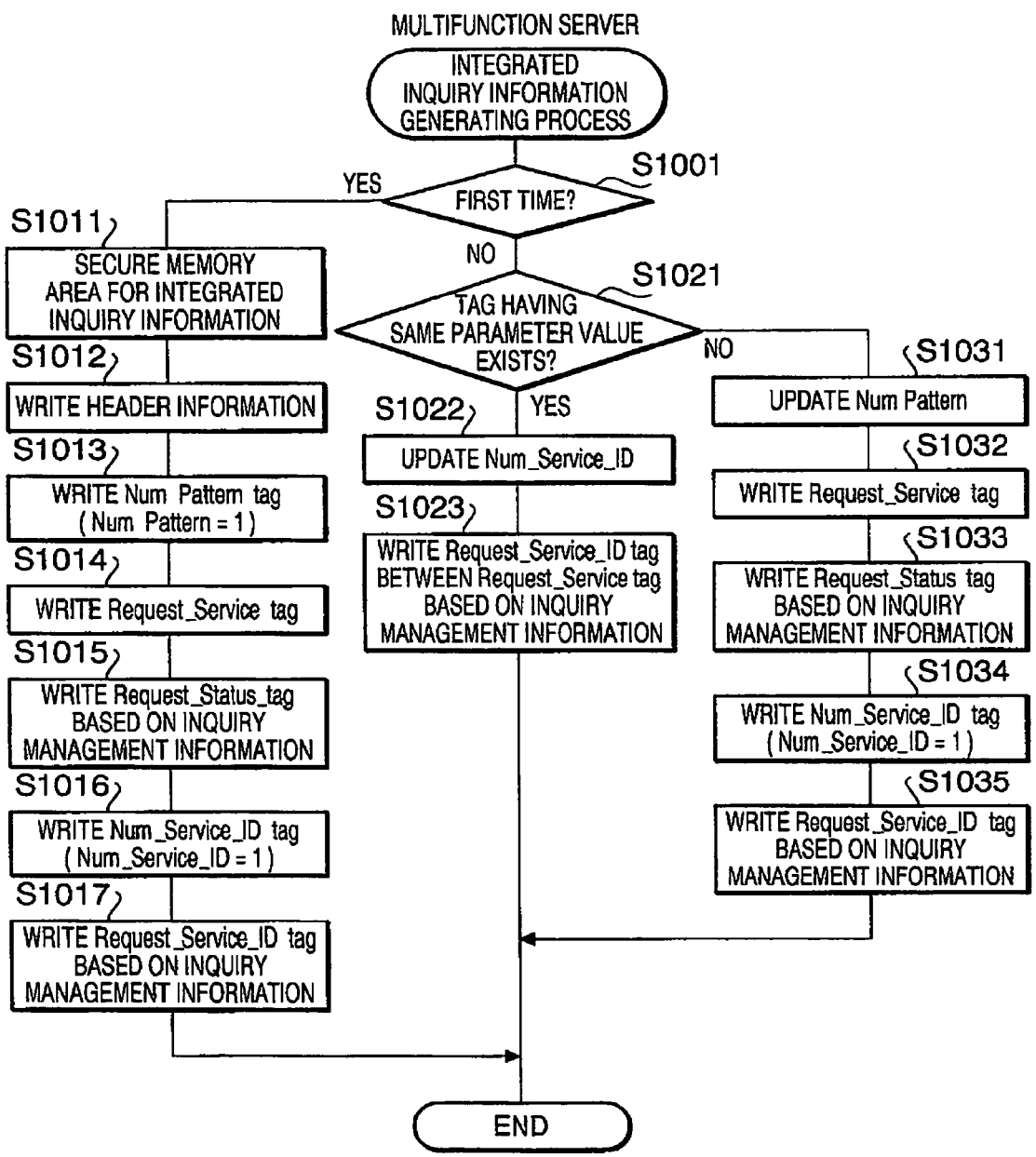
FIG. 21 is a flowchart illustrating an integrated inquiry information generating process executed by the multifunction device according to aspects of the invention.

In step S908, an integrated inquiry information generating process is executed. FIG. 21 is a flowchart illustrating the integrated inquiry information generating process executed under control of the control unit 11 of the multifunction device 10. FIG. 22 shows an example of the integrated inquiry information. As shown in FIG. 22, the integrated inquiry information is described by a mark-up language. Definitions of tags used in the integrated inquiry information are shown in the following Table 3.

TABLE 3

| DATA NAME | DATA TYPE | DEFINITION |
| --- | --- | --- |
| Num_Pattern | integer | the number of types of inquiry information |
| Request_Service[ ] | array of inquiry information | a set of pieces of inquiry information of the same kind |
| Request_Status | 'TRUE' or 'FALSE' | TRUE: request a status FALSE: not request a status |
| Num_Service_ID | integer | the number of pieces of inquiry information |
| Request_Service_ID | integer | identifier of a service |

Figure 20:
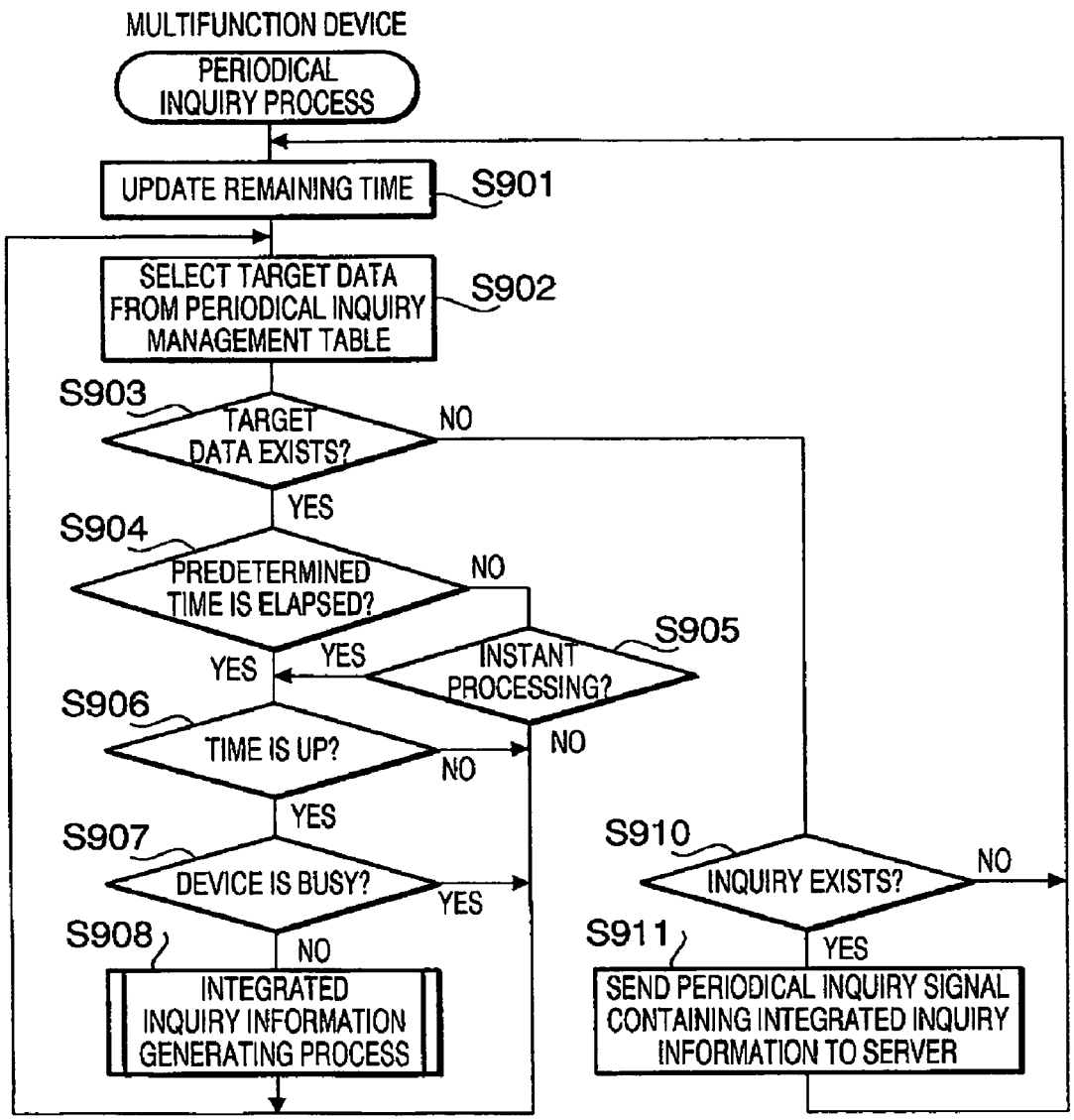
FIG. 20 is a flowchart illustrating a periodical inquiry process executed by the multifunction device according to aspects of the invention.

As shown in FIG. 20, firstly, the control unit 11 judges whether execution of the integrated inquiry information generating process is a first-time execution after processing of step S901. If the execution of integrated inquiry information generating process is a first-time execution (S1001: YES), control proceeds to step S1011. In step S1011, the control unit 11 secures a memory area in the RAM thereof so as to generate the integrated inquiry information. Then, the control unit 11 writes header information in the area (S1012). Because the integrated inquiry information is transmitted as a POST command in HTTP, an URL of a destination device and information indicating that the integrated inquiry information is attached are written in the header information. The destination device to which the integrated inquiry information is to be sent has been predetermined. Therefore, URL of the predetermined device is written in the header information.

Next, in step S1013, the control unit 11 generates the NumPattern tag setting a value of the parameter NumPattern to '1' (i.e., generates a string '<NumPattern>1<NumPattern>'), and adds it to the integrated inquiry information (i.e., an integrated inquiry information area). Then, the control unit 11 adds a Request_Service tag to the integrated inquiry information (S1014).

Next, in step S1015, the control unit 11 writes a Request_Status tag between Request_Service tags (between <Request_Service> and </Request_Service>), based on the request status information of the targeted inquiry management information. Foe example, a value of the request status information is 'FALSE', the parameter Request_Status is set to 'FALSE' and the Request_status tag (a string <Request_Status>FALSE</Request_Status>) is generated. Then, the Request_Status tag is written in the integrated inquiry information.

Next, in step S1016, the control unit 11 assigns '1' to the parameter Num_Service_ID to '1', generates the Num_Service_ID tag (a string <Num_Service_ID>1</Num_Service_ID>), and writes it between Request_Service tags if the integrated inquiry information.

Next, in step S1017, the control unit 11 generates a Request_Service_ID tag (a string <Request_Service_ID>(the request service ID)</Request_Service_ID>) by assigning a value of the request service ID of the targeted inquiry management information to the parameter Request_Service_ID, and write it between Request_Service tags. Then, the integrated inquiry information generating process terminates.

If it is judged in step S1001 that the execution of the integrated inquiry information generating process is second or subsequent time execution (S1001: NO), the control unit 11 judges whether a Request_Status tag having a value identical to the value of the request status information of the targeted inquiry management information is already stored in the integrated inquiry information.

If a Request_Status tag having the same value as the request status is already stored in the integrated inquiry information (S1021: YES), control proceeds to step S1022 where the control unit 11 updates a value of a Num_Service_ID tag located between Request_Service tags corresponding to the Request_Status tag having the same value as the request status (S1022). For example, if a Num_Service_ID tag before an update is a string <Num_Service_ID>1</Num_Service_ID>, it is changed to <Num_Service_ID>2</Num_Service_ID>.

Next, in step S1023, the control unit 11 generates the Request_Service ID by assigning a value of the request service ID of the targeted request management information to the parameter Request_Service_ID, and writes it between the Request_Service tags in the integrated inquiry information. Then, the integrated inquiry information generating process terminates.

If a Request_Status tag having the same value as the request status is not already stored in the integrated inquiry information (S1021: NO), control proceeds to step S1031. In step S1031, the control unit 11 updates the parameter Num-Pattern of the NumPattern tag in the integrated inquiry information. That is, if the Numpattern tag of the integrated inquiry information is a string <Numpattern>1</Numpattern>, the control unit 11 changes it to a string <Numpattern>2</Numpattern>.

Next, the control unit 11 writes new Request_service tags in an area next to the Request_Service tags which are already written in the integrated inquiry information (S1032), and writes Request_Status tag based on the request status information of the targeted inquiry management information between the new Request_Service tags (S1033).

For example, if the value of the request status information is 'TRUE', the control unit 11 generates the Request_Status tag (a string <Request_Status>TRUE</Request_Status>) by assigning 'TRUE' to the parameter Request_Status, and writes it in the integrated inquiry information.

Next, in step S1034, the control unit 11 generates the tag Num_Service_ID tag (a string <Num_Service_ID>1</Num_Service_ID>) by assigning '1' to the parameter Num\Service_ID, and writes it between the new Request_Service tags in the integrated inquiry information.

Next, in step S1035, the control unit 11 generates the Request_Service_ID tag by assigning the value of the request service ID of the targeted inquiry management information to the parameter Request_Service_ID, and writes it between the new Request_Service tags in the integrated inquiry information. Then, the integrated inquiry information generating process terminates to return to step S902 of FIG. 20.

Referring back to FIG. 20, if it is judged in step S903 that a piece of inquiry management information to be processed does not exist, i.e., if all of the pieces of inquiry management information in the periodical inquiry management table are processed (S903: NO), control proceeds to step S910. In step S910, the control unit 11 judges whether the integrated inquiry information is generated. If the integrated inquiry information is generated (S910: YES), the control unit 11 generates a periodical inquiry signal containing the integrated inquiry information stored in the integrated inquiry information area in the RAM of the control unit 11, and sends the periodical inquiry signal to an inquiry target device (the function server 30) (S911). Then, control returns to step S901.

If it is judged in step S910 that the integrated inquiry information is not generated (S910: NO), control returns to step S901 without processing step S911.

Figure 23:
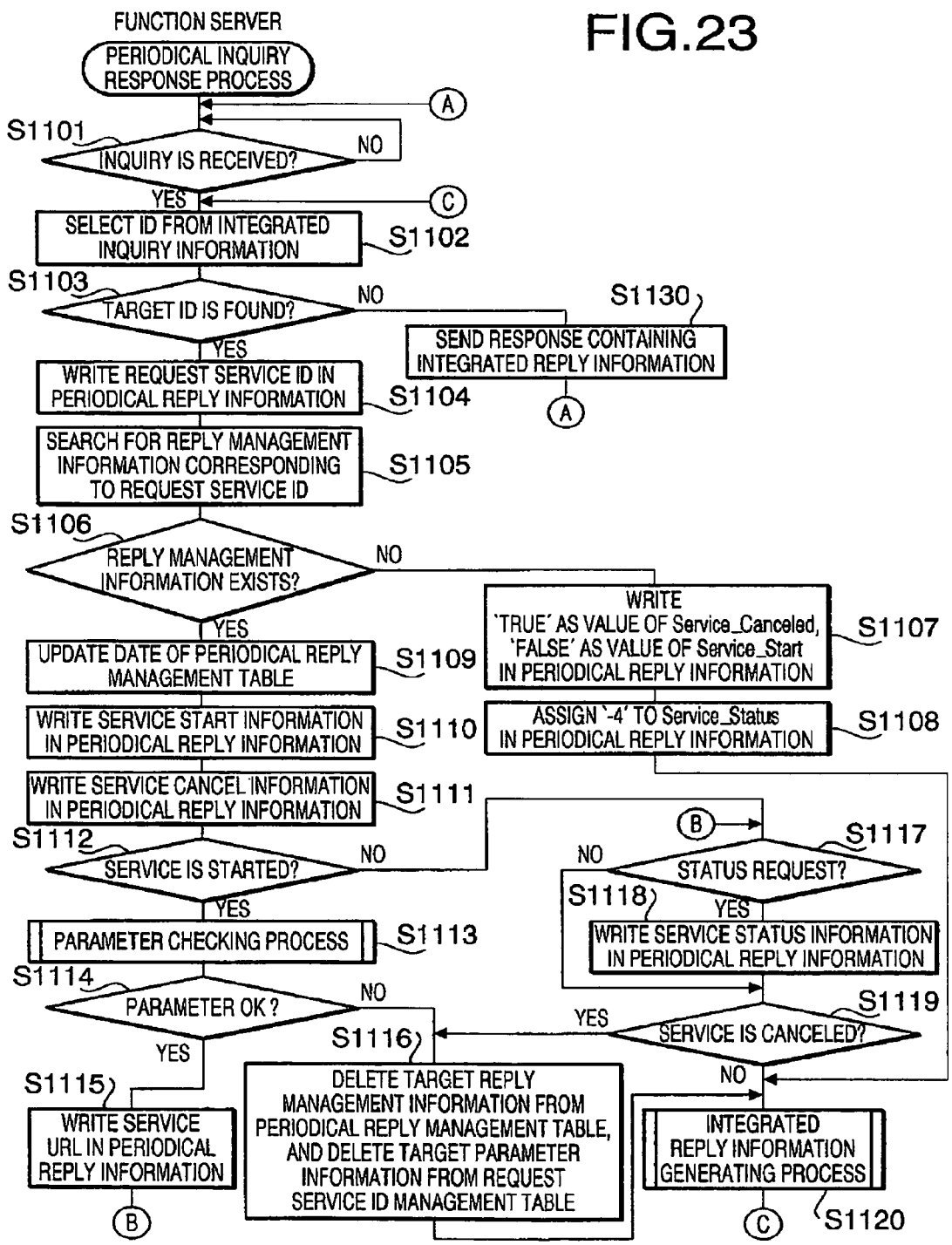
FIG. 23 is a flowchart illustrating a periodical inquiry response process executed by the function server according to aspects of the invention.

Hereafter, a periodical inquiry response process to be executed by the function server 30 in response to the periodical inquiry signal outputted by the multifunction device 10 in step S911 will be described with reference to FIG. 23. The periodical inquiry response process is executed continuously under control of the control unit 13 of the function server 30 during power up of the function server 30.

First, the control unit 31 waits for the periodical inquiry signal from the multifunction device 10 (S1101). If the periodical inquiry signal is received (S1101: YES), the control unit 31 selects a request service ID from the integrated inquiry information contained in the received periodical inquiry signal (S1102).

Next, in step S1103, the control unit 31 judges whether a request service ID to be processed (hereafter, frequently referred to as a target request service ID) exists in the integrated inquiry information. If a request service ID to be processed is not found, i.e., a request service ID to be subjected to steps from S1104 does not exist, a judgment result of step S1103 becomes "NO". In this case, control proceeds to step S1130. If a request service ID to be processed is found (S1103: YES), control proceeds to step S1104.

In step S1104, the control unit 31 secures a periodical reply information area in the RAM thereof for storing periodical reply information representing a reply to the request service ID, and writes the target request service ID in the periodical reply information area as a value of the parameter Request_Service_ID. Then, the control unit 31 searches the periodical reply management table for a piece of reply management information corresponding to the target request service ID (S1105). If the piece of reply management information corresponding to the target request service ID is not found (S1106: NO), control proceeds to step S1107. In step S1107, the control unit 31 writes 'TRUE' in the periodical reply information are as a value of the parameter Service_Canceled and 'FALSE' in the periodical reply information are as a value of the parameter Service_Start.

Figure 25:
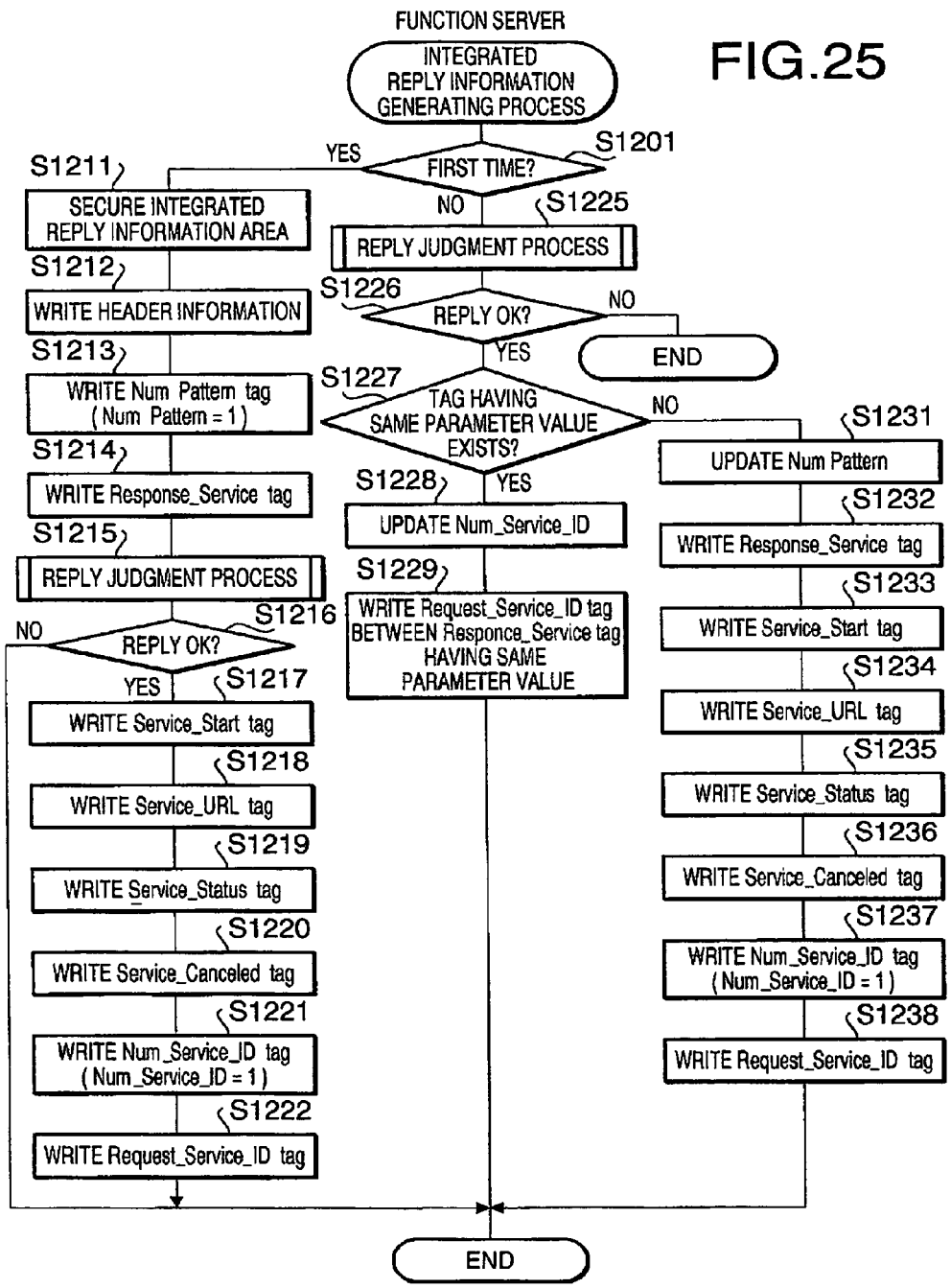
FIG. 25 is a flowchart illustrating an integrated reply information generating process executed by the function server according to aspects of the invention.

Next, in step S1108, the control unit 31 writes a value of −4 in the periodical reply information are as a value of the parameter Service_Status. Then, control proceeds to step S1120 where an integrated reply information generating process shown in FIG. 25 is executed. Table 4 below shows values and explanation about the parameter Service_Status.

TABLE 4

| Service_Status | | REMARKS |
|---|---|---|
| status value | appendix | normal |
| 0 | none | automatic registration is not permitted |
| −1 | none | the point number of a prepaid card is zero |
| −2 | none | |
| −3 | item (parameter) name, normal range | parameter is not within the normal range |
| −4 | none | usage registration of the service is not conducted |

If a piece of reply management information corresponding to the target request service ID is found in the periodical reply management table in the storage unit 33, the judgment result of step S1106 becomes 'YES'. Then, control proceeds to step S1109. In step S1109, the control unit 31 updates the inquiry date of the periodical reply management table. Specifically, in step S109, the control unit 31 changes the inquiry date corresponding to the target request service ID in the periodical reply management table to a date and time when the periodical inquiry signal is received in step S1101.

Then, the control unit 31 writes a value of the service start information contained in the reply management information corresponding to the target request service ID in the periodical reply information area as a value of the parameter Service_Start (S1110). Next, in step S1111, the control unit 31 writes a value of the service cancel information contained in the reply management information corresponding to the target request service ID in the periodical reply information area as a value of the parameter Service_Canceled (S1111).

Next, in step S1112, the control unit 31 judges whether the value of the parameter Service_Start written in the periodical reply information area is 'TRUE'. If the value of the parameter Service_Start is 'TRUE' (S1112: YES), control proceeds to step S1113 where an parameter checking process shown in FIG. 24 is executed.

Figure 24:
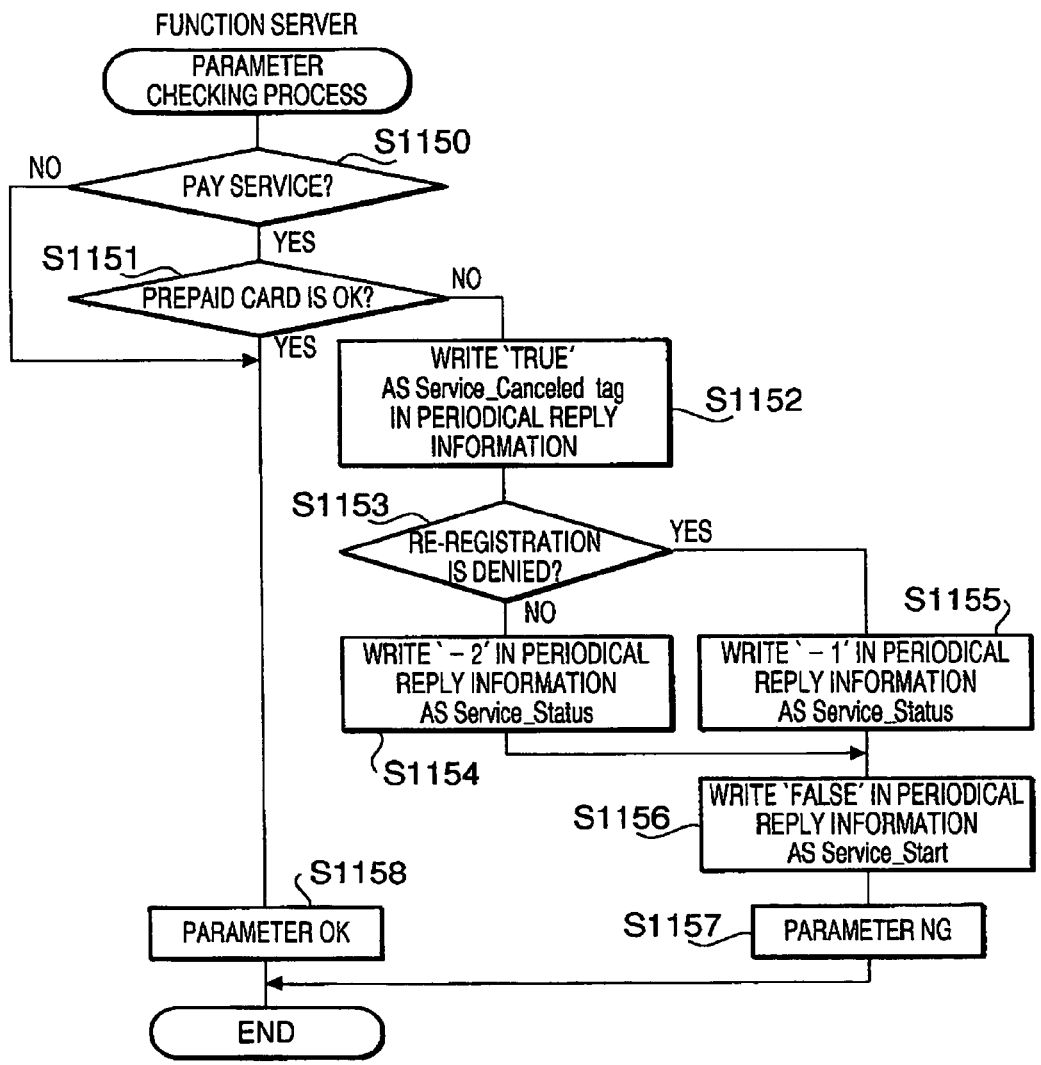
FIG. 24 is a flowchart illustrating a parameter checking process executed by the function server according to aspects of the invention.

FIG. 24 is a flowchart illustrating the parameter checking process executed under control of the control unit 31 of the function server 30. As shown in FIG. 24, firstly, the control unit 31 judges whether the service corresponding to the target request service ID is a pay service. If the service is not a pay service (S1150: NO), the control unit 31 judges that the parameter is OK (S1158). Then, the parameter checking process terminates.

If the service is a pay service (S1150: YES), the control unit 31 judges whether a prepaid card number (a value of the parameter Prepaid) is valid based on the parameter information of the target request service ID contained in the request service ID management table. If the prepaid card number is valid (S1151: YES), the control unit 31 judges that the parameter is OK (S1158). Then, the parameter checking process terminates.

If the prepaid card number is not valid (S1151: NO), control proceeds to step S1152 where the control unit 31 changes the value of the parameter Service_Canceled (i.e., updates the parameter Service_Canceled). Then, the control unit 31 judges whether the re-registration is to be denied. If the re-registration is not to be denied (S1153: NO), the control unit 31 writes '−2' in the periodical reply information area as a value of the parameter Service_Status. Then, control proceeds to step S1156.

If the re-registration is to be denied (S1153: YES), the control unit 31 writes '−1' in the periodical reply information area as a value of the parameter Service_Status. Then, control proceeds to step S1156.

The control unit 31 judges whether the re-registration is to be denied in accordance with factors invalidating the prepaid card number. That is, if the use of the prepaid card number is regarded as fraud, the control unit 31 judges that the re-registration is to be denied. If the prepaid card number is judged to be invalid only due to the fact that the repaid card number is expired, the control unit 31 judges that the re-registration is not to be denied.

In step S1156, the control unit 31 updates a value of the parameter Service_Start stored in the periodical reply information area to 'FALSE'. Then, the control unit 31 judges that the parameter is NG (S1157). Then, the parameter checking process terminates.

Referring back to FIG. 23, if the parameter checking process terminates, control proceeds to step S1114. In step S1114, the control unit 31 judges whether the parameter has been judged to be OK in the parameter checking process. If the control unit 31 judges that the parameter has been judged to be OK (S1114: YES), the control unit 31 writes the value (a string) of the service URL contained in the reply management information corresponding to the target request service ID in the periodical reply information area as a value of the parameter Service_URL (S1115). Then, control proceeds to step S1117.

If the control unit 31 judges that the parameter has been judged to be NG (S1114: NO), control proceeds to step S1116 where the control unit 31 deletes the reply management information corresponding to the target request service ID from the periodical reply management table, and deletes the parameter information corresponding to the target request service ID from the request service ID management table. Then, control proceeds to step S1120.

If it is judged in step S1112 that the value of the parameter Service_Start stored in the periodical reply information area is not 'TRUE' (S1112: NO), control proceeds to step S117.

In step S1117, the control unit 31 judges whether the value of the Request_Status tag (the Request_Status tag between the Request_Service tags between which the target request service ID is described) associated with the target request service ID in the integrated inquiry information is 'TRUE'. If the value of the Request_Status tag is 'TRUE' (S1117: YES), control proceeds to step S1118 where the control unit 31 writes the value of the service status contained in the reply management information corresponding to the target request service ID. Then, control proceeds to step S1119.

If the value of the Request_Status tag is not 'TRUE' (S1117: NO), control proceeds to step S1119 without processing step S1118. In step S1119, the control unit 31 judges whether the value of the service cancel information contained in the reply management information corresponding to the target request service ID is 'TRUE'. If the value of the service cancel information is 'TRUE' (S1119: YES), control proceeds to step S1116 where the above mentioned deleting process is executed. Then, control proceeds to step S1120.

Figure 26:
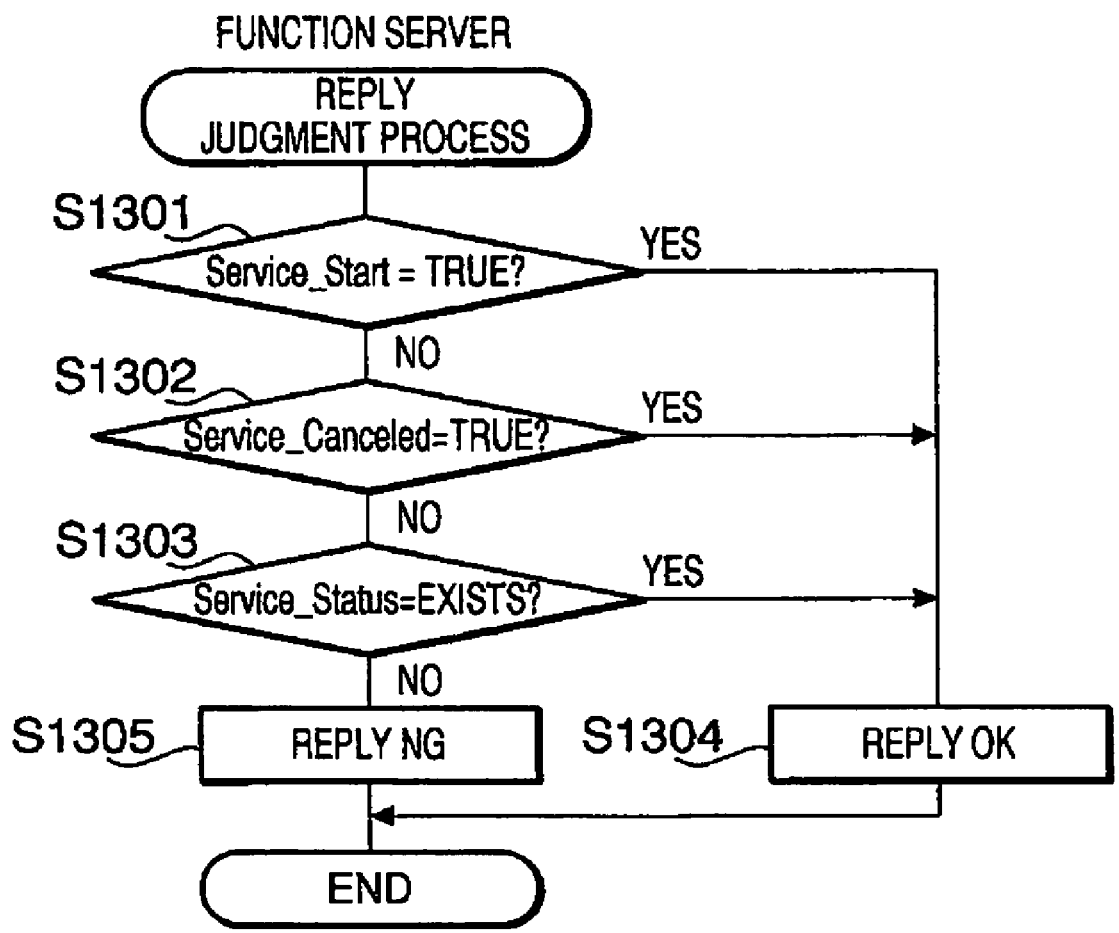
FIG. 26 is a flowchart illustrating a reply judgment process executed by the function server according to aspects of the invention.

In step S1120, an integrated reply information generating process is executed. FIG. 25 is a flowchart illustrating the integrated reply information generating process. FIG. 26 is a flowchart illustrating a reply judgment process which is executed in the integrated reply information generating process. FIG. 27 shows an example of integrated reply information. As shown in FIG. 27, the integrated reply information is described by a mark-up language. Explanations about tags used in the integrated reply information are shown in Table 5 below.

TABLE 5

| data name | data type | REMARKS |
|---|---|---|
| Num_Pattern | integer | the number of types of reply information |
| Response_Service[ ] | array of reply information | a set of pieces of reply information of the same kind |
| Service_Start | 'TRUE' or 'FALSE' | TRUE: preparation of service is OK FALSE: preparation of service is NG |
| Service_URL | URL string | address of service program for starting service |
| Service_Status | status value (plus appendix) | information indicating status |
| Service_Canceled | 'TRUE' or 'FALSE' | TRUE: service is stopped FALSE: service is not stopped |
| Num_Service_ID | integer | the number of pieces of reply information |
| Response_Service_ID | integer | identifier of service |

Hereafter, the integrated reply information generating process executed under control of the control unit 31 of the function server 30 will be described. First, the control unit 31 judges whether execution of the integrated reply information generating process is a first-time execution after processing of step S1101. If the execution of the integrated reply information generating process is a first-time execution (S1201: YES), control proceeds to step S1211 where the control unit 31 secures an integrated reply information area for generating the integrated reply information in the RAM thereof. Then, the control unit 31 writes header information in the area (an empty area) (S1212).

Next, in step S1213, the control unit 31 generates the NumPattern tag (a string <NumPattern>1</NumPattern>) by assigning '1' to the parameter NumPattern, and adds it to the integrated reply information (i.e., the integrated reply information area). Then, the control unit 31 adds the Response_Service tag to the integrated reply information (S1214). Then, the reply judgment process is executed (S1215).

Hereafter, the reply judgment process will be explained with reference to FIG. 26. First, in step S1301, the control unit 31 judges whether a value of the parameter Service_Start of the periodical reply information (in the periodical reply information area) corresponding to the target request service ID is 'TRUE'. If the value of the parameter Service_Start is 'TRUE' (S1301: YES), the control unit 31 judges that a reply is OK (S1304).

If the value of the parameter Service_Start is not 'TRUE' (S1301: NO), control proceeds to step S1302 where a value of the parameter Service_Canceled of the periodical reply information is 'TRUE'.

If the value of the parameter Service_Canceled is 'TRUE' (S1302: YES), the control unit 31 judges that a reply is OK (S1304). If the value of the parameter Service_Canceled is not 'TRUE' (S1302: NO), control proceeds to step S1303 where the control unit 31 judges whether a value of the parameter Service_Status exists in the periodical reply information. If the value of the parameter Service_Status exists in the periodical reply information (S11303: YES), the control unit 31 judges that a reply is OK (S1304). If the value of the parameter Service_Status does not exist in the periodical reply information (S1303: NO), the control unit 31 judges that a reply is NG. Then the reply judgment process terminates.

Referring back to FIG. 25, if the reply judgment process (S1215) is finished, control proceeds to step S1216 where the control unit 31 judges whether a judgment result of the reply judgment process is a reply OK. If the judgment result of the reply judgment process is not the reply OK (S1216: NO), the integrated reply information generating process terminates.

If the judgment result of the reply judgment process is the reply OK (S1216: YES), control proceeds to step S1217. In step S1217, the control unit 31 writes the Service_Start tag between the Response_Service tags (i.e., between <Response_Service> and </Response_Service> based on the periodical reply information corresponding to the target request service ID.

For example, if the value of the parameter Service_Start in the periodical reply information is 'TRUE', the control unit 31 may generate a string <Service_Start>TRUE</Service_Start as a Service_Start tag, and writes it in the integrated reply information.

Next, in step S1218, the control unit 31 writes a Service_URL tag between Response_Service tags based on the periodical reply information corresponding to the target request service ID. If the value of the parameter Service_URL does not exist in the periodical reply information, the control unit 31 may generate a string <Service_URL></Service_URL> as a Service URL tag. If the value of the parameter Service_URL exists, the control unit 31 may generate the Service_URL tag representing the value of the parameter Service_URL, and may write it in the integrated reply information.

Next, in step S1219, writes the Service_Status tag between the Response_Service tags based on the periodical reply information corresponding to the target request service ID. In step S1219, if the value of the parameter Service_Status does not exist, the control unit 31 generates a string <Service_Status><Service_Status> as a Service_Status tag. If the value of the parameter Service_Status exists, the control unit 31 generates the Service_Status tag representing the value of the Service_Status. Then, the generated value is written in the integrated reply information.

Next, in step S1220, the control unit 31 writes the Service_Canceled tag between the Response_Service tags based on the periodical reply information corresponding to the target request service ID. For example, if the value of the parameter Service_Canceled of the periodical reply information is 'FALSE', the control unit 31 generates a string <Service_Canceled>FALSE</Service_Canceled> as a Service_Canceled tag, and writes the string in the integrated reply information.

Next, in step S1221, the control unit 31 generates a Num_Service_ID tag (a string<Num_Service_ID>1</Num_Service_ID>) by assigning '1' to the parameter Num_Service_ID, and writes it between the Response Service tags. Then, the control unit 31 generates a Request_Service_ID tag (a string <Request_Service_ID>(Request Service ID)</Request_Service_ID>) as a value of the parameter Request_Service_ID, and writes it between the Response_Service tags in the integrated reply information. Then, the integrated reply information generating process terminates.

If it is judged in step S1201 that the execution of the integrated reply information generating process is not a first-time execution but is second or subsequent time execution (S1201: NO), control proceeds to step S1225 where the control unit 31 executes the reply judgment process (see FIG. 26). Next, in step S1226, the control unit 31 judges whether a judgment result of the reply judgment process is a reply OK. If the judgment result of the reply judgment process is not the reply OK (S1216: NO), the integrated reply information generating process terminates.

If the judgment result of the reply judgment process is the reply OK (S1216: YES), control proceeds to step S1227 where the control unit 31 judges whether a Response_Service tag having a value identical with the periodical reply information of the target request service ID exists in the integrated reply information. That is, the control unit 31 judges whether a Response_Service tag of which pieces of information other than the request service ID (which is corresponds to the request service ID of the periodical reply information of the target request service ID) are equal to those of the periodical reply information of the target request service ID.

If the judgment result of step S1227 is "YES", the control unit 31 updates the Num_Service_ID tag between the Response_Service tags (S1228). For example, if the Num_Service_ID tag is a string <Num_Service_ID>1</Num_Service_ID>, it is updated to <Num_Service_ID>2</Num_Service_ID>.

Next, in step S1229, the control unit 31 generates a Request_Service_ID tag assigning the value of the target request service ID to the parameter Request_Service_ID, and writes it between the Response_Service tags having the parameter values identical with the periodical reply information of the target request service ID. Then, the integrated reply information generating process terminates.

If the judgment result of step S1227 is "NO", control proceeds to step S1231 where the control unit 31 updates the value of the parameter NumPattern of the Numpattern tag in the integrate reply information. For example, if the NumPattern tag in the integrated reply information is a string <NumPattern>1</NumPattern>, ii is updated to <NumPattern>2</NumPattern>. However, if an empty Response_Service exists in the integrated reply information, the control unit 31 may operate not to update the parameter NumPattern.

Next, in step S1232, the control unit 31 writes a new Response_Service tag at an area following the existing Response_Service tag. However, the control unit 31 may operate not to write a new Response_Service tag in the integrated reply information if an empty Response_Service tag exists in the integrated reply information.

Next, in step S1233, the control unit 31 writes a Service_Start tag between the new Response_Service tags (or empty Response_Service tags) based on the periodical reply information corresponding to the target request service ID. For example, if the value of the parameter Service_Start in the periodical replay information is 'FALSE', the control unit 31 generates a string <Service_Start>FALSE<Service_Start> as a Service_Start tag, and writes it in the integrated reply information.

Next, in step S1234, the control unit 31 writes a Service_URL tag between the Response_Service tags based in the periodical reply information corresponding to the target request service ID. Then, the control unit 31 writes a Service_Status tag between the Response_Service tags based on the periodical reply information corresponding to the target request service ID (S1235).

Next, in step S1236, the control unit 31 writes a Service_Canceled tag between the Response_Service tags based on the periodical reply information corresponding to the target request service ID. Then, the control unit 31 generates a Num_Service_ID tag by assigning a value '1' to the parameter Num_Service_ID, and writes it between the Response_Service tags in the integrated reply information (S1237).

Next, in step S1238, the control unit 31 generates a Request_Service_ID tag by assigning the value of the target request service ID to the parameter Request_Service_ID, and writes it between the Response_Service tags in the integrated reply information. Then, the integrated reply information generating process terminates.

Referring back to FIG. 23, after the above mentioned integrated reply information generating process is finished in step S1120, control returns to step S1102 where a next target is selected from the pieces of request service IDs in the integrated inquiry information. If an unprocessed request service ID is not found in the integrated inquiry information (S1103: NO), control proceeds to step S1130. In step S1130, the control unit 31 generates a response signal containing the integrated reply information stored in the integrated reply information area, and sends it to a source device which has sent the periodical inquiry signal (i.e., the function device 10) via the communication unit 31. Then, in step S1101, the control unit 31 waits for a next periodical inquiry signal.

Hereafter, a blog search process in which information to be provided to a registered device (the multifunction device 10) will be described with reference to FIG. 28. The blog search process is executed under control of the control unit 31 of the function server 30, and is repeated at predetermined intervals during power up of the function server 30.

First, the control unit 31 selects a request service ID to be processed (hereafter, frequently referred to as a target request service ID) from the request service ID management table corresponding to the blog search process. If a request service ID to be processed (i.e. an unprocessed request service ID) is not found (S1402: NO), the blog search process terminates. If a request service ID to be processed is found (S1402: YES), control proceeds to step S1403 where the control unit 31 changes the value of the service start information of the reply management information corresponding to the target request service ID in the periodical reply management table to 'FALSE'.

Next, in step S1404, the parameters, which are stored in the request service ID management table and are associated with the target request service ID, are sets as keywords. Further, the control unit 31 accesses a predetermined blog site so as to search newly posted comments for comments having keywords equal to the keywords set in the function server 30.

If an error occurs in the searching operation in step S1404, for example, due to the excessive number of posted comments having the keyword equal to the keyword set in the function server 30, the judgment result of step S1405 becomes "YES". In this case, control proceeds to step S1406 where the control unit 31 changes the service cancel information contained in the reply management information corresponding to the target request service ID in the periodical reply management table to 'TRUE'.

Next, in step S1407, the control unit 31 updates the service status information in the periodical reply management table corresponding to the target request service ID to '−3'. Then, control returns to step S1401 to further select an unprocessed request service ID from the request service ID table.

If the searching operation in step S1401 is successfully finished (S1405: NO), control proceeds to step S1408 where the control unit 31 judges whether the posted comments having the keywords equal to the keywords set in the function server 30 are found. If the posted comments having the keywords of the function server 30 are not found (S1408: NO), control returns to step S1401.

If the posted comments having the keywords of the function server 30 are found (S1408: YES), control proceeds to step S1409. In step S1409, the control unit 31 generates offering information representing the posted comments having the keywords of the function server 30. Then, the control unit 31 stores the offering information in the storage unit 33. next, in step S1410, the control unit 31 generates a URL of a destination device to which the offering information is provided. For example, a string "http://**.co.jp/cgi/blog?=**" is generated.

Further, the control unit 31 changes the service URL corresponding to the target request service ID in the periodical reply management table to the URL of the destination device to which the offering information is provided (S1411).

Next, in step S1412, the control unit 31 changes the service start information corresponding to the target request service ID in the periodical reply management table to 'TRUE'. Then, control returns to step S1401 to further selects a next request service ID from the request service ID management table. If all of the service request IDs in the request service ID management table have been processed, the judgment result of step S1402 becomes "YES", and the blog search process terminates.

Hereafter, a news information generating process, in which information to be provided to a registered device (i.e., the multifunction device 30) in regard to the local news service is generated, will be described with reference to FIG. 29. The news information generating process is executed under control of the control unit 31 of the function server 30, and is repeated at predetermined intervals during power up of the function server 30.

First, the control unit 31 selects a request service ID to be processed (hereafter, frequently referred to as a target request service ID) from the request service ID management table corresponding to the local news service (S1501). If a request service ID to be processed (i.e. an unprocessed request service ID) is not found (S1502: NO), the news information generating process terminates. If a request service ID to be processed is found (S1502: YES), control proceeds to step S1503 where the control unit 31 changes the value of the service start information of the reply management information corresponding to the target request service ID in the periodical reply management table to 'FALSE'.

Next, in step S1504, the control unit 31 judges whether the prepaid card number indicated by the parameter information is valid based on the parameter information of the target request service ID stored in the request service ID management table. If the prepaid card number is invalid (S1504: NO), control proceeds to step S1505 where the control unit 31 changes the service cancel information corresponding to the target request service ID in the periodical reply management table to 'TRUE'.

Next, in step S1506, the control unit 31 changes the value of the service status information to a value corresponding to an error factor of step S1504 (i.e., a factor that invalidates the prepaid card number). That is, if the use of the prepaid card number is regarded as fraud, the control unit 31 changes the value of the service status information to '−1'. If the prepaid card number is judged to be invalid only due to depletion of card points, the control unit 31 changes the value of the service status information to '−2'. After step S1506, control returns to step S1501 to further select an unprocessed request service ID.

If it is judged in step S1504 that the prepaid card number is valid (S1504:YES), control proceeds to step S1507 where the control unit 31 accesses a predetermined database to obtain local news data of a region matching with the parameter Address (See FIG. 7 or 15A) associated with the target request service ID in the request service ID management table. Next, in step S1508, the control unit 31 judges whether the value of the parameter Numpages (see FIG. 7 or 15A) associated with the target request service ID in the request service ID management table is appropriate in regard to the data amount of the local news data obtained in step S1507.

The parameter Numpages represents the number of sheets in which character data of the local news data is to be accommodated. In step S1508, if the character data of the local news data can not be accommodate in the sheets of which number of pages is indicated by the parameter Numpages, the control unit 31 judges that the value of the parameter Numpages is not appropriate. If the character data of the local news data can be accommodate in the sheets of which number of pages is indicated by the parameter Numpages, the control unit 31 judges that the value of the parameter Numpages is appropriate.

If the judgment result of step S1508 is "NO", control proceeds to step S1509 where the control unit 31 changes the value of the service cancel information corresponding to the target request service ID in the periodical reply management table. Further, the control unit 31 changes the value of service status to data including a status value '−3', a string "Numpages" as information representing a parameter causing cancellation, and a string representing a normal range for avoiding an error (e.g., a string "−3, Numpages, more than 3" (S1510). After step 51510, control returns to step S1501.

If the judgment result of step S1508 is "YES", control proceeds to step S1511 where the control unit 31 converts the obtained local news data to offering data (e.g., PDF data) of which number of pages matches the value of the parameter Numpages, and stores it in the storage unit 33. Next, in step S1512, the control unit 31 generates a URL of a destination device to which the service is provided. Then, the control unit 31 changes the service URL corresponding to the target service request ID in the periodical reply management table to the URL of the destination device to which the service is provided (S1513).

Next, in step S1514, the control unit 31 changes the service start information corresponding to the target request service ID in the periodical reply management table to 'TRUE'. Then, control returns to step S1501.

If all of the request service IDs listed in the request service ID management table have been processed (S1502: NO), the news information generating process terminates.

Figure 30:
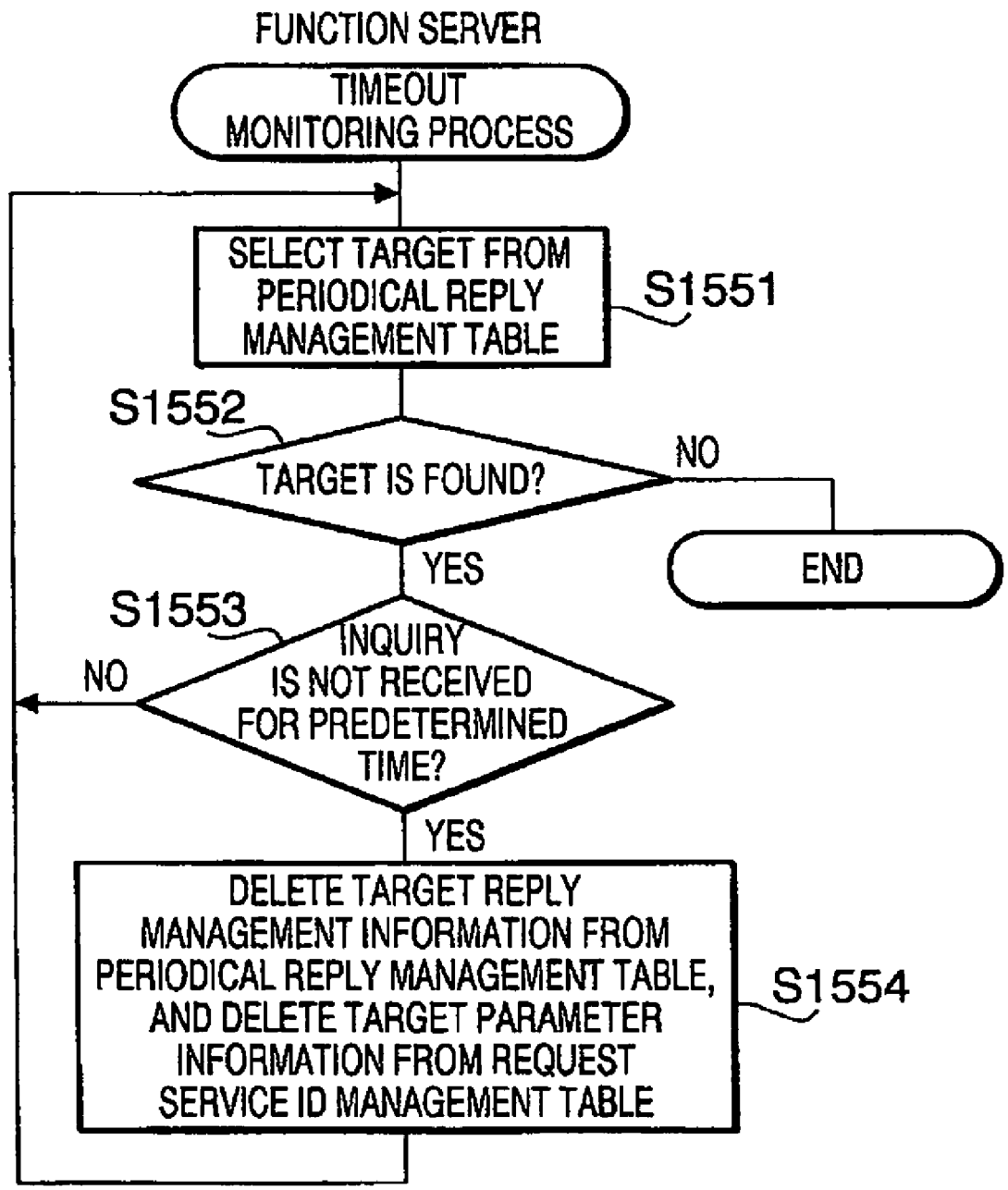
FIG. 30 is a flowchart illustrating a timeout monitoring process executed by the function server according to aspects of the invention.

Hereafter, a timeout monitoring process will be described with reference to FIG. 30. The timeout monitoring process is executed under control of the control unit 31 of the function server 30, and is repeated at predetermined intervals. By the timeout monitoring process, the reply management information of a service which receive no periodical inquiry is deleted sp that the registration of the service is deleted.

First, the control unit 31 selects a request service ID (hereafter, frequently referred to as a target request service ID) from the periodical reply management table. If an unprocessed request service ID is not found (S1552: NO), the timeout monitoring process terminates. If an unprocessed request service ID is found (S1552:YES), control proceeds to step S1553.

In step S1553, the control unit 31 judges whether the periodical inquiry about the target request service ID is not issued for a predetermined time period (e.g., three days). Specifically, in step S1553, the control unit 31 makes a judgment by judging wither the inquiry date of the target request service ID stored in the periodical reply management table is more than a predetermined time period (e.g., three days) before a current date and time.

If the periodical inquiry is not issued for the predetermined time period (S1553: YES), control proceeds to step S1554 where the control unit 31 deletes the reply management information corresponding to the target request service ID from the periodical reply management table, and deletes the parameter information corresponding to the target request service ID from the request service ID management table. Then, control returns to step S1551 to further selects a next unprocessed request service ID.

If it is judged in step S1553 that the periodical inquiry is issued for the predetermined time period (S1553: NO), control returns to step S1551 without processing step S1554. If all of the request service IDs stored in the periodical reply management table have been processed (S1552: NO), the timeout monitoring process terminates.

Hereafter, an integrated reply information receiving process, which is executed under control of the control unit 11 of the multifunction device 10 to receive a service based on the integrated reply information, will be described with reference to FIG. 31.

First, the control unit 11 waits for a response (the integrated reply information sent by the function server 30) to the periodical inquiry signal (S1601). If the response is received, the control unit 11 selects a request service ID (hereafter, frequently referred to as a target request service ID) from the integrated reply information contained in the response (S1602).

If an unprocessed request service ID is not found (S1603: NO), control proceeds to step S1606. If an unprocessed request service ID is found (S1603:YES), control proceeds to step S1604. In step S1604, the control unit 11 judges whether the Service_Status tag, which is associated with the target request service ID in the integrated reply information, has a parameter value of the parameter Service_Status. That is, the control unit 11 judges whether a value is written between the Service_Status tags which are described between in the Response_Service tags.

If the value of the parameter Service_Status is not found (i.e., <Service_Status></Service_Status>), control returns to step S1602. If the value of the parameter Service_Status is found, control returns to step S11605 where the control unit 11 displays status information corresponding to the value of the parameter Service_Status on the display 19a. Then, control returns to step S1602 to further select an unprocessed request service ID.

If all if the request service IDs in the integrated reply information have been processed (S1603: NO), control proceeds to step S1606. In step S1606, the control unit 11 judges whether services corresponding to all of the request service IDs associated with Service_Start tags having the value 'TRUE' have been received.

If a service which the multifunction device 10 has not been provided by the function server 30 is found in the request service IDs associated with the Service_Start tags having the value 'TRUE' (S1606:YES), control proceeds to step S1607.

In step S1607 the control unit 11 selects a request service ID (hereafter, referred to as a target request service ID) from the integrated reply information.

If an unprocessed request service is not found (S1608: NO), control returns to step S1606. If an unprocessed request service ID is found (S1608: YES), control proceeds to step S1609.

In step S1609, the control unit 11 judges whether the value 'TRUE' is assigned to the Service_Start tag associated with the target request service ID in the integrated reply information. That is, the control unit 11 judges whether the value 'TRUE' is written between the Service_Start tags which are written between the Response_Service tags in which the target request service is included.

If the 'TRUE' is not written between the Service_Start tags (S1609: NO), control proceeds to step S1607. If the 'TRUE' is written between the Service_Start tags (S1609: YES), control proceeds step S1610. In step S1610, the control unit 11 judges whether the input/output device (e.g., the reading unit 13, the recording unit 14, the sound input 17, or the sound output unit 18) to be used when receiving the service corresponding to the target request service ID is being used (i.e., in a busy state) by another process (another service).

If the input/output device is in a busy state (S1610: YES), control returns to step S1607. If the input/output device is not in a busy state (S1610: NO), control proceeds to step S1611 where the control unit 11 assigns the value of the Service_URL tag associated with the target request service ID in the integrated reply information to an argument, and initiates the service reception process (see FIG. 10).

Then, control returns to step S1607 where the control unit 11 selects an unprocessed request service ID, and judges whether the value of the Service_ID tag associated with the selected request service ID in the integrated reply information is 'TRUE'. If the value of the Service_ID tag associated with the selected request service ID is 'TRUE', the control unit 11 initiates another service reception process which is to be executed in parallel with the service reception process in an operating condition.

It should be noted that a new service reception process is initiated only if the new service reception process requires the input/out put device which is not used by the already initiated service reception process (i.e., only when the required input/output device is not in an busy state).

As described above, in steps S1607 to S1611, processes of services, which correspond to the request service IDs, to which the Service_Start tags having the value 'TRUE' are related, and require the input/output device not used by the already initiated service reception process, are initiated. On the other hand, with regard to processes of services which require the input/output device in a busy state, the judgment results in steps S11608 and S1608 are 'NO'. That is, such processes are processed serially.

If the control unit 10 judges that the malfunction device 10 have been received all of the services corresponding to the request service IDs to which the Service_Start tags having the values of 'TRUE' are related (S1606: YES), control proceeds to step S1620. In step S1620, the control unit 11 initiates an ending service analyzing process. After the ending service analyzing process is finished, control returns to step S1601 to wait for a next integrated reply information.

Figure 32:
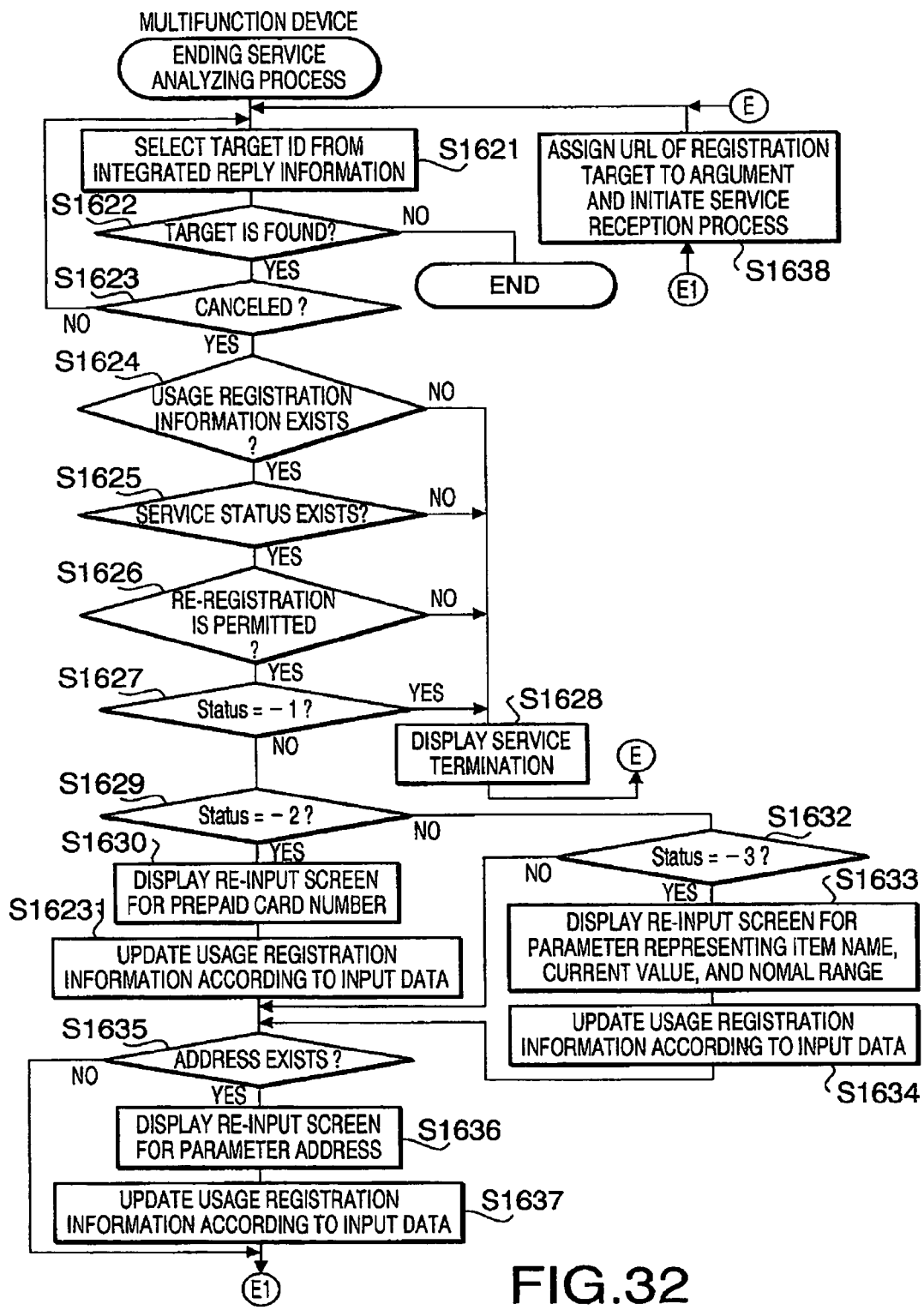
FIG. 32 is a flowchart illustrating an ending service analyzing process executed by the multifunction device according to aspects of the invention.

Hereafter, the ending service analyzing process which is executed under control of the control unit 11 will be described with reference to FIG. 32. First, the control unit 11 selects a request service ID (hereafter, frequently referred to as a target request service ID) from the integrated reply information contained (S1621). If an unprocessed request service ID is not found (S1622: NO), the ending service analyzing process terminates.

If an unprocessed request service ID is found (S1622: YES), control proceeds to step S1623 where the control unit 11 judges whether the value of the Service_Canceled tag associated with the target request service ID in the integrated reply information is 'TRUE'. If the value the Service_Canceled tag is not 'TRUE' (S1623: NO), control returns to step S1621 to process a next unprocessed request service ID.

If the value of the Service_Canceled tag is 'TRUE' (S1623: YES), control proceeds to step S1624 where the control unit 11 judges whether the usage registration information corresponding to the target request service ID exists in the storage unit 16. If the usage registration information is not stored in the storage unit 16 (S1624: NO), control proceeds to step S1628 where the control unit 11 displays a message indicating the termination of the service on the display 19a, together with character information representing the request service ID of the service. Then, control returns to step S1621.

If the usage registration information is stored in the storage unit 16 (S1624: YES), control proceeds to step S1625 where the control unit 11 judges whether the Service_Status tag corresponding to the target request service ID in the integrated reply information has a value (a string). If the Service_Status tag has not a value, i.e., the Service_Status tag is empty (<Service_Status></Service_Status >) (S1625: NO), control proceeds to step S1628 where the control unit 11 displays a message indicating the termination of the service on the display 19a, together with character information representing the request service ID of the service. Then, control returns to step S1621.

If the Service_Status tag has a value (a string) (S1625: YES), control proceeds to step S1626 where the control unit 11 judges whether the re-registration permission information corresponding to the target request service ID in the periodical inquiry management table is 'TRUE'.

If the re-registration permission information is not 'TRUE' (S1626: NO), control proceeds to step S1628 where the control unit 11 displays a message indicating the termination of the service on the display 19a. Then, control returns to step S1621.

If the re-registration permission information is 'TRUE' (S1626: YES), control proceeds to step S1627 where the control unit 11 judges whether the value of the Service_Status tag associated with the target request service ID in the integrated reply information is '−1'. If the value of the Service_Status tag is '−1' (S1627: YES), control proceeds to step S1628 where the control unit 11 displays a message indicating the termination of the service on the display 19a. Then, control returns to step S1621.

If the value of the Service_Status tag is not '−1' (S1627: NO), control proceeds to step S1629 where the control unit 11 judges whether the value of the Service_Status tag associated with the target request service ID in the integrated reply information is '−2'. If the value of the Service_Status tag is '−2' (S1629: YES), control proceeds to step S1630 where the control unit 11 displays a re-input screen on the display 19a so as to accept the re-input of the prepaid card number.

Next, in step 1631, the control unit 11 updates the usage registration information in the storage unit 16 in accordance with the prepaid card number inputted by a user through the operation unit 12. That is, the control unit 11 changes the parameter Prepaid of the usage registration information stored in the storage unit 16 to the prepaid card number inputted through the operation unit 12. Then, control proceeds to step S1635.

If it is judged in step S1629 that the value of the Service_Status tag is not '−2' (S1629: NO), control proceeds to step S1632 where the control unit 11 judges whether the value of the Service_Status tag associated with the target request service ID in the integrated reply information is '−3' (or a string including an appendix having a status value '−3'). If the value of the Service_Status tag is '−3' or a string including an appendix having a status value '−3', control proceeds to step S1633. In step S1633, the control unit 11 displays a re-input screen for parameters.

Figure 33:
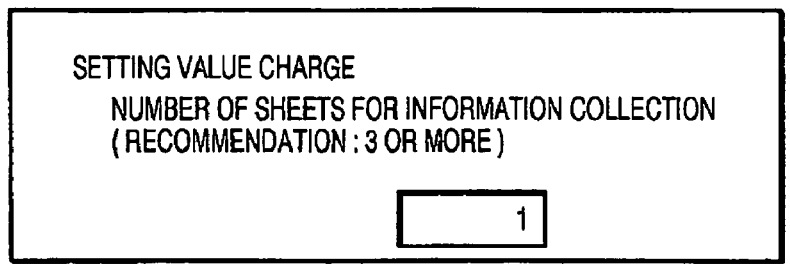
FIG. 33 shows an example of a re-input screen for a parameter which caused service cancellation according to aspects of the invention.

Specifically, in step S1633, if the Service_Status tag is '−3', the control unit 11 displays a re-input screen for accepting a user input of parameters other than the parameter Prepaid on the display 19a, based on the parameter information contained in the usage registration information corresponding to the target request service ID. In step S1633, if the Service_Status tag is a string including an appendix having a status value '−3', the control unit 11 displays a re-input screen for the parameters that caused service cancellation (termination of a service), based on information representing the parameters that caused the service cancellation and strings representing normal ranges for removing the errors of the parameters. FIG. 33 shows an example of a re-input screen for a parameter which caused service cancellation.

As shown in FIG. 33, in the re-input screen, a string of a parameter name that caused the service cancellation (e.g., "the number of sheets to be used for accommodating information") and an inputting field for the parameter are displayed. In the inputting field, the value of the parameter currently registered in the usage registration information (e.g., the value of the parameter Numpage) is displayed as a default value. Between the string of the parameter name and the input field, a string representing a normal range of the parameter (e.g., "more than 3") is displayed. In this case, the string representing the parameter tat caused the service cancellation and the input field for the parameter are prepared and displayed based on the service I/F information in the usage registration information.

After step S1633, control proceeds step S1634 where the control unit 11 updates the parameter (e.g., the parameter Numpages) of the usage registration information of the target request service ID, based on the information inputted by a user through the re-input screen. Then, control proceeds to step S1635.

If the value of the Service_Status tag is not '−3' and a string including an appendix having a status value '−3' (i.e., Service_Status tag is not '−4') (S1632: NO), control proceeds to step S1635.

In step S1635, the control unit 11 judges whether the usage registration information corresponding to the target request service ID in the storage unit 16 contains the value of the parameter Address. If the parameter Address is contained (S1635: YES), control proceeds to step S1636 where the control unit 11 displays an input screen for accepting a user input of the parameter Address on the display 19a, based on the service I/F information contained in the usage registration information (e.g., Form_Elem tag at the top of the service I/F information shown in FIG. 7).

Next, in step S1637, the control unit 11 updates the usage registration information corresponding to the target request service ID in the storage unit 16 in accordance with the inputted information (e.g., the value of the parameter Address or selected data thereof) from the operation unit 12. That is, the control unit 11 changes the value of the parameter Address contained ion the usage registration information to the value equal to the information inputted through the operation unit 12. Then, control proceeds to step S1638.

If it is judged in step S1635 that the parameter Address is contained in the usage registration information corresponding to the request service ID in the storage unit 16 (S1635: NO), control proceeds to step S1638.

In step S1638, the control unit 11 initiates a service reception process (see FIG. 10) based on the updated usage registration information for the target request service ID. That is, the control unit 11 assigns a URL of a destination device for usage registration (i.e., a link location) contained in the updated usage registration information to an argument, and initiated a service reception process.

By the above mentioned configuration, the control unit 11 executes a service reception process which is executed in parallel with the ending service analyzing process, and the control unit 11 accesses the function server 30 in the service reception process (see step S301) to cause the function server 30 to initiate the registration process (see S405). The control unit 11 executes the parameter information transmission process shown in FIG. 19 in accordance with the UI job initiation command sent from the registration process and the parameter request command sent from the service side UI job. Then, steps S861 to S863 are processed.

After the service reception process is initiated in step S1638, control returns to step S1621 to select un a next unprocessed request service ID. If all of the request service IDs contained in the integrated reply information have been processed (S1622: NO), the ending service analyzing process terminates.

Hereafter, processes executed by the function server 30 in regard to services will be described. As described above, if the control unit 11 of the multifunction device 10 initiates the service reception process in step S1611 after processing the request service IDs for the blog search service and the local news service, the control unit 11 accesses the function server 30 (S301) in accordance with the service URL assigned to the argument so as to cause the function server 30 to initiate the periodical service offering process (S405).

Figure 34:
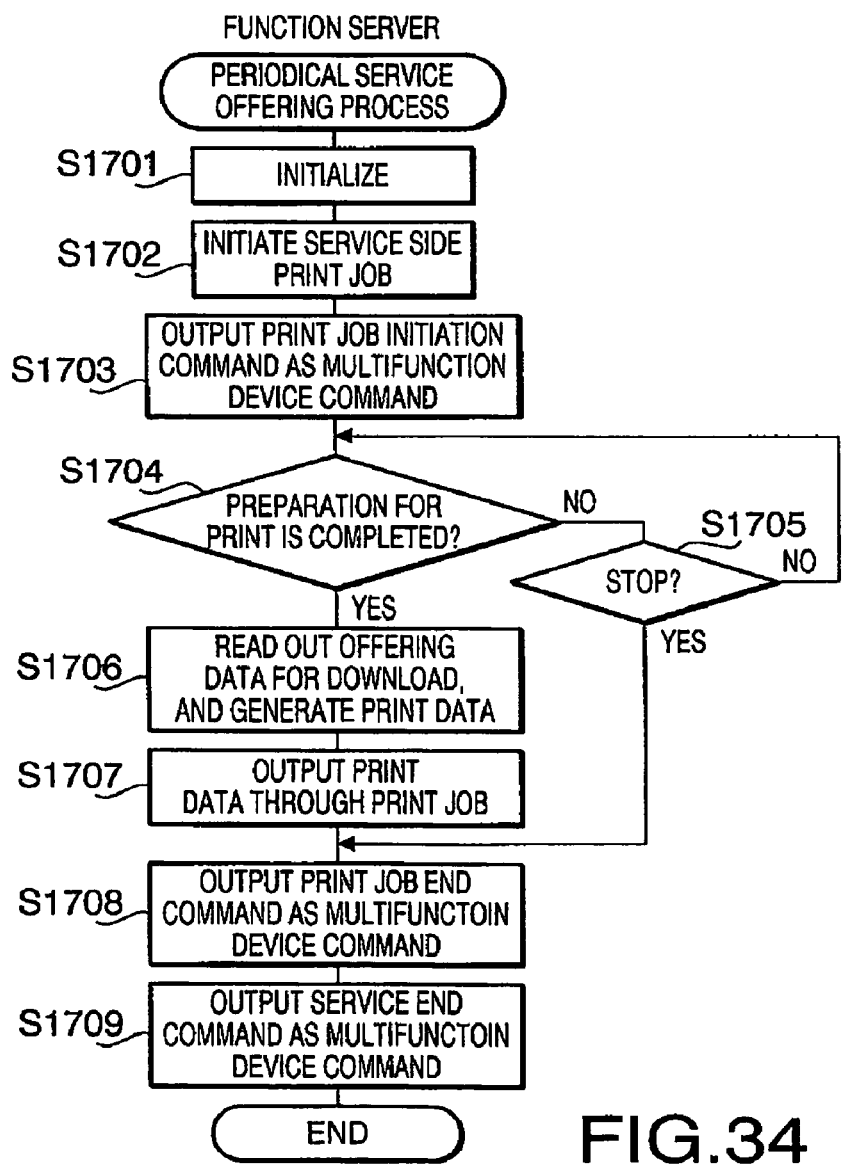
FIG. 34 is a flowchart illustrating a periodical service offering process executed by the function server according to aspects of the invention.

FIG. 34 is a flowchart illustrating the periodical service offering process executed under control of the control unit 31 of the function server 30. In this situation, the URLs of the function server 30 which will execute the periodical service offering process regarding the blog search service and the local news service are stored in the service URL of the periodical reply management table. In the service URL, the URL is described for each of the service types (i.e., for each of the blog search service and the local news service). Since the access to the function server 30 by the different URLs, a periodical service offering process is initiated for the service initiation command for the blog search service, and another periodical service offering process is initiated for the service initiation command for the local news service.

As shown in FIG. 34, first, the control unit 31 executes an initialization process (S1701). Then, the control unit 31 initiates a service side print job which will be described later with reference to FIG. 35 (S1702). In step S1703, the control unit 31 issues a print job initiation command as the multifunction device command. Specifically, in step S1703, the control unit 31 writes the print job initiation command in the reply information area corresponding to the session ID generated in step S405.

The print job initiation command is thus sent to the multifunction device 10 through the service control information process. In the print job initiation command, a job ID of the service side print job initiated in step S1702 and a URL of a destination device for communication in the job.

Next, in step S1704, the control unit 31 judges whether the control unit 31 receives a notification indicating the completion of preparation of printing from the service side print job. If the notification is not received (S1704: NO), control proceeds to step S1705 where the control unit 31 judges whether the control unit 31 receives a notification indicating the stop of the service side print job. If the notification indicating the stop of the service side print job is not received (S1705: NO), control returns to step S1704 to wait for the notification indicating the stop of the service side print job or the notification indicating the completion of preparation of printing. If the notification indicating the stop of the service side print job is received (S1705: YES), control proceeds to step S1708. If the notification indicating the completion of preparation of printing is received in step S1704 (S1704: YES), control proceeds to step S1706.

In step S1706, the control unit 31 reads out the offering data as the download target designated by the URL provided by the multifunction device 10 at the initiation of this periodical service offering process, and converts the offering data to print data matching the functional performance of the recording unit 14 of the multifunction device 10. Then, in step S1707, the control unit 31 sends the print data to the multifunction device 10 as an accessing source device by providing the print data for the service side print job with the print data.

Next, in step S1708, the control unit 31 waits for the termination of the service side print job. If the service side print job terminates, the control unit 31 issues a print job end command as the multifunction device command. Specifically, the control unit 31 writes the print job end command in the reply information are corresponding to the session ID generated in step S405.

The print job end command is thus sent to the multifunction device 10 as the multifunction device command through the service control information process. In the print job end command, the job ID and the URL of a destination device for communication in the job are contained.

Next, in step S1709, the control unit 31 issues the service end command as the multifunction device command, so that the service end command is received by the multifunction device 10. After step S1709, the periodical service offering process terminates.

Figure 35:
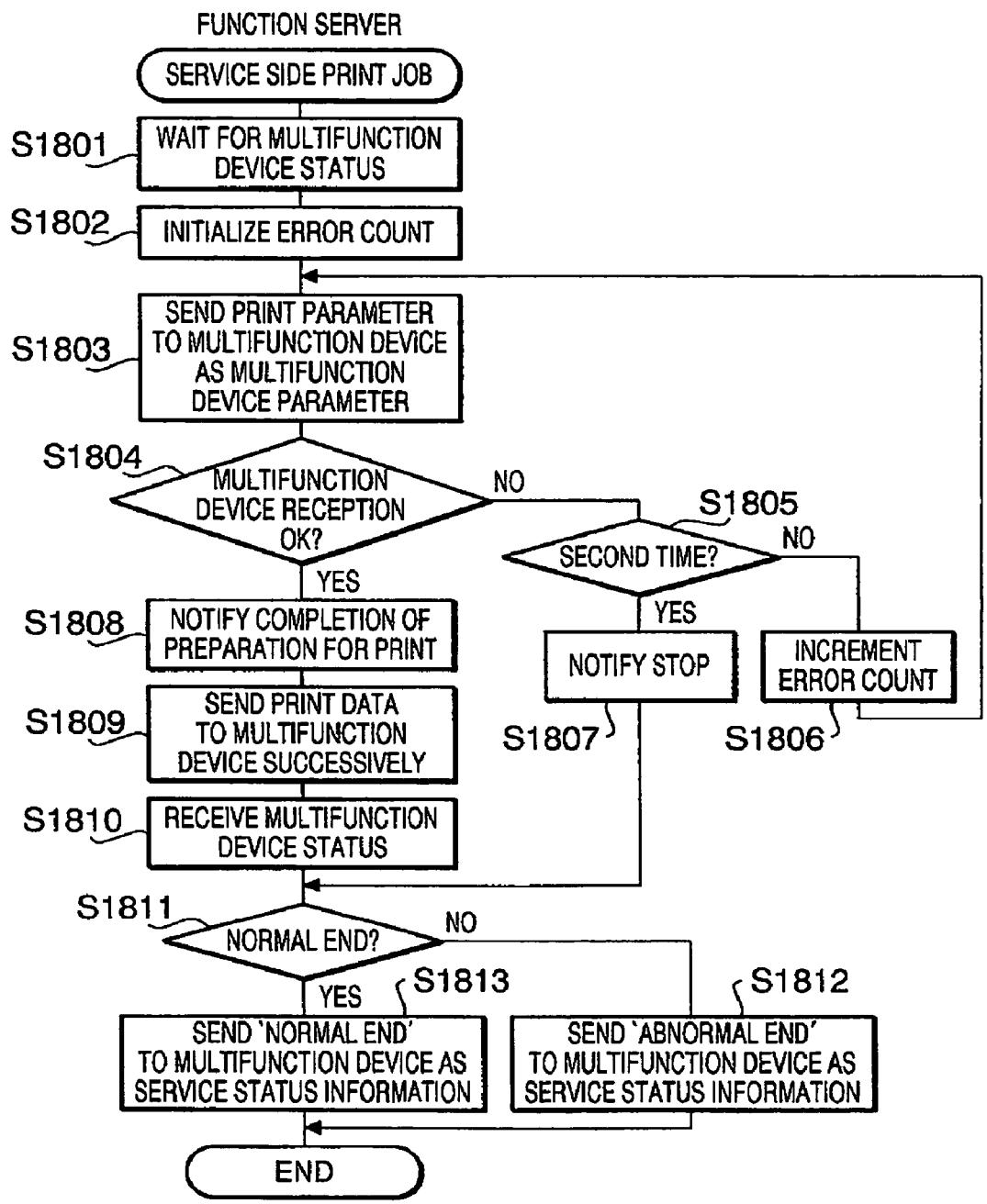
FIG. 35 is a flowchart illustrating a service side print job executed by the function server according to aspects of the invention.

Hereafter, the service side print job initiated in step S1702 of the periodical service offering process will be described with reference to FIG. 35. FIG. 35 is a flowchart illustrating the service side print job executed under control of the control unit 31 of the function server 30. It should be noted that the service side print job is executed in parallel with other processes.

First, the control unit 31 waits for multifunction device status information (S1801). The multifunction device status information is outputted in step S1904 of an output job (which is described later with reference to FIG. 36) by the control unit 11 of the multifunction device 10.

If the control unit 31 receives the multifunction device status information, the control unit 31 initializes an error count (S1802). Then, the control unit 31 sends parameters (multifunction device parameter) to be applied to the recording unit 14 to the multifunction device 10 (S1803).

Next, in step S1804, the control unit 31 judges whether the multifunction device parameter is successfully received by the multifunction device 10. Specifically, in step S1804, the control unit 31 judges that the multifunction device parameter is successfully received if the control unit 31 receives a notification "normal reception" as a multifunction device reception status outputted in step S1909 of the output job, and judges that the multifunction device parameter is not successfully received if the control unit 31 receives a notification "abnormal reception" as a multifunction device reception status outputted in step S11908 of the output job.

If the multifunction device parameter is not successfully received (S1804: NO), control proceeds to step S1805 where the control unit 31 judges whether the number of times that the multifunction device parameter is not successfully received is two based on the error count. If the number of times is not two (i.e., the number of times is one), control proceeds to step S1806 where the error count is incremented. Then, control returns to step S1803.

If the number of times is two (S1805: YES), control proceeds to step S1807 where the control unit 31 sends the notification indicating the stop of the service side print job to the source process which has initiated the service side print job. In this case, the control unit 31 judges that an ending status of this process is not "normal end". In this case, in step S1812, the control unit 31 sends information representing the abnormal end as the service status information to the multifunction device 10. Then, the service side print job terminates.

If the multifunction device parameter is successfully received (S1804: YES), control proceeds to step S1808 where the control unit 31 sends a notification indicating the completion of preparation for printing to the source process (the periodical service offering process). Then, the control unit 31 successively sends the print data to the multifunction device 10 (S1809).

Next, in step S1810, the control unit 31 waits for the multifunction device status information. If the multifunction device status information is received, control proceeds to step S1811. The multifunction device status information is outputted in step S1913 in the output job (see FIG. 36) by the control unit 11 of the multifunction device 10.

In step S1811, the control unit 31 judges whether the transmission of the print data is successfully completed. If the transmission of the print data is not successfully completed (S1811: NO), control proceeds to step S1812. If the transmission of the print data is successfully completed (S1811; YES), control proceeds to step S1813 where the control unit 13 sends information representing the normal end as the service status information to the multifunction device 10. Then, the service side print job terminates.

Hereafter, the output job which executed in response to the print job initiation command issued in step S1703 of the periodical service offering process (see FIG. 34) will be described with reference to FIG. 36.

First, the control unit 11 judges whether an output device (which is the recording unit 14 if the control unit 11 received the print job initiation command, or the sound output unit 18 if the control unit 11 received the speaker job initiation command) is in a busy state (S1901). The control unit 11 makes a judgment based on a busy flag Fo representing a status of the output device. Specifically, the control unit 11 judges that the output device is in a busy sate if the busy flag Fo is ON, and judges that the output device is not in a busy state if the busy flag Fo is OFF.

If the output device is in a busy state (S1901: YES), control proceeds to step S1902 where the control unit 11 waits until the busy state of the output device is removed. If the output device is not in s busy state (S1901: NO), the control unit 11 turns the busy flag Fo to ON (S1903). Then, the control unit 11 transmits the multifunction device status information containing the session ID and job ID to the function server 30 (S1904).

Next, in step S1905, the control unit 11 receives the multifunction device parameter sent by the function server 30 as a response to the multifunction device status information. As described above, the multifunction device parameter is sent in step S1803 in the service side print job by the function server 30.

Next, the control unit 11 judges whether an end command has been received from the source process (service reception process) that initiated the output process (S1906). As described above, the end command is outputted by the control unit 11 in step S310 in the service reception process (FIG. 10). If the end command has not been received (S1906: NO), the control unit 11 judges whether the multifunction device parameter has been successfully received (S1907).

If the multifunction device parameter has not been successfully received (S1907: NO), control proceeds to step S1908 where the control unit 11 sends a notification "abnormal reception" to the function server 30 as the multifunction device reception status indicating whether the multifunction device 10 has successfully received information from the function server 30. The multifunction device reception status includes the session ID and the job ID.

If the multifunction device parameter has been successfully received (S1907: YES), control proceeds to step S1909 where the control unit 11 sends a notification "normal reception" to the function server 30 as the multifunction device reception status. Next, in step S1910, the control unit 11 receives output data (e.g., print data or audio data) from the function server 30. As described above, the print data is sent by the function server 30 in step S1809 in the service side print job.

Next, in step S1911, the control unit 11 sets the multifunction device parameter for the output device (e.g., the recording unit 14 or the sound output unit 18) to output data For example, if the output job is initiated in response to the print job initiation command which is issued in the periodical service offering process executed by the function server 30, the control unit 11 performs a printing process based on the print data provided by the function server 30 by using the recording unit 14.

Specifically, if the periodical service offering process is a process for offering the blog search service to the multifunction device 10, and the output job is a process for receiving the blog search service, the posted comment searched in the blog search process is outputted through the recording unit 14. If the periodical service offering process is a process for offering the local news service to the multifunction device 19, and the output job is a process for receiving the local news service, the news data generated in the news information generating process is printed out through the recording unit 14.

Next, in step S1912, the control unit 11 changes the parameter set for the output device in step S1912 to previous values. Then, the control unit 11 transmits the multifunction device status information to the function server 30 (S1913).

Next, in step S1914, the control unit 11 receives the service status information from the function server. Then, the control unit 11 turns the busy flag Fo to OFF. Then, the output job terminates.

Figure 37:
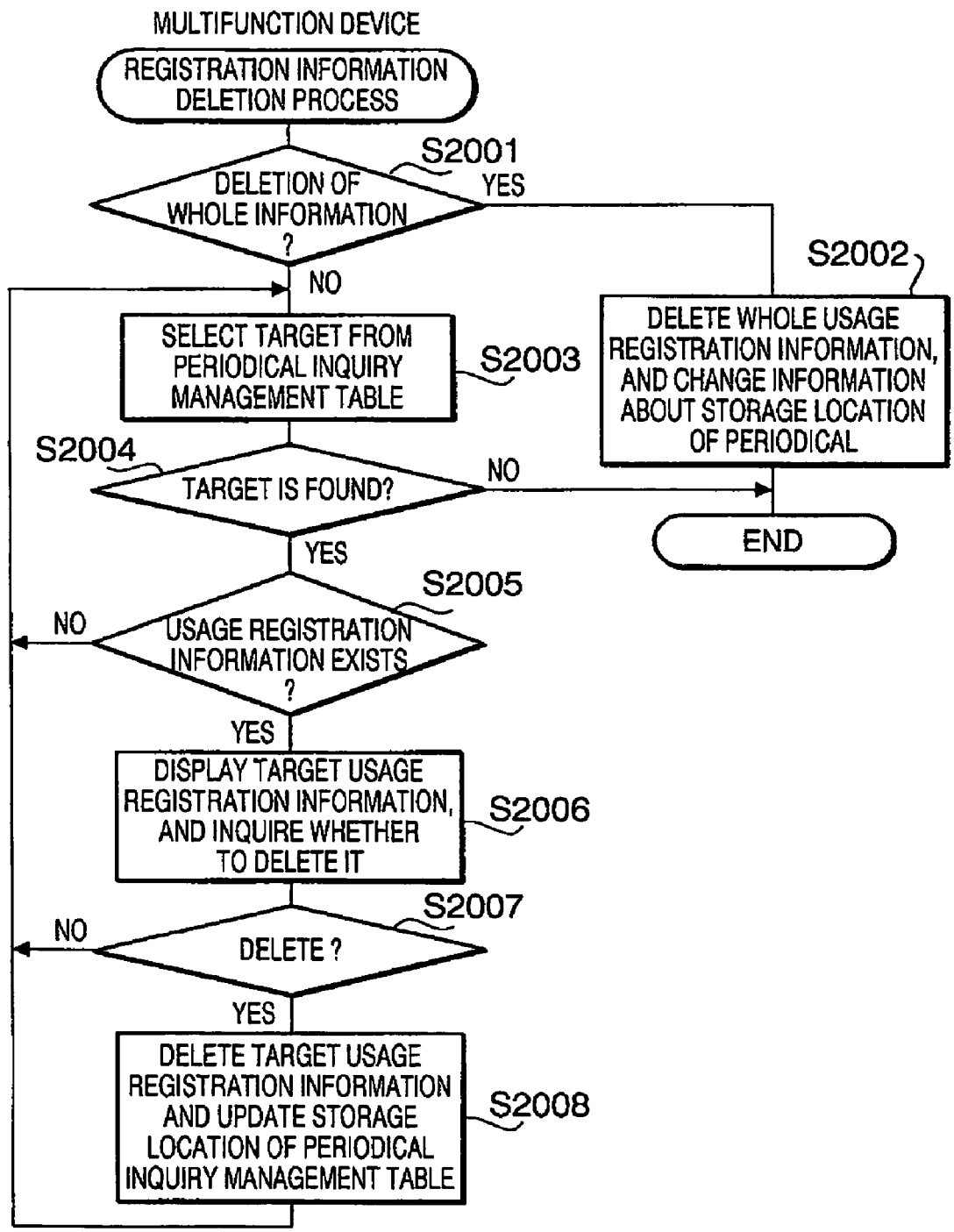
FIG. 37 is a flowchart illustrating a registration information deletion process executed by the multifunction device according to aspects of the invention.

Hereafter, a registration information deletion process which is executed under control of the control unit 11 and is initiated when a deletion command for the usage registration information is inputted by a user through the operation unit 12 will be described with reference to FIG. 37. First, the control unit 1 judges whether the inputted deletion command is a command instructing the control unit 11 to delete all the registration data stored in the storage unit 16 (S2001). If the deletion command is a command instructing the control unit 11 to delete all the registration data (S2001: YES), the control unit 11 changes the storage location information of the usage registration information stored in the periodical inquiry management table to space data (S2002). Then, the registration information deletion process terminates.

If the deletion command is not a command instructing the control unit 11 to delete all the registration data (S2001: NO), the control unit 11 selects a request service ID (hereafter, referred to as a target request service ID) from the periodical inquiry management table. If an unprocessed request service ID is not found (S2004: NO), the registration information deletion process terminates.

If an unprocessed request service ID is found (S2004: YES), the control unit 11 judges whether the usage registration information of the target request service ID is stored in the storage unit 16 based on the storage location information of the target request service ID (S2005). Specifically, in step S2005, if the storage location information is space data, the control unit 11 judges that the usage registration information of the target request service ID is not stored in the storage unit 16. If the storage location information is not the space data, the control unit 11 judges that the usage registration information of the target request service ID is stored in the storage unit 16.

If the usage registration information is not stored in the storage unit 16 (S2005: NO), control returns to step S2003 to select an unprocessed request service ID. If the usage registration information is stored in the storage unit 16 (S2005: YES), the control unit 11 displays the usage registration information of the target request service ID, and inquires of a user whether to delete the usage registration information (S2006). Then, the control unit 11 waits until the operation unit 12 is operated by the user.

If the user operation is conducted through the operation unit 12, the control unit 11 judges whether a deletion execution command has been inputted by the user based on inputted data (S2007). If the deletion execution command has been inputted (S2007: YES), the control unit 11 deletes the usage registration information of the target request service ID from the storage unit 16, and changes the storage location information constituting the inquiry management information of the target request service ID (S2008). Then, control returns to step S2003.

If it is judged in step S2007 that the deletion execution command has not been inputted (S2007: NO), control returns to step S2003 without executing step S2008. If all of the unprocessed request service IDs in the periodical inquiry management information have been processed (S2004: NO), the registration information deletion process terminates.

In the above mentioned embodiment, communication based on HTTP is performed between the function server 30 and the multifunction device 10, by which various services (e.g., the blog search service and local news service) can be provided to the multifunction device 10.

The function server 30 stores parameter information containing one or more parameters defining a service to be provided to the multifunction device 10 in the request service ID management table while associating the parameter information with the request service ID serving as an identification of the multifunction device 10. That is, a plurality of pieces of parameter information can be stored in the request service ID management table.

When the control unit 31 of the function server 30 receives the service initiation command addressed to a URL corresponding to the registration process, the control unit 31 interprets the service initiation command as a request for registration for a service, and executes the registration process. In this case, the control unit 31 executes the service side UI job to receive the parameter information of the service, generates a request service ID as an identification of the service, and stores the parameter information in the request service ID management table while associating the parameter information with request service ID (S607).

The function server 30 transmits the request service ID generated as described above only to a source device (the multifunction device 10) that issued the service initiation command, together with the periodical inquiry start command. Therefore, in the function server 30, the request service ID is used as identification of the multifunction device 10 to which the service is to be provided.

Figure 28:
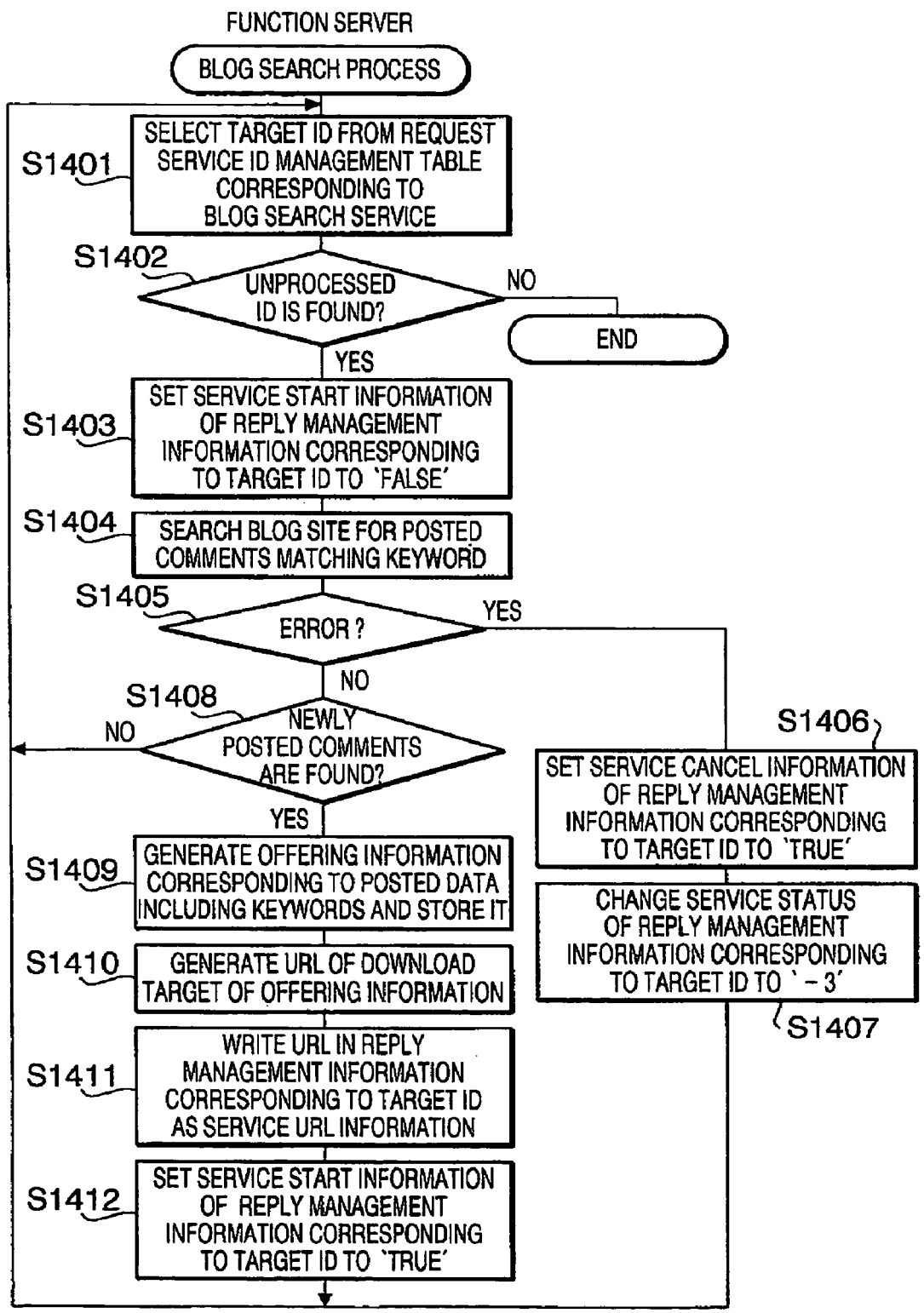
FIG. 28 is a flowchart illustrating a blog search process executed by the function server according to aspects of the invention.
Figure 29:
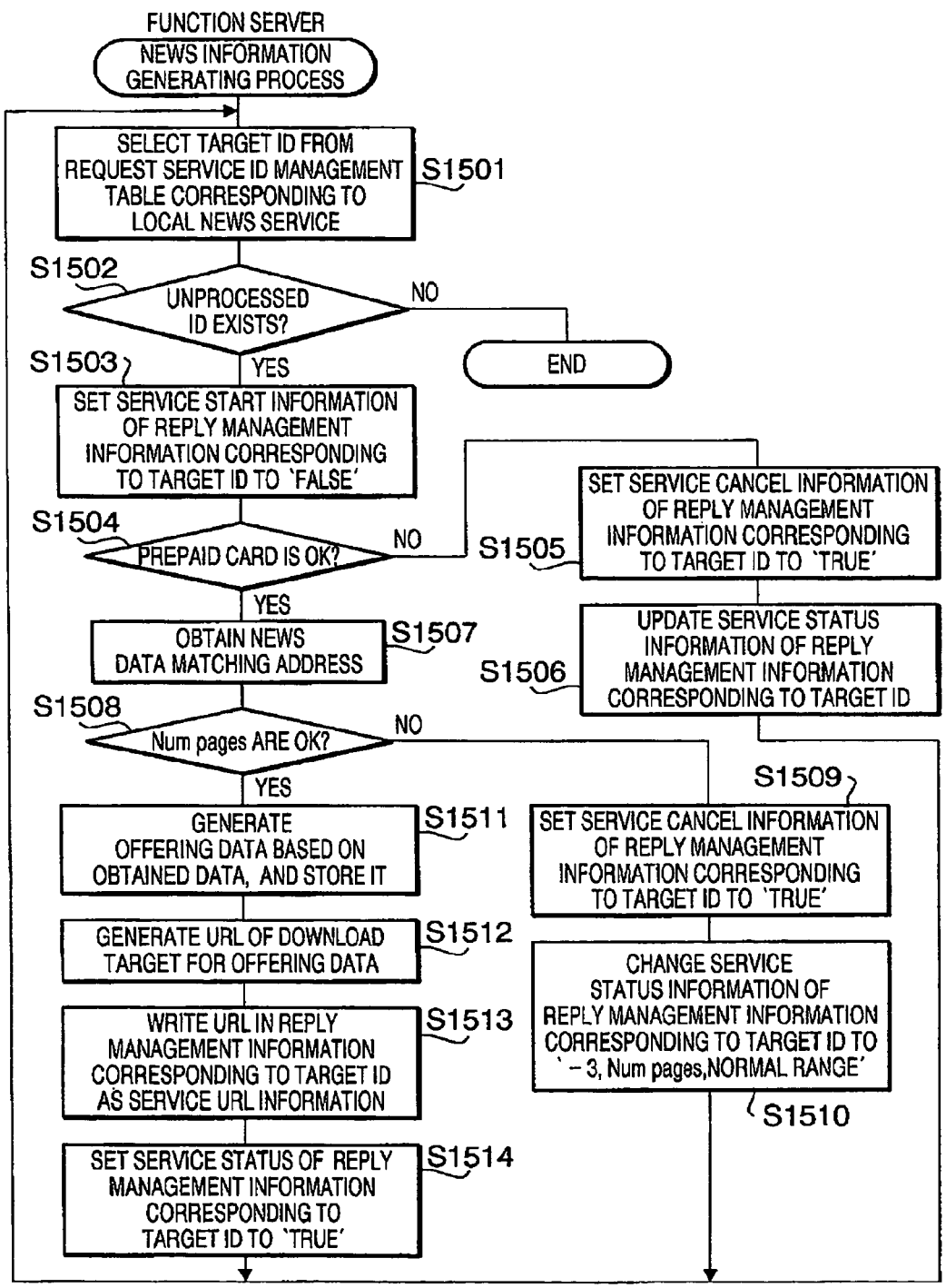
FIG. 29 is a flowchart illustrating a news information generating process executed by the function server according to aspects of the invention.

In the function server 30, service data to be provided to a client is generated by service software 37 (e.g., service software 37 for the blog search process shown in FIG. 28 or service software 37 for the news information generating process shown in FIG. 29) prepared for each service type. Further, by notifying the multifunction device 10, to which the service is to be provided, of a URL of a downloading target for the service data along with the request service ID to, the function server 30 provides the service data to the multifunction device 10 though the periodical service offering process shown in FIG. 34.

Further, the function server 30 judges whether an end condition of a service corresponding to the parameter information is satisfied, for each of the pieces of parameter information stored in the request service ID management table (S1405, S1504, S1508). The function server 30 changes the service cancel information of the service (request service ID) judged to satisfy the end condition to "TRUE".

With the registration of the parameter information to the request service ID management table, the function server 30 judges whether the service corresponding to each of the pieces of parameter information satisfies the end condition based on the reply management information stored in the periodical reply management table (e.g., whether a predetermined time has been elapsed after the latest inquiry). The function server 30 deletes the parameter information and the reply management information of the service (request service ID) judged to satisfy the end condition (S1116, S1555) so as to terminate the service.

The multifunction device 10 initiates the service reception process when receiving an user input requesting the registration through the operation unit 12. In the service reception process, the multifunction device 10 transmits the service initiation command to the function server 30, obtains information about the parameters of the service which the multifunction device 10 receives from the function server 30 through the operation unit 12 (S852), and transmits the information about the parameters to the function server 30 (S853, S870, S806) so as to attain the usage registration for the service.

When transmitting the parameter information, the multifunction device 10 copies the parameter information, generates the usage registration information containing the parameter information, and stores the usage registration information in the storage unit 16 (S857).

Figure 31:
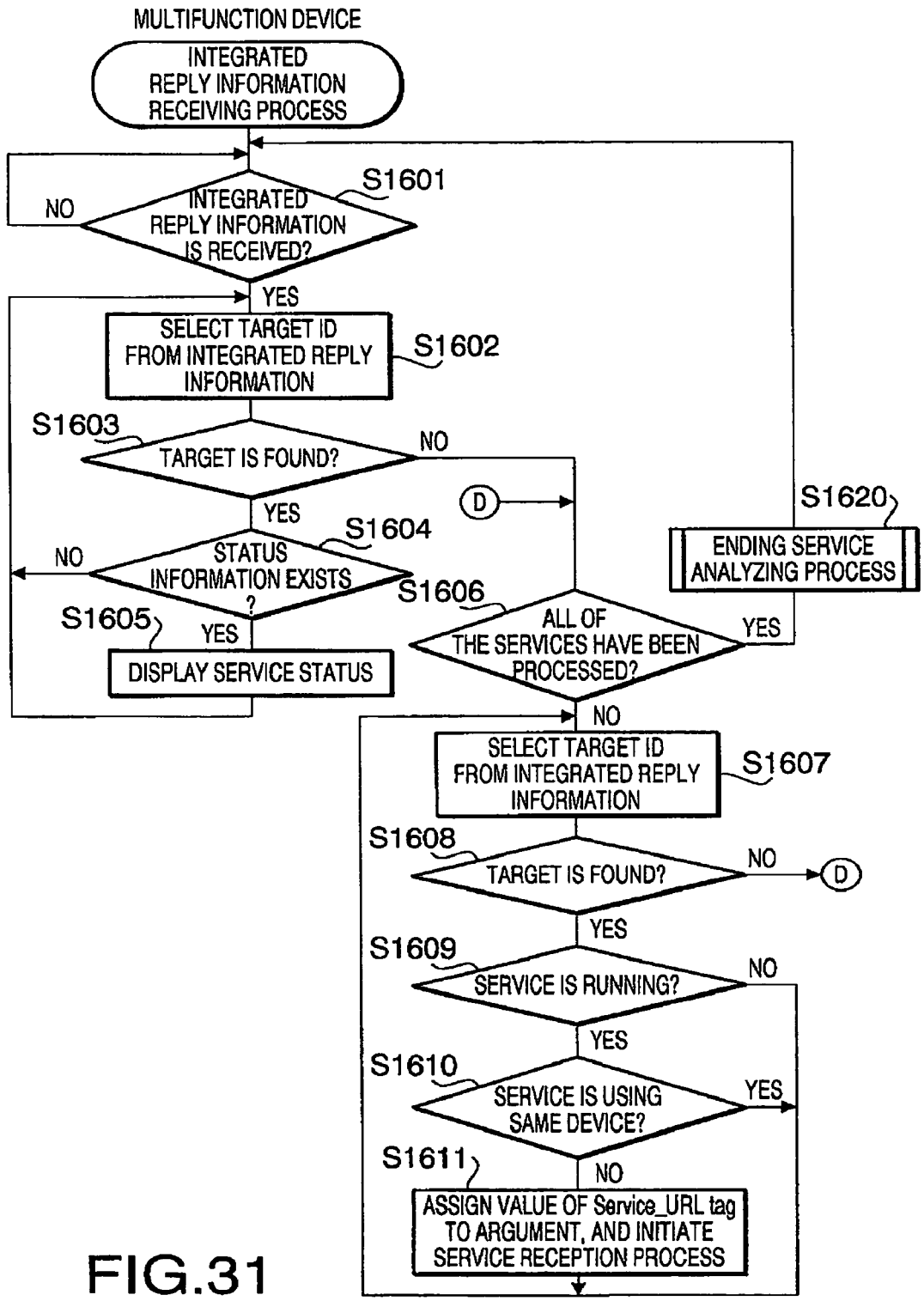
FIG. 31 is a flowchart illustrating an integrated reply information receiving process executed by the multifunction device according to aspects of the invention.
Figure 36:
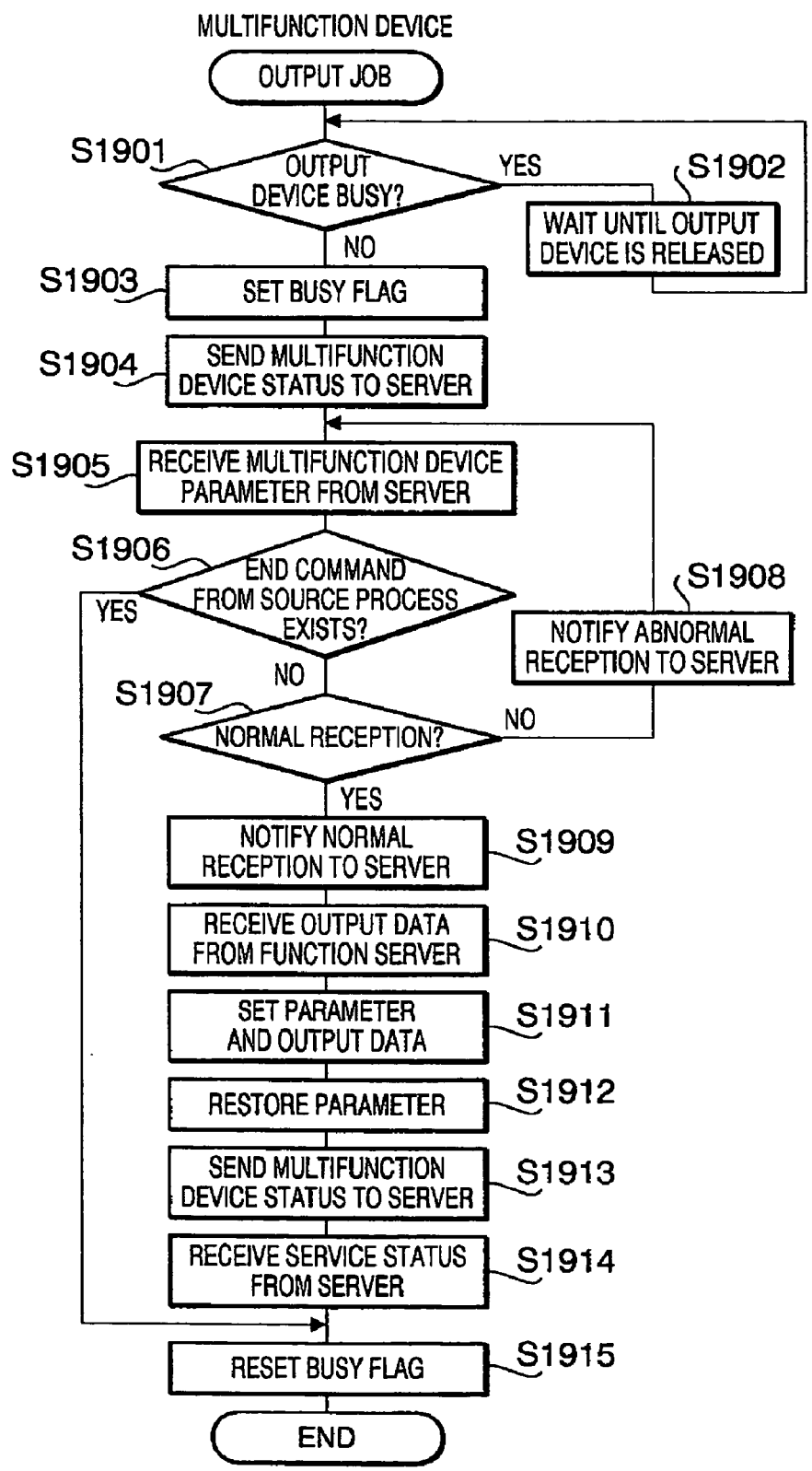
FIG. 36 is a flowchart illustrating an output job executed by the multifunction device according to aspects of the invention.

In the output job shown in FIG. 36, the multifunction device 10 receives the service provided from the function server 30 in relation to the usage registration, through the periodical inquiry process shown in FIG. 20 and the integrated reply information receiving process shown in FIG. 31, so that the information obtained in the service is printed out from the recording unit 14. That is, the print out function for the information provided by the function server 30 is attained through the output job.

The multifunction device 10 detects termination of a service terminated by the function server 30, by receiving the integrated reply information. Specifically, if the multifunction device 10 finds the request service ID having the Service_Canceled tag having the value 'TRUE', the multifunction device 10 judges that the service corresponding to the request service ID is terminated by the function server 30.

If the terminated service exists, the multifunction device 10 initiates the service reception process in step S1638, transmits the service initiation command to the function server 30 to initiate the registration process, reads out the usage registration information of the terminated service stored in the storage unit 16 (S861), and transmits the parameter information contained in the usage registration information to the function server 30 so that the usage registration for the terminated service can be made again.

As described above, according to the embodiment, the multifunction device 10 stores the parameter information which is also transmitted to the function server 30 in a first-time registration (S857). The parameter information is read out from the storage unit 16 when the re-registration is performed, and the parameter information read out from the storage unit 16 is transmitted to the function server 30 (S861, S863, S870, S806). Therefore, the re-registration is attained without requiring the user operation for the re-registration. That is, according to the embodiment, the re-registration for a service of which usage registration is deleted in the function server 30 is attained without requiring a user operation.

The multifunction device 10 judges whether the usage registration for the terminated service is necessary based on the value of the Service_Status tag transmitted from the function server 30 (S1627). Since step S1638 is processed only when the judgment result of step S1627 is "No", usage registration for the services which need the re-registration can be selectively performed, and the execution of the re-registration for the services which do not need the re-registration can be avoided.

Specifically, in the embodiment, the Service_Status tag is set to '−1' if the service is terminated due to the invalid prepaid card number, and the value of the Service_Status tag is provided to the multifunction device 10 so that the usage registration is not performed automatically. Therefore, according to the embodiment, the usage registration is prevented from being performed despite the fact that a user does not want the automatic re-registration.

In the embodiment, the multifunction device 10 receives, form the user, the re-registration permission information indicating whether the user permits the re-registration for the service, by asking the user whether the user permits the re-registration (S856, S858). The multifunction device 10 stores the re-registration permission information in the periodical inquiry management table for each of the registered services (S213, S313).

If the multifunction device 10 detects a terminated service (S1623: YES), the multifunction device 10 judges whether re-registration of the terminated service is permitted in accordance with the re-registration permission information stored in the periodical inquiry management table (S1626). If the re-registration of the terminated service is not permitted, the multifunction device 10 does not process step S1638.

Since the multifunction device 10 determines whether to execute the re-registration of a terminated service in accordance with the user's intension, the re-registration is prevented from being executed despite the fact that the user does not want the re-registration for the terminated service.

If the multifunction device 10 detects a terminated service, the multifunction device 10 determines the parameter whose value should be changed according to the value of the Service_Status tag indicating the factor of the termination of the service, and displays the re-input screen for the parameter corresponding to the value of the Service_Status (S1630, S1633). Specifically, if the value of the Service_Status tag is '−2', the re-input screen including the input field for the parameter is displayed, together with the message requesting the change of the prepaid card number (S1630). If the value of the Service_Status tag is '−3', the appropriate range of the value of the parameter and the re-input screen including the input field for the parameter is displayed, together with the message requesting the change of the prepaid card number (S1633).

When the value of the parameter is newly inputted by the user through the operation unit 12, the multifunction device 10 changes the value of the parameter stored in the usage registration information in the storage unit 16 to the newly inputted value, so that the re-registration for the service can be made using the value of the parameter newly inputted through the re-input screen.

Since the user can change the value of the parameter causing the termination of the service, and then make a re-registration for the service using the changed value for the parameter, the re-registration for the service can be made by requesting the user input only for the particular parameter. It should be noted that the re-registration is made without requesting the user to perform a trouble some input operation for the parameter information.

The function server 30 judges that the end condition is satisfied if the normal execution of the service becomes impossible due to the value of the parameter of the parameter information. Further, the function server 30 transmits the appropriate range of the value of the parameter causing the termination of the service to the multifunction device 10. The multifunction device 10 displays the appropriate range of the value of the parameter causing the termination of the service, together with the message requesting the change of the value of the parameter causing the termination of the service (S1633). Consequently, the user is prevented from inputting an inappropriate value of the parameter. Therefore, the re-registration can be finished smoothly.

In the above mentioned embodiment, if the deletion command is inputted, the re-registration information stored in the storage unit 16 is deleted. Therefore, leakage of data in the usage registration information, which may occur when the multifunction device 10 is transferred form the user to another person, is prevented.

Although the present invention has been described in considerable detail with reference to certain preferred embodiments thereof, other embodiments are possible.

In the above mentioned system 1, a periodical inquiry is outputted from the multifunction device 10 so as to inquire of the function server 30 whether the service offering gets ready. However, the present invention may be applied to a system in which a service is provided from t a service-providing device to a registered client device unilaterally.

What is claimed is:

1. A system for providing a service from a service-providing device to a client device, the service-providing device comprising:

a database capable of storing a plurality of pieces of setting information, each of which includes one or more parameters relating to a service to be provided to the client device, while associating each of the plurality of setting information with an identification of the client device;

a registering unit that obtains setting information from the client device if a registration request signal requesting registration for a service is received from the client device, and registers the obtained setting information in the database while associating the obtained setting information with the identification of the client device;

a providing unit that provides a service to the client device in accordance with the setting information relating to the service to be provided to the client device;

a service end judging unit that judges whether an end condition of a service corresponding to each of the plurality of pieces of setting information is satisfied; and a service terminating unit that deletes the setting information of a service judged to satisfy the end condition from the database so as to terminate the service satisfying the end condition, the client device comprising:

a usage registration unit that transmits the registration request signal to the service-providing device if a user input requesting a usage registration for a service to be received is received through an operation unit of the client device, obtains from a user the setting information relating to the service to be received, and transmits the setting information obtained from the user to the service-providing device;

a setting information storing unit that copies the setting information, which the usage registration unit transmits to the service-providing device, to save the setting information in a storage unit of the client device;

a function executing unit that executes a predetermined function relating to the service provided from the service-providing device and caused by an operation of the usage registration unit;

a detecting unit that detects a service terminated by the service-providing device, from among services for which the usage registration has been made through the usage registration unit; and a re-registration unit that reads out the setting information corresponding to the terminated service from the storage unit if the terminated service is detected by the detecting unit, and transmits the setting information along with the registration request signal to the service-providing device to make a usage registration for the terminated service.

2. The system according to claim 1, wherein:

the service terminating unit transmits a notification indicating termination of the service satisfying the end condition to the client device which received the service when the service terminating unit terminates the service satisfying the end condition;

the detecting unit detects the service terminated by the service-providing device by receiving the notification from the service-providing device.

3. The system according to claim 1, the re-registration unit of the client device comprising a re-registration judging unit that judges whether the terminated service needs a usage registration, wherein the re-registration unit makes a usage registration for a service for which the re-registration judging unit judges that the usage registration is needed, and does not make a usage registration for a service for which the re-registration judging unit judges that the usage registration is not needed.

4. The system according to claim 3, wherein the re-registration judging unit analyzes a factor of the termination of the terminated service detected by the detecting unit, and judges whether the terminated service needs a usage registration in accordance with a result of the analysis.

5. The system according to claim 3, wherein:
the service terminating unit transmits information concerning acceptance for re-registration of the terminated service to the client device which received the service when the service terminating unit terminates the service satisfying the end condition; and
wherein the re-registration judging unit judges whether the terminated service needs a usage registration in accordance with the information concerning acceptance for re-registration of the terminated service.

6. The system according to claim 1, the client device further comprising:
a permission judging unit that judges whether re-registration of the terminated service detected by the detecting unit is permitted in accordance with user-input information as to whether the re-registration of the service is permitted; and
a re-registration inhibiting unit that inhibits re-registration of the terminated service for which the permission judging unit judges that the re-registration is not permitted.

7. The system according to claim 6, wherein:
the usage registration unit includes a permission information storing unit that requests the user to input information as to whether the re-registration of the service is permitted through the operation unit so as to obtain the user-input information, and stores the user-input information in the storage unit for each of services for which the usage registration has been made; and
the permission judging unit judges whether re-registration of the terminated service is permitted in accordance with the user-input information stored in the permission information storing unit.

8. The system according to claim 1, the client device further comprising:
a message displaying unit that displays a message requesting a user to change a particular parameter in the setting information corresponding to the service to be registered by the re-registration unit after the termination of the service is detected by the detecting unit; and
a setting information changing unit configured such that when a value of the particular parameter is newly inputted by the user through the operation unit, the setting information changing unit changes a value of the particular parameter stored in the storage unit to the newly inputted value of the particular parameter, and controls the re-registration unit to make the usage registration for the terminated service using the newly inputted value of the particular parameter.

9. The system according to claim 8, wherein:
the service end judging unit of the service-providing device judges that the end condition of the service is satisfied if a particular event arises in the service;
the service terminating unit of the service-providing device transmits a factor of the termination of the service to the client device that received the service to be terminated when the service terminating device terminates the service, the factor relating to the particular event arising in the terminated service; and
the client device further comprises a parameter determining unit that determines the particular parameter based on the factor received from the service-providing device.

10. The system according to claim 8,
the service end judging unit of the service-providing device judges that the end condition of the service is satisfied if the one or more parameters of the setting information corresponding to the service can not be used for successfully continuing the service;
the service terminating unit of the service-providing device transmits information indicating an appropriate range of a parameter causing satisfaction of the end condition to the client device that received the service to be terminated; and
the message displaying unit of the client device displays the appropriate range of the parameter causing satisfaction of the end condition in addition to a message of requesting the user to change the parameter causing satisfaction of the end condition as a message requesting the user to change the particular parameter.

11. The system according to claim 1, the client device further comprising a deleting unit that deletes at least a piece of setting information stored in the storage unit if a deletion command is inputted by a user through the operation unit.

12. A communication device used in a system for providing a service from a service-providing device to the communication device,
the service-providing device comprising:
a database capable of storing a plurality of pieces of setting information, each of which includes one or more parameters relating to a service to be provided to the communication device, while associating each of the plurality of setting information with an identification of the communication device;
a registering unit that obtains setting information from the communication device if a registration request signal requesting registration for a service is received from the communication device, and registers the obtained setting information in the database while associating the obtained setting information with the identification of the communication device;
a providing unit that provides a service to the communication device in accordance with the setting information relating to the service to be provided to the communication device;
a service end judging unit that judges whether an end condition of a service corresponding to each of the plurality of pieces of setting information is satisfied; and
a service terminating unit that deletes the setting information of a service judged to satisfy the end condition from the database so as to terminate the service satisfying the end condition,
the communication device comprising:
a usage registration unit that transmits the registration request signal to the service-providing device if a user input requesting a usage registration for a service to be received is received through an operation unit of the communication device, obtains from a user the setting information relating to the service to be received, and transmits the setting information obtained from the user to the service-providing device;
a setting information storing unit that copies the setting information, which the usage registration unit transmits to the service-providing device, to save the setting information in a storage unit of the communication device;
a function executing unit that executes a predetermined function relating to the service provided from the service-providing device and caused by an operation of the usage registration unit;
a detecting unit that detects a service terminated by the service-providing device, from among services for which the usage registration has been made through the usage registration unit; and
a re-registration unit that reads out the setting information corresponding to the terminated service from the storage unit if the terminated service is detected by the detecting unit, and transmits the setting information along with the registration request signal to the service-providing device to make a usage registration for the terminated service.

13. The communication device according to claim 12, wherein:
the service terminating unit of the service-providing device transmits a notification indicating termination of the service satisfying the end condition to the communication device which received the service when the service terminating unit terminates the service satisfying the end condition; and
the detecting unit detects the service terminated by the service-providing device by receiving the notification from the service-providing device.

14. The communication device according to claim 12, wherein:
the re-registration unit includes a re-registration judging unit that judges whether the terminated service needs a usage registration; and
wherein the re-registration unit makes a usage registration for a service for which the re-registration judging unit judges that the usage registration is needed, and does not make a usage registration for a service for which the re-registration judging unit judges that the usage registration is not needed.

15. The communication device according to claim 14, wherein the re-registration judging unit analyzes a factor of the termination of the terminated service detected by the detecting unit, and judges whether the terminated service needs a usage registration in accordance with a result of the analysis.

16. The communication device according to claim 14, wherein:
the service terminating unit of the service-providing device transmits information concerning acceptance for re-registration of the terminated service to the communication device which received the service when the service terminating unit terminates the service satisfying the end condition; and
wherein the re-registration judging unit judges whether the terminated service needs a usage registration in accordance with the information concerning acceptance for re-registration for the terminated service.

17. The communication device according to claim 12, further comprising:
a permission judging unit that judges whether re-registration of the terminated service detected by the detecting unit is permitted in accordance with user-input information as to whether the re-registration of the service is permitted; and
a re-registration inhibiting unit that inhibits re-registration of the terminated service for which the permission judging unit judges that the re-registration is not permitted.

18. The communication device according to claim 17, wherein:
the usage registration unit includes a permission information storing unit that requests the user to input information as to whether the re-registration of the service is permitted through the operation unit so as to obtain the user-input information, and stores the user-input information in the storage unit for each of services for which the usage registration has been made; and
the permission judging unit judges whether re-registration of the terminated service is permitted in accordance with the user-input information stored in the permission information storing unit.

19. The communication device according to claim 12, further comprising:
a message displaying unit that displays a message requesting a user to change a particular parameter in the setting information corresponding to the service to be registered by the re-registration unit after the termination of the service is detected by the detecting unit; and
a setting information changing unit configured such that when a value of the particular parameter is newly inputted by the user through the operation unit, the setting information changing unit changes a value of the particular parameter stored in the storage unit to the newly inputted value of the particular parameter, and controls the re-registration unit to make the usage registration for the terminated service using the newly inputted value of the particular parameter.

20. The communication device according to claim 19, wherein:
the service end judging unit of the service-providing device judges that the end condition of the service is satisfied if a particular event arises in the service;
the service terminating unit of the service-providing device transmits a factor of the termination of the service to the communication device that received the service to be terminated when the service terminating device terminates the service, the factor relating to the particular event arising in the terminated service; and
the communication device further comprises a parameter determining unit that determines the particular parameter based on the factor received from the service-providing device.

21. The communication device according to claim 19,
the service end judging unit of the service-providing device judges that the end condition of the service is satisfied if the one or more parameters of the setting information corresponding to the service can not be used for successfully continuing the service;
the service terminating unit of the service-providing device transmits information indicating an appropriate range of a parameter causing satisfaction of the end condition to the communication device that received the service to be terminated; and
the message displaying unit of the communication device displays the appropriate range of the parameter causing satisfaction of the end condition in addition to a message of requesting the user to change the parameter causing satisfaction of the end condition as a message requesting the user to change the particular parameter.

22. The communication device according to claim 12, further comprising a deleting unit that deletes at least a piece of setting information stored in the storage unit if a deletion command is inputted by a user through the operation unit.

23. An image forming device, comprising:
the communication device according to claim 12; and
a image forming unit that forms a image on a recording medium,
wherein the function executing unit of the communication device executes the predetermined function using the image forming unit.

24. A service-providing device used in a system for providing a service from the service-providing device to a client device, comprising:
a database capable of storing a plurality of pieces of setting information, each of which includes one or more parameters relating to a service to be provided to the client device, while associating each of the plurality of setting information with an identification of the client device;

a registering unit that obtains setting information from the client device if a registration request signal requesting registration for a service is received from the client device, and registers the obtained setting information in the database while associating the obtained setting information with the identification of the client device;

a providing unit that provides a service to the client device in accordance with the setting information relating to the service to be provided to the client device;

a service end judging unit that judges whether an end condition of a service corresponding to each of the plurality of pieces of setting information is satisfied; and a service terminating unit that deletes the setting information of a service judged to satisfy the end condition from the database so as to terminate the service satisfying the end condition, wherein the client device includes:

a usage registration unit that transmits the registration request signal to the service-providing device if a user input requesting a usage registration for a service to be received is received through an operation unit of the client device, obtains from a user the setting information relating to the service to be received, and transmits the setting information obtained from the user to the service-providing device;

a setting information storing unit that copies the setting information, which the usage registration unit transmits to the service-providing device, to save the setting information in a storage unit of the client device;

a function executing unit that executes a predetermined function relating to the service provided from the service-providing device and caused by an operation of the usage registration unit;

a detecting unit that detects a service terminated by the service-providing device, from among services for which the usage registration has been made through the usage registration unit; and a re-registration unit that reads out the setting information corresponding to the terminated service from the storage unit if the terminated service is detected by the detecting unit, and transmits the setting information along with the registration request signal to the service-providing device to make a usage registration for the terminated service.

* * * * *